(12) United States Patent
McCabe et al.

(10) Patent No.: US 8,335,032 B2
(45) Date of Patent: *Dec. 18, 2012

(54) REFLECTIVE MIRROR ASSEMBLY

(75) Inventors: Ian A. McCabe, Holland, MI (US); Desaraju V. Varaprasad, Holland, MI (US); Hamid Habibi, Holland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 134 days.

This patent is subject to a terminal disclaimer.

(21) Appl. No.: 12/979,492

(22) Filed: Dec. 28, 2010

(65) Prior Publication Data

US 2011/0096387 A1    Apr. 28, 2011

Related U.S. Application Data

(63) Continuation of application No. 12/727,691, filed on Mar. 19, 2010, now Pat. No. 7,864,399, which is a continuation of application No. 12/429,620, filed on Apr. 24, 2009, now Pat. No. 7,710,631, which is a continuation of application No. 11/956,893, filed on Dec. 14, 2007, now Pat. No. 7,525,715, which is a continuation of application No. 11/709,625, filed on Feb. 22, 2007, now Pat. No. 7,310,177, which is a continuation of application No. 10/533,762, filed as application No. PCT/US03/35381 on Nov. 5, 2003, now Pat. No. 7,184,190, said application No. 10/533,762 is a continuation-in-part of application No. 10/528,269, filed as application No. PCT/US03/29776 on Sep. 19, 2003, now Pat. No. 7,274,501.

(60) Provisional application No. 60/490,111, filed on Jul. 25, 2003, provisional application No. 60/423,903, filed on Nov. 5, 2002, provisional application No. 60/412,275, filed on Sep. 20, 2002, provisional application No. 60/424,116, filed on Nov. 5, 2002, provisional application No. 60/489,816, filed on Jul. 24, 2003.

(51) Int. Cl.
*G02F 1/153* (2006.01)

(52) U.S. Cl. .................................. 359/267; 359/265
(58) Field of Classification Search .................. 359/265, 359/266, 267, 268, 269, 270, 271, 272, 273, 359/274, 601, 602, 603, 604, 605, 606, 607, 359/608, 609, 296, 245, 237, 238, 838, 871; 362/494, 514, 516; 345/105, 107
See application file for complete search history.

(56) References Cited

U.S. PATENT DOCUMENTS 1,096,452 A    5/1914    Perrin
(Continued)

FOREIGN PATENT DOCUMENTS

AU    A-40317/95    2/1995
(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Thomas K Pham
*Assistant Examiner* — William M Johnson
(74) *Attorney, Agent, or Firm* — Gardner, Linn, Burkhart & Flory, LLP

(57) ABSTRACT

An interior rearview mirror reflective element includes a front substrate connected with a rear substrate via a perimeter seal, whereby, when so connected, at least a portion of a circumferential outer edge of the rear substrate is inward of a circumferential outer edge of the front substrate and no portion of the rear substrate protrudes beyond the front substrate. A first electrical connection establishes electrical connection at the front substrate and a second electrical connection may establish electrical connection at the rear substrate. An electrically conductive perimeter hiding band is disposed around a border region of the front substrate and substantially hides the seal and the electrical connections from view by a driver normally operating the vehicle and viewing the reflective element when the interior rearview mirror assembly is normally mounted in the vehicle.

57 Claims, 35 Drawing Sheets

U.S. PATENT DOCUMENTS

| | | |
|---|---|---|
| 1,563,258 A | 11/1925 | Cunningham |
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier at al. |
| 3,499,702 A | 3/1970 | Goldmacher et al. |
| 3,521,941 A | 7/1970 | Deb et al. |
| 3,543,018 A | 11/1970 | Barcus at al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |

| | | | | | | |
|---|---|---|---|---|---|---|
| 4,794,261 A | 12/1988 | Rosen | | 5,076,673 A | 12/1991 | Lynam et al. |
| D299,491 S | 1/1989 | Masuda | | 5,076,674 A | 12/1991 | Lynam |
| 4,799,768 A | 1/1989 | Gahan | | 5,078,480 A | 1/1992 | Warszawski |
| 4,803,599 A | 2/1989 | Trine et al. | | 5,096,287 A | 3/1992 | Kakinami et al. |
| 4,807,096 A | 2/1989 | Skogler et al. | | 5,100,095 A | 3/1992 | Haan et al. |
| 4,820,933 A | 4/1989 | Hong et al. | | 5,101,139 A | 3/1992 | Lechter |
| 4,825,232 A | 4/1989 | Howdle | | 5,105,127 A | 4/1992 | Lavaud et al. |
| 4,826,289 A | 5/1989 | Vandenbrink et al. | | 5,115,346 A | 5/1992 | Lynam |
| 4,827,086 A | 5/1989 | Rockwell | | 5,117,346 A | 5/1992 | Gard |
| 4,837,551 A | 6/1989 | Iino | | 5,119,220 A | 6/1992 | Narita et al. |
| 4,842,378 A | 6/1989 | Flasck et al. | | 5,121,200 A | 6/1992 | Choi |
| 4,845,402 A | 7/1989 | Smith | | 5,122,619 A | 6/1992 | Dlubak |
| 4,847,772 A | 7/1989 | Michalopoulos et al. | | 5,123,077 A | 6/1992 | Endo et al. |
| 4,855,161 A | 8/1989 | Moser et al. | | 5,124,845 A | 6/1992 | Shimojo |
| 4,855,550 A | 8/1989 | Schultz, Jr. | | 5,124,890 A | 6/1992 | Choi et al. |
| 4,859,813 A | 8/1989 | Rockwell | | 5,128,799 A | 7/1992 | Byker |
| 4,859,867 A | 8/1989 | Larson et al. | | 5,130,898 A | 7/1992 | Akahane |
| 4,860,171 A | 8/1989 | Kojima | | 5,131,154 A | 7/1992 | Schierbeek et al. |
| 4,862,594 A | 9/1989 | Schierbeek et al. | | 5,134,507 A | 7/1992 | Ishii |
| 4,871,917 A | 10/1989 | O'Farrell et al. | | 5,134,549 A | 7/1992 | Yokoyama |
| 4,872,051 A | 10/1989 | Dye | | 5,135,298 A | 8/1992 | Feltman |
| 4,882,466 A | 11/1989 | Friel | | 5,136,483 A | 8/1992 | Schöniger et al. |
| 4,882,565 A | 11/1989 | Gallmeyer | | 5,140,455 A | 8/1992 | Varaprasad et al. |
| 4,883,349 A | 11/1989 | Mittelhäuser | | 5,140,465 A | 8/1992 | Yasui et al. |
| 4,884,135 A | 11/1989 | Schiffman | | 5,142,407 A | 8/1992 | Varaprasad et al. |
| 4,886,960 A | 12/1989 | Molyneux et al. | | 5,145,609 A | 9/1992 | Varaprasad et al. |
| 4,889,412 A | 12/1989 | Clerc et al. | | 5,150,232 A | 9/1992 | Gunkima et al. |
| 4,891,828 A | 1/1990 | Kawazoe | | 5,151,816 A | 9/1992 | Varaprasad et al. |
| 4,892,345 A | 1/1990 | Rachael, III | | 5,151,824 A | 9/1992 | O'Farrell |
| 4,902,103 A | 2/1990 | Miyake et al. | | 5,154,617 A | 10/1992 | Suman et al. |
| 4,902,108 A | 2/1990 | Byker | | 5,158,638 A | 10/1992 | Osanami et al. |
| 4,906,085 A | 3/1990 | Sugihara et al. | | 5,160,200 A | 11/1992 | Cheselske |
| 4,909,606 A | 3/1990 | Wada et al. | | 5,160,201 A | 11/1992 | Wrobel |
| 4,910,591 A | 3/1990 | Petrossian et al. | | 5,166,815 A | 11/1992 | Elderfield |
| 4,916,374 A | 4/1990 | Schierbeek et al. | | 5,168,378 A | 12/1992 | Black et al. |
| 4,926,170 A | 5/1990 | Beggs et al. | | 5,173,881 A | 12/1992 | Sindle |
| 4,930,742 A | 6/1990 | Schofield et al. | | 5,177,031 A | 1/1993 | Buchmann et al. |
| 4,933,814 A | 6/1990 | Sanai | | 5,178,448 A | 1/1993 | Adams et al. |
| 4,935,665 A | 6/1990 | Murata | | 5,179,471 A | 1/1993 | Caskey et al. |
| 4,936,533 A | 6/1990 | Adams et al. | | 5,183,099 A | 2/1993 | Bechu |
| 4,937,796 A | 6/1990 | Tendler | | 5,184,956 A | 2/1993 | Langlaris et al. |
| 4,937,945 A | 7/1990 | Schofield et al. | | 5,189,537 A | 2/1993 | O'Farrell |
| 4,943,796 A | 7/1990 | Lee | | 5,193,029 A | 3/1993 | Schofield et al. |
| 4,948,242 A | 8/1990 | Desmond et al. | | 5,197,562 A | 3/1993 | Kakinami et al. |
| 4,953,305 A | 9/1990 | Van Lente et al. | | 5,202,950 A | 4/1993 | Arego et al. |
| 4,956,591 A | 9/1990 | Schierbeek et al. | | 5,206,756 A * | 4/1993 | Cheshire ...................... 359/270 |
| 4,957,349 A | 9/1990 | Clerc et al. | | 5,207,492 A | 5/1993 | Roberts |
| 4,959,247 A | 9/1990 | Moser et al. | | 5,210,967 A | 5/1993 | Brown |
| 4,959,865 A | 9/1990 | Stettiner et al. | | 5,212,819 A | 5/1993 | Wada |
| 4,970,653 A | 11/1990 | Kenue | | 5,214,408 A | 5/1993 | Asayama |
| 4,973,844 A | 11/1990 | O'Farrell et al. | | 5,217,794 A | 6/1993 | Schrenk |
| 4,974,122 A | 11/1990 | Shaw | | 5,223,814 A | 6/1993 | Suman |
| 4,978,196 A | 12/1990 | Suzuki et al. | | 5,223,844 A | 6/1993 | Mansell et al. |
| 4,983,951 A | 1/1991 | Igarashi et al. | | 5,229,975 A | 7/1993 | Truesdell et al. |
| 4,985,809 A | 1/1991 | Matsui et al. | | 5,230,400 A | 7/1993 | Kakinami et al. |
| 4,987,357 A | 1/1991 | Masaki | | 5,233,461 A | 8/1993 | Dornan et al. |
| 4,996,083 A | 2/1991 | Moser et al. | | 5,235,316 A | 8/1993 | Qualizza |
| 5,001,386 A | 3/1991 | Sullivan et al. | | 5,239,405 A | 8/1993 | Varaprasad et al. |
| 5,001,558 A | 3/1991 | Burley et al. | | 5,239,406 A | 8/1993 | Lynam |
| 5,005,213 A | 4/1991 | Hanson et al. | | 5,243,417 A | 9/1993 | Pollard |
| 5,006,971 A | 4/1991 | Jenkins | | 5,245,422 A | 9/1993 | Borcherts et al. |
| 5,014,167 A | 5/1991 | Roberts | | 5,252,354 A | 10/1993 | Cronin et al. |
| 5,016,988 A | 5/1991 | Iimura | | 5,253,109 A | 10/1993 | O'Farrell et al. |
| 5,016,996 A | 5/1991 | Ueno | | 5,255,442 A | 10/1993 | Schierbeek et al. |
| 5,017,903 A | 5/1991 | Krippelz, Sr. | | 5,260,626 A | 11/1993 | Takase et al. |
| 5,018,839 A | 5/1991 | Yamamoto et al. | | 5,277,986 A | 1/1994 | Cronin et al. |
| 5,027,200 A | 6/1991 | Petrossian et al. | | 5,280,555 A | 1/1994 | Ainsburg |
| 5,037,182 A | 8/1991 | Groves et al. | | 5,285,060 A | 2/1994 | Larson et al. |
| 5,038,255 A | 8/1991 | Nishihashi et al. | | 5,289,321 A | 2/1994 | Secor |
| 5,052,163 A | 10/1991 | Czekala | | 5,296,924 A | 3/1994 | de Saint Blancard et al. |
| 5,056,899 A | 10/1991 | Warszawski | | 5,303,075 A | 4/1994 | Wada et al. |
| 5,057,974 A | 10/1991 | Mizobe | | 5,303,205 A | 4/1994 | Gauthier et al. |
| 5,058,851 A | 10/1991 | Lawlor et al. | | 5,304,980 A | 4/1994 | Maekawa |
| 5,059,015 A | 10/1991 | Tran | | 5,305,012 A | 4/1994 | Faris |
| 5,066,108 A | 11/1991 | McDonald | | 5,307,136 A | 4/1994 | Saneyoshi |
| 5,066,112 A * | 11/1991 | Lynam et al. ...................... 359/267 | | 5,313,335 A | 5/1994 | Gray et al. |
| 5,069,535 A | 12/1991 | Baucke et al. | | 5,325,096 A | 6/1994 | Pakett |
| 5,070,323 A | 12/1991 | Iino et al. | | 5,325,386 A | 6/1994 | Jewell et al. |
| 5,073,012 A | 12/1991 | Lynam | | 5,327,288 A | 7/1994 | Wellington et al. |

| Patent No. | Date | Name |
|---|---|---|
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,519,621 A | 5/1996 | Worthman |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,696,529 A | 12/1997 | Evanicky et al. |

| | | | | | | |
|---|---|---|---|---|---|---|
| 5,696,567 | A | 12/1997 | Wada et al. | 5,871,843 | A | 2/1999 | Yoneda et al. |
| 5,699,044 | A | 12/1997 | Van Lente et al. | 5,877,707 | A | 3/1999 | Kowalick |
| 5,699,188 | A | 12/1997 | Gilbert et al. | 5,877,897 | A | 3/1999 | Schofield et al. |
| 5,703,568 | A | 12/1997 | Hegyi | 5,878,353 | A | 3/1999 | ul Azam et al. |
| 5,708,410 | A | 1/1998 | Blank et al. | 5,878,370 | A | 3/1999 | Olson |
| 5,708,415 | A | 1/1998 | Van Lente et al. | 5,879,074 | A | 3/1999 | Pastrick |
| 5,708,857 | A | 1/1998 | Ishibashi | 5,883,605 | A | 3/1999 | Knapp |
| 5,715,093 | A | 2/1998 | Schierbeek et al. | 5,883,739 | A | 3/1999 | Ashihara et al. |
| 5,724,187 | A | 3/1998 | Varaprasad et al. | 5,888,431 | A | 3/1999 | Tonar et al. |
| 5,724,316 | A | 3/1998 | Brunts | 5,894,196 | A | 4/1999 | McDermott |
| 5,729,194 | A | 3/1998 | Spears et al. | D409,540 | S | 5/1999 | Muth |
| 5,737,226 | A | 4/1998 | Olson et al. | 5,899,551 | A | 5/1999 | Neijzen et al. |
| 5,741,966 | A | 4/1998 | Handfield et al. | 5,899,956 | A | 5/1999 | Chan |
| 5,744,227 | A | 4/1998 | Bright et al. | 5,904,729 | A | 5/1999 | Ruzicka |
| 5,745,050 | A | 4/1998 | Nakagawa | 5,910,854 | A | 6/1999 | Varaprasad et al. |
| 5,745,266 | A | 4/1998 | Smith | 5,914,815 | A | 6/1999 | Bos |
| 5,748,172 | A | 5/1998 | Song et al. | 5,917,664 | A | 6/1999 | O'Neill et al. |
| 5,748,287 | A | 5/1998 | Takahashi et al. | 5,918,180 | A | 6/1999 | Dimino |
| 5,751,211 | A | 5/1998 | Shirai et al. | 5,922,176 | A | 7/1999 | Caskey |
| 5,751,246 | A | 5/1998 | Hertel | 5,923,027 | A | 7/1999 | Stam et al. |
| 5,751,390 | A | 5/1998 | Crawford et al. | 5,923,457 | A | 7/1999 | Byker et al. |
| 5,751,489 | A | 5/1998 | Caskey et al. | 5,924,212 | A | 7/1999 | Domanski |
| 5,754,099 | A | 5/1998 | Nishimura et al. | 5,926,087 | A | 7/1999 | Busch et al. |
| D394,833 | S | 6/1998 | Muth | 5,927,792 | A | 7/1999 | Welling et al. |
| 5,760,828 | A | 6/1998 | Cortes | 5,928,572 | A | 7/1999 | Tonar et al. |
| 5,760,931 | A | 6/1998 | Saburi et al. | 5,929,786 | A | 7/1999 | Schofield et al. |
| 5,760,962 | A | 6/1998 | Schofield et al. | 5,931,555 | A | 8/1999 | Akahane et al. |
| 5,761,094 | A | 6/1998 | Olson et al. | 5,935,702 | A | 8/1999 | Macquart et al. |
| 5,762,823 | A | 6/1998 | Hikmet | 5,936,774 | A | 8/1999 | Street |
| 5,764,139 | A | 6/1998 | Nojima et al. | 5,938,320 | A | 8/1999 | Crandall |
| 5,765,940 | A | 6/1998 | Levy et al. | 5,938,321 | A | 8/1999 | Bos et al. |
| 5,767,793 | A | 6/1998 | Agravante et al. | 5,938,721 | A | 8/1999 | Dussell et al. |
| 5,768,020 | A | 6/1998 | Nagao | 5,940,011 | A | 8/1999 | Agravante et al. |
| 5,775,762 | A | 7/1998 | Vitito | 5,940,120 | A | 8/1999 | Frankhouse et al. |
| 5,777,779 | A | 7/1998 | Hashimoto et al. | 5,940,201 | A | 8/1999 | Ash et al. |
| 5,780,160 | A | 7/1998 | Allemand et al. | 5,942,895 | A | 8/1999 | Popovic et al. |
| 5,786,772 | A | 7/1998 | Schofield et al. | 5,947,586 | A | 9/1999 | Weber |
| 5,788,357 | A | 8/1998 | Muth et al. | 5,949,331 | A | 9/1999 | Schofield et al. |
| 5,790,298 | A | 8/1998 | Tonar | 5,949,506 | A | 9/1999 | Jones et al. |
| 5,790,502 | A | 8/1998 | Horinouchi et al. | 5,956,079 | A | 9/1999 | Ridgley |
| 5,790,973 | A | 8/1998 | Blaker et al. | 5,956,181 | A | 9/1999 | Lin |
| 5,793,308 | A | 8/1998 | Rosinski et al. | 5,959,367 | A | 9/1999 | O'Farrell et al. |
| 5,793,420 | A | 8/1998 | Schmidt | 5,959,555 | A | 9/1999 | Furuta |
| 5,796,094 | A | 8/1998 | Schofield et al. | 5,959,577 | A | 9/1999 | Fan et al. |
| 5,796,176 | A | 8/1998 | Kramer et al. | 5,963,247 | A | 10/1999 | Banitt |
| 5,798,057 | A | 8/1998 | Hikmet | 5,963,284 | A | 10/1999 | Jones et al. |
| 5,798,575 | A | 8/1998 | O'Farrell et al. | 5,965,247 | A | 10/1999 | Jonza et al. |
| 5,798,688 | A | 8/1998 | Schofield | 5,968,538 | A | 10/1999 | Snyder, Jr. |
| 5,800,918 | A | 9/1998 | Chartier et al. | 5,971,552 | A | 10/1999 | O'Farrell et al. |
| 5,802,727 | A | 9/1998 | Blank et al. | 5,973,760 | A | 10/1999 | Dehmlow |
| 5,803,579 | A | 9/1998 | Turnbull et al. | 5,975,715 | A | 11/1999 | Bauder |
| 5,805,330 | A | 9/1998 | Byker et al. | 5,984,482 | A | 11/1999 | Rumsey et al. |
| 5,805,367 | A | 9/1998 | Kanazawa | 5,986,730 | A | 11/1999 | Hansen et al. |
| 5,806,879 | A | 9/1998 | Hamada et al. | 5,990,469 | A | 11/1999 | Bechtel et al. |
| 5,806,965 | A | 9/1998 | Deese | 5,990,625 | A | 11/1999 | Meissner et al. |
| 5,808,197 | A | 9/1998 | Dao | 5,995,180 | A | 11/1999 | Moriwaki et al. |
| 5,808,566 | A | 9/1998 | Behr et al. | 5,998,617 | A | 12/1999 | Srinivasa et al. |
| 5,808,589 | A | 9/1998 | Fergason | 5,998,929 | A | 12/1999 | Bechtel et al. |
| 5,808,713 | A | 9/1998 | Broer et al. | 6,000,823 | A | 12/1999 | Desmond et al. |
| 5,808,777 | A | 9/1998 | Lynam et al. | 6,001,486 | A | 12/1999 | Varaprasad et al. |
| 5,808,778 | A | 9/1998 | Bauer et al. | 6,002,511 | A | 12/1999 | Varaprasad et al. |
| 5,812,321 | A | 9/1998 | Schierbeek et al. | 6,002,544 | A | 12/1999 | Yatsu |
| 5,813,745 | A | 9/1998 | Fant, Jr. et al. | 6,002,983 | A | 12/1999 | Alland et al. |
| 5,818,625 | A | 10/1998 | Forgette et al. | 6,005,724 | A | 12/1999 | Todd |
| 5,820,097 | A | 10/1998 | Spooner | 6,007,222 | A | 12/1999 | Thau |
| 5,820,245 | A | 10/1998 | Desmond et al. | 6,008,486 | A | 12/1999 | Stam et al. |
| 5,822,023 | A | 10/1998 | Suman et al. | 6,008,871 | A | 12/1999 | Okumura |
| 5,823,654 | A | 10/1998 | Pastrick et al. | 6,009,359 | A | 12/1999 | El-Hakim et al. |
| 5,825,527 | A | 10/1998 | Forgette et al. | 6,016,035 | A | 1/2000 | Eberspächer et al. |
| 5,835,166 | A | 11/1998 | Hall et al. | 6,016,215 | A | 1/2000 | Byker |
| 5,837,994 | A | 11/1998 | Stam et al. | 6,019,411 | A | 2/2000 | Carter et al. |
| 5,844,505 | A | 12/1998 | Van Ryzin | 6,019,475 | A | 2/2000 | Lynam et al. |
| 5,848,373 | A | 12/1998 | DeLorme et al. | 6,020,987 | A | 2/2000 | Baumann et al. |
| 5,850,176 | A | 12/1998 | Kinoshita et al. | 6,021,371 | A | 2/2000 | Fultz |
| 5,850,205 | A | 12/1998 | Blouin | 6,023,229 | A | 2/2000 | Bugno et al. |
| 5,863,116 | A | 1/1999 | Pastrick et al. | 6,025,872 | A | 2/2000 | Ozaki et al. |
| 5,864,419 | A | 1/1999 | Lynam | 6,028,537 | A | 2/2000 | Suman et al. |
| 5,867,801 | A | 2/1999 | Denny | 6,037,689 | A | 3/2000 | Bingle et al. |
| 5,871,275 | A | 2/1999 | O'Farrell et al. | 6,040,939 | A | 3/2000 | Demiryont et al. |

| | | | | | | |
|---|---|---|---|---|---|---|
| 6,042,253 A | 3/2000 | Fant, Jr. et al. | | 6,152,551 A | 11/2000 | Annas |
| 6,042,934 A | 3/2000 | Guiselin et al. | | 6,152,590 A | 11/2000 | Fürst et al. |
| 6,045,243 A | 4/2000 | Muth et al. | | 6,154,149 A | 11/2000 | Tyckowski et al. |
| 6,045,643 A | 4/2000 | Byker et al. | | 6,154,306 A | 11/2000 | Varaprasad et al. |
| 6,046,766 A | 4/2000 | Sakata | | 6,157,294 A | 12/2000 | Urai et al. |
| 6,046,837 A | 4/2000 | Yamamoto | | 6,157,418 A | 12/2000 | Rosen |
| 6,049,171 A | 4/2000 | Stam et al. | | 6,157,424 A | 12/2000 | Eichenlaub |
| D425,466 S | 5/2000 | Todd et al. | | 6,157,480 A | 12/2000 | Anderson et al. |
| 6,060,989 A | 5/2000 | Gehlot | | 6,158,655 A | 12/2000 | DeVries, Jr. et al. |
| 6,061,002 A | 5/2000 | Weber et al. | | 6,161,865 A | 12/2000 | Rose et al. |
| 6,062,920 A | 5/2000 | Jordan et al. | | 6,164,564 A | 12/2000 | Franco et al. |
| 6,064,508 A | 5/2000 | Forgette et al. | | 6,166,625 A | 12/2000 | Teowee et al. |
| 6,065,840 A | 5/2000 | Caskey et al. | | 6,166,629 A | 12/2000 | Hamma et al. |
| 6,066,920 A | 5/2000 | Torihara et al. | | 6,166,834 A | 12/2000 | Taketomi et al. |
| 6,067,111 A | 5/2000 | Hahn et al. | | 6,166,847 A | 12/2000 | Tench et al. |
| 6,067,500 A | 5/2000 | Morimoto et al. | | 6,166,848 A | 12/2000 | Cammenga et al. |
| 6,068,380 A | 5/2000 | Lynn et al. | | 6,167,755 B1 | 1/2001 | Damson et al. |
| D426,506 S | 6/2000 | Todd et al. | | 6,169,955 B1 | 1/2001 | Fultz |
| D426,507 S | 6/2000 | Todd et al. | | 6,170,956 B1 | 1/2001 | Rumsey et al. |
| D427,128 S | 6/2000 | Mathieu | | 6,172,600 B1 | 1/2001 | Kakinami et al. |
| 6,072,391 A | 6/2000 | Suzukie et al. | | 6,172,601 B1 | 1/2001 | Wada et al. |
| 6,074,077 A | 6/2000 | Pastrick et al. | | 6,172,613 B1 | 1/2001 | DeLine et al. |
| 6,074,777 A | 6/2000 | Reimers et al. | | 6,173,501 B1 | 1/2001 | Blank et al. |
| 6,076,948 A | 6/2000 | Bukosky et al. | | 6,175,164 B1 | 1/2001 | O'Farrell et al. |
| 6,078,355 A | 6/2000 | Zengel | | 6,175,300 B1 | 1/2001 | Kendrick |
| 6,078,865 A | 6/2000 | Koyanagi | | 6,176,602 B1 | 1/2001 | Pastrick et al. |
| D428,372 S | 7/2000 | Todd et al. | | 6,178,034 B1 | 1/2001 | Allemand et al. |
| D428,373 S | 7/2000 | Todd et al. | | 6,178,377 B1 | 1/2001 | Ishihara et al. |
| 6,082,881 A | 7/2000 | Hicks | | 6,181,387 B1 | 1/2001 | Rosen |
| 6,084,700 A | 7/2000 | Knapp et al. | | 6,182,006 B1 | 1/2001 | Meek |
| 6,086,131 A | 7/2000 | Bingle et al. | | 6,183,119 B1 | 2/2001 | Desmond et al. |
| 6,086,229 A | 7/2000 | Pastrick | | 6,184,679 B1 | 2/2001 | Popovic et al. |
| 6,087,012 A | 7/2000 | Varaprasad et al. | | 6,184,781 B1 | 2/2001 | Ramakesavan |
| 6,087,953 A | 7/2000 | DeLine et al. | | 6,185,492 B1 | 2/2001 | Kagawa et al. |
| 6,091,343 A | 7/2000 | Dykema et al. | | 6,185,501 B1 | 2/2001 | Smith et al. |
| 6,093,976 A | 7/2000 | Kramer et al. | | 6,188,505 B1 | 2/2001 | Lomprey et al. |
| 6,094,618 A | 7/2000 | Harada | | 6,191,704 B1 | 2/2001 | Takenaga et al. |
| D428,842 S | 8/2000 | Todd et al. | | 6,193,378 B1 * | 2/2001 | Tonar et al. ............. 359/603 |
| D429,202 S | 8/2000 | Todd et al. | | 6,193,912 B1 | 2/2001 | Thieste et al. |
| D430,088 S | 8/2000 | Todd et al. | | 6,195,194 B1 | 2/2001 | Roberts et al. |
| 6,097,023 A | 8/2000 | Schofield et al. | | 6,196,688 B1 | 3/2001 | Caskey et al. |
| 6,097,316 A | 8/2000 | Liaw et al. | | 6,198,409 B1 | 3/2001 | Schofield et al. |
| 6,099,131 A | 8/2000 | Fletcher et al. | | 6,199,014 B1 | 3/2001 | Walker et al. |
| 6,099,155 A | 8/2000 | Pastrick et al. | | 6,199,810 B1 | 3/2001 | Wu et al. |
| 6,102,546 A | 8/2000 | Carter | | 6,200,010 B1 | 3/2001 | Anders |
| 6,102,559 A | 8/2000 | Nold et al. | | 6,201,642 B1 | 3/2001 | Bos |
| 6,104,552 A | 8/2000 | Thau et al. | | 6,206,553 B1 | 3/2001 | Boddy et al. |
| 6,106,121 A | 8/2000 | Buckley et al. | | 6,207,083 B1 | 3/2001 | Varaprasad et al. |
| 6,111,498 A | 8/2000 | Jobes, I et al. | | 6,210,008 B1 | 4/2001 | Hoekstra et al. |
| 6,111,683 A | 8/2000 | Cammenga et al. | | 6,210,012 B1 | 4/2001 | Broer |
| 6,111,684 A | 8/2000 | Forgette et al. | | 6,212,470 B1 | 4/2001 | Seymour et al. |
| 6,111,685 A | 8/2000 | Tench et al. | | 6,217,181 B1 | 4/2001 | Lynam et al. |
| 6,111,696 A | 8/2000 | Allen et al. | | 6,218,934 B1 | 4/2001 | Regan |
| 6,115,086 A | 9/2000 | Rosen | | 6,222,447 B1 | 4/2001 | Schofield et al. |
| 6,115,651 A | 9/2000 | Cruz | | 6,222,460 B1 | 4/2001 | DeLine et al. |
| 6,116,743 A | 9/2000 | Hoek | | 6,222,477 B1 | 4/2001 | Irie et al. |
| 6,118,219 A | 9/2000 | Okigami et al. | | 6,222,689 B1 | 4/2001 | Higuchi et al. |
| 6,122,597 A | 9/2000 | Saneyoshi et al. | | 6,227,689 B1 | 5/2001 | Miller |
| 6,122,921 A | 9/2000 | Brezoczky et al. | | 6,232,937 B1 | 5/2001 | Jacobsen et al. |
| 6,124,647 A | 9/2000 | Marcus et al. | | 6,236,514 B1 | 5/2001 | Sato |
| 6,124,886 A | 9/2000 | DeLine et al. | | 6,239,851 B1 | 5/2001 | Hatazawa et al. |
| 6,127,919 A | 10/2000 | Wylin | | 6,239,898 B1 | 5/2001 | Byker et al. |
| 6,127,945 A | 10/2000 | Mura-Smith | | 6,239,899 B1 | 5/2001 | DeVries et al. |
| 6,128,576 A | 10/2000 | Nishimoto et al. | | 6,243,003 B1 | 6/2001 | DeLine et al. |
| 6,130,421 A | 10/2000 | Bechtel et al. | | 6,244,716 B1 | 6/2001 | Steenwyk et al. |
| 6,130,448 A | 10/2000 | Bauer et al. | | 6,245,262 B1 | 6/2001 | Varaprasad et al. |
| 6,132,072 A | 10/2000 | Turnbull et al. | | 6,247,820 B1 | 6/2001 | Van Order |
| 6,137,620 A | 10/2000 | Guarr et al. | | 6,249,214 B1 | 6/2001 | Kashiwazaki |
| 6,139,171 A | 10/2000 | Waldmann | | 6,249,310 B1 | 6/2001 | Lefkowitz |
| 6,139,172 A | 10/2000 | Bos et al. | | 6,249,369 B1 | 6/2001 | Theiste et al. |
| 6,140,933 A | 10/2000 | Bugno et al. | | 6,250,148 B1 | 6/2001 | Lynam |
| 6,142,656 A | 11/2000 | Kurth | | 6,250,766 B1 | 6/2001 | Strumolo et al. |
| 6,146,003 A | 11/2000 | Thau | | 6,250,783 B1 | 6/2001 | Stidham et al. |
| 6,147,934 A | 11/2000 | Arikawa et al. | | 6,255,639 B1 | 7/2001 | Stam et al. |
| 6,148,261 A | 11/2000 | Obradovich et al. | | 6,257,746 B1 | 7/2001 | Todd et al. |
| 6,149,287 A | 11/2000 | Pastrick et al. | | 6,259,412 B1 | 7/2001 | Duroux |
| 6,150,014 A | 11/2000 | Chu et al. | | 6,259,475 B1 | 7/2001 | Ramachandran et al. |
| 6,151,065 A | 11/2000 | Steed et al. | | 6,260,608 B1 | 7/2001 | Kim |
| 6,151,539 A | 11/2000 | Bergholz et al. | | 6,262,842 B1 | 7/2001 | Ouderkirk et al. |

| Patent No. | Date | Inventor |
|---|---|---|
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B1 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,307 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chautorash |
| 6,543,163 B1 | 4/2003 | Ginsberg |

| Patent | | Date | Inventor |
|---|---|---|---|
| 6,545,598 | B1 | 4/2003 | de Villeroche |
| 6,549,253 | B1 | 4/2003 | Robbie et al. |
| 6,549,335 | B1 | 4/2003 | Trapani et al. |
| 6,550,949 | B1 | 4/2003 | Bauer et al. |
| 6,552,326 | B2 | 4/2003 | Turnbull |
| 6,553,308 | B1 | 4/2003 | Uhlmann et al. |
| 6,559,902 | B1 | 5/2003 | Kusuda et al. |
| 6,560,004 | B2 | 5/2003 | Theiste et al. |
| 6,560,027 | B2 | 5/2003 | Meine |
| 6,566,821 | B2 | 5/2003 | Nakatsuka et al. |
| 6,567,060 | B1 | 5/2003 | Sekiguchi |
| 6,568,839 | B1 | 5/2003 | Pastrick et al. |
| 6,572,233 | B1 | 6/2003 | Northman et al. |
| 6,573,957 | B1 | 6/2003 | Suzuki |
| 6,573,963 | B2 | 6/2003 | Ouderkirk et al. |
| 6,575,582 | B2 | 6/2003 | Tenmyo |
| 6,575,643 | B2 | 6/2003 | Takahashi |
| 6,578,989 | B2 | 6/2003 | Osumi et al. |
| 6,580,373 | B1 | 6/2003 | Ohashi |
| 6,580,479 | B1 | 6/2003 | Sekiguchi et al. |
| 6,580,562 | B2 | 6/2003 | Aoki et al. |
| 6,581,007 | B2 | 6/2003 | Hasegawa et al. |
| 6,583,730 | B2 | 6/2003 | Lang et al. |
| 6,591,192 | B2 | 7/2003 | Okamura et al. |
| 6,592,230 | B2 | 7/2003 | Dupay |
| 6,593,565 | B2 | 7/2003 | Heslin et al. |
| 6,593,984 | B2 | 7/2003 | Arakawa et al. |
| 6,594,065 | B2 | 7/2003 | Byker et al. |
| 6,594,067 | B2 | 7/2003 | Poll et al. |
| 6,594,090 | B2 | 7/2003 | Kruschwitz et al. |
| 6,594,583 | B2 | 7/2003 | Ogura et al. |
| 6,594,614 | B2 | 7/2003 | Studt et al. |
| 6,595,649 | B2 | 7/2003 | Hoekstra et al. |
| 6,597,489 | B1 | 7/2003 | Guarr et al. |
| 6,606,183 | B2 | 8/2003 | Ikai et al. |
| 6,611,202 | B2 | 8/2003 | Schofield et al. |
| 6,611,227 | B1 | 8/2003 | Nebiyeloul-Kifle et al. |
| 6,611,759 | B2 | 8/2003 | Brosche |
| 6,614,387 | B1 | 9/2003 | Deadman |
| 6,614,419 | B1 | 9/2003 | May |
| 6,614,579 | B2 | 9/2003 | Roberts et al. |
| 6,615,438 | B1 | 9/2003 | Franco et al. |
| 6,616,313 | B2 | 9/2003 | Fürst et al. |
| 6,616,764 | B2 | 9/2003 | Krämer et al. |
| 6,618,672 | B2 | 9/2003 | Sasaki et al. |
| 6,621,616 | B1 | 9/2003 | Bauer et al. |
| 6,624,936 | B2 | 9/2003 | Kotchick et al. |
| 6,627,918 | B2 | 9/2003 | Getz et al. |
| 6,630,888 | B2 | 10/2003 | Lang et al. |
| 6,636,190 | B2 | 10/2003 | Hirakata et al. |
| 6,636,258 | B2 | 10/2003 | Strumolo |
| 6,638,582 | B1 | 10/2003 | Uchiyama et al. |
| 6,639,360 | B2 | 10/2003 | Roberts et al. |
| 6,642,840 | B2 | 11/2003 | Lang et al. |
| 6,642,851 | B2 | 11/2003 | DeLine et al. |
| 6,646,697 | B1 | 11/2003 | Sekiguchi et al. |
| 6,648,477 | B2 | 11/2003 | Hutzel et al. |
| 6,650,457 | B2 | 11/2003 | Busscher et al. |
| 6,657,607 | B1 | 12/2003 | Evanicky et al. |
| 6,657,708 | B1 | 12/2003 | Drevillon et al. |
| 6,661,482 | B2 | 12/2003 | Hara |
| 6,661,830 | B1 | 12/2003 | Reed et al. |
| 6,665,592 | B2 | 12/2003 | Kodama |
| 6,669,109 | B2 | 12/2003 | Ivanov et al. |
| 6,669,285 | B1 | 12/2003 | Park et al. |
| 6,670,207 | B1 | 12/2003 | Roberts |
| 6,670,910 | B2 | 12/2003 | Delcheccolo et al. |
| 6,670,941 | B2 | 12/2003 | Albu et al. |
| 6,671,080 | B2 | 12/2003 | Poll et al. |
| 6,672,731 | B2 | 1/2004 | Schnell et al. |
| 6,672,734 | B2 | 1/2004 | Lammers |
| 6,672,744 | B2 | 1/2004 | DeLine et al. |
| 6,672,745 | B1 | 1/2004 | Bauer et al. |
| 6,674,370 | B2 | 1/2004 | Rodewald et al. |
| 6,675,075 | B1 | 1/2004 | Engelsburg et al. |
| 6,678,083 | B1 | 1/2004 | Anstee |
| 6,678,614 | B2 | 1/2004 | McCarthy et al. |
| 6,679,608 | B2 | 1/2004 | Bechtel et al. |
| 6,683,539 | B2 | 1/2004 | Trajkovic et al. |
| 6,683,969 | B1 | 1/2004 | Nishigaki et al. |
| 6,685,348 | B2 | 2/2004 | Pastrick et al. |
| 6,690,262 | B1 | 2/2004 | Winnett |
| 6,690,268 | B2 | 2/2004 | Schofield et al. |
| 6,690,413 | B1 | 2/2004 | Moore |
| 6,690,438 | B2 | 2/2004 | Sekiguchi |
| 6,693,517 | B2 | 2/2004 | McCarthy et al. |
| 6,693,518 | B2 | 2/2004 | Kumata et al. |
| 6,693,519 | B2 | 2/2004 | Keirstead |
| 6,693,524 | B1 | 2/2004 | Payne |
| 6,700,692 | B2 * | 3/2004 | Tonar et al. .................... 359/265 |
| 6,709,136 | B2 | 3/2004 | Pastrick et al. |
| 6,713,783 | B1 | 3/2004 | Mase et al. |
| 6,717,109 | B1 | 4/2004 | Macher et al. |
| 6,717,610 | B1 | 4/2004 | Bos et al. |
| 6,717,712 | B2 | 4/2004 | Lynam et al. |
| 6,719,215 | B2 | 4/2004 | Droulliard |
| 6,724,446 | B2 | 4/2004 | Motomura et al. |
| 6,726,337 | B2 | 4/2004 | Whitehead et al. |
| 6,727,807 | B2 | 4/2004 | Trajkovic et al. |
| 6,727,808 | B1 | 4/2004 | Uselmann et al. |
| 6,727,844 | B1 | 4/2004 | Zimmermann et al. |
| 6,731,332 | B1 | 5/2004 | Yasui et al. |
| 6,734,807 | B2 | 5/2004 | King |
| 6,736,526 | B2 | 5/2004 | Matsuba et al. |
| 6,737,629 | B2 | 5/2004 | Nixon et al. |
| 6,737,630 | B2 | 5/2004 | Turnbull |
| 6,737,964 | B2 | 5/2004 | Samman et al. |
| 6,738,088 | B1 | 5/2004 | Uskolovsky et al. |
| 6,742,904 | B2 | 6/2004 | Bechtel et al. |
| 6,744,353 | B2 | 6/2004 | Sjönell |
| 6,746,775 | B1 | 6/2004 | Boire et al. |
| 6,747,716 | B2 | 6/2004 | Kuroiwa et al. |
| 6,748,211 | B1 | 6/2004 | Isaac et al. |
| 6,749,308 | B1 | 6/2004 | Niendorf et al. |
| 6,755,542 | B2 | 6/2004 | Bechtel et al. |
| 6,756,912 | B2 | 6/2004 | Skiver et al. |
| 6,757,039 | B2 | 6/2004 | Ma |
| 6,757,109 | B2 | 6/2004 | Bos |
| D493,131 | S | 7/2004 | Lawlor et al. |
| D493,394 | S | 7/2004 | Lawlor et al. |
| 6,759,113 | B1 | 7/2004 | Tang |
| 6,759,945 | B2 | 7/2004 | Richard |
| 6,760,157 | B1 | 7/2004 | Allen et al. |
| 6,773,116 | B2 | 8/2004 | De Vaan et al. |
| 6,774,356 | B2 | 8/2004 | Heslin et al. |
| 6,774,810 | B2 | 8/2004 | DeLine et al. |
| 6,778,904 | B2 | 8/2004 | Iwami et al. |
| 6,779,900 | B1 | 8/2004 | Nolan-Brown |
| 6,784,129 | B2 | 8/2004 | Seto et al. |
| 6,797,396 | B1 | 9/2004 | Liu et al. |
| 6,800,871 | B2 | 10/2004 | Matsuda et al. |
| 6,801,283 | B2 | 10/2004 | Koyama et al. |
| 6,805,474 | B2 | 10/2004 | Walser et al. |
| 6,806,452 | B2 | 10/2004 | Bos et al. |
| 6,806,922 | B2 | 10/2004 | Ishitaka |
| 6,810,323 | B1 | 10/2004 | Bullock et al. |
| 6,812,907 | B1 | 11/2004 | Gennetten et al. |
| 6,819,231 | B2 | 11/2004 | Berberich et al. |
| 6,824,281 | B2 | 11/2004 | Schofield et al. |
| 6,831,268 | B2 | 12/2004 | Bechtel et al. |
| 6,832,848 | B2 | 12/2004 | Pastrick |
| 6,834,969 | B2 | 12/2004 | Bade et al. |
| 6,836,725 | B2 | 12/2004 | Millington et al. |
| 6,842,276 | B2 | 1/2005 | Poll et al. |
| 6,845,805 | B1 | 1/2005 | Köster |
| 6,846,098 | B2 | 1/2005 | Bourdelais et al. |
| 6,847,424 | B2 | 1/2005 | Gotoh et al. |
| 6,847,487 | B2 | 1/2005 | Burgner |
| 6,848,817 | B2 | 2/2005 | Bos et al. |
| 6,849,165 | B2 | 2/2005 | Klöppel et al. |
| 6,853,491 | B1 | 2/2005 | Ruhle et al. |
| 6,861,789 | B2 | 3/2005 | Wei |
| 6,870,655 | B1 | 3/2005 | Northman et al. |
| 6,870,656 | B2 | 3/2005 | Tonar et al. |
| 6,871,982 | B2 | 3/2005 | Holman et al. |
| 6,877,888 | B2 | 4/2005 | DeLine et al. |
| 6,882,287 | B2 | 4/2005 | Schofield |
| 6,889,064 | B2 | 5/2005 | Baratono et al. |

| | | | | | | | |
|---|---|---|---|---|---|---|---|
| 6,891,563 | B2 | 5/2005 | Schofield et al. | 7,193,764 | B2 | 3/2007 | Lin et al. |
| 6,891,677 | B2 | 5/2005 | Nilsen et al. | 7,195,381 | B2 | 3/2007 | Lynam et al. |
| 6,902,284 | B2 | 6/2005 | Hutzel et al. | 7,199,767 | B2 | 4/2007 | Spero |
| 6,904,348 | B2 | 6/2005 | Drummond et al. | 7,206,697 | B2 | 4/2007 | Olney et al. |
| 6,906,632 | B2 | 6/2005 | DeLine et al. | 7,209,277 | B2 | 4/2007 | Tonar et al. |
| 6,909,486 | B2 | 6/2005 | Wang et al. | 7,215,238 | B2 | 5/2007 | Buck et al. |
| 6,910,779 | B2 | 6/2005 | Abel et al. | 7,215,473 | B2 | 5/2007 | Fleming |
| 6,912,396 | B2 | 6/2005 | Sziraki et al. | 7,221,363 | B2 | 5/2007 | Roberts et al. |
| 6,916,099 | B2 | 7/2005 | Su et al. | 7,224,324 | B2 | 5/2007 | Quist et al. |
| 6,922,902 | B2 | 8/2005 | Schierbeek et al. | 7,227,472 | B1 | 6/2007 | Roe |
| 6,928,180 | B2 | 8/2005 | Stam et al. | 7,230,523 | B2 | 6/2007 | Harter, Jr. et al. |
| 6,928,366 | B2 | 8/2005 | Ockerse et al. | 7,232,231 | B2 | 6/2007 | Shih |
| 6,930,737 | B2 | 8/2005 | Weindorf et al. | 7,233,304 | B1 | 6/2007 | Aratani et al. |
| 6,934,067 | B2 | 8/2005 | Ash et al. | 7,235,918 | B2 | 6/2007 | McCullough et al. |
| 6,946,978 | B2 | 9/2005 | Schofield | 7,241,030 | B2 | 7/2007 | Mok et al. |
| 6,947,576 | B2 | 9/2005 | Stam et al. | 7,241,037 | B2 | 7/2007 | Mathieu et al. |
| 6,947,577 | B2 | 9/2005 | Stam et al. | 7,245,207 | B1 | 7/2007 | Dayan et al. |
| 6,949,772 | B2 | 9/2005 | Shimizu et al. | 7,245,231 | B2 | 7/2007 | Kiefer et al. |
| 6,951,410 | B2 | 10/2005 | Parsons | 7,245,336 | B2 | 7/2007 | Hiyama et al. |
| 6,951,681 | B2 | 10/2005 | Hartley et al. | 7,248,305 | B2 | 7/2007 | Ootsuta et al. |
| 6,952,312 | B2 | 10/2005 | Weber et al. | 7,251,079 | B2 | 7/2007 | Capaldo et al. |
| 6,958,495 | B2 | 10/2005 | Nishijima et al. | 7,255,451 | B2 | 8/2007 | McCabe et al. |
| 6,958,683 | B2 | 10/2005 | Mills et al. | 7,255,465 | B2 | 8/2007 | DeLine et al. |
| 6,961,178 | B2 | 11/2005 | Sugino et al. | 7,259,036 | B2 | 8/2007 | Borland et al. |
| 6,963,438 | B2 | 11/2005 | Busscher et al. | 7,262,406 | B2 | 8/2007 | Heslin et al. |
| 6,968,273 | B2 | 11/2005 | Ockerse et al. | 7,262,916 | B2 | 8/2007 | Kao et al. |
| 6,972,888 | B2 | 12/2005 | Poll et al. | 7,265,342 | B2 | 9/2007 | Heslin et al. |
| 6,974,236 | B2 | 12/2005 | Tenmyo | 7,268,841 | B2 | 9/2007 | Kasajima et al. |
| 6,975,215 | B2 | 12/2005 | Schofield et al. | 7,269,327 | B2 | 9/2007 | Tang |
| 6,977,702 | B2 | 12/2005 | Wu | 7,269,328 | B2 | 9/2007 | Tang |
| 6,980,092 | B2 | 12/2005 | Turnbull et al. | 7,271,951 | B2 | 9/2007 | Weber et al. |
| 6,985,291 | B2 | 1/2006 | Watson et al. | 7,274,501 | B2 | 9/2007 | McCabe et al. |
| 6,992,718 | B1 | 1/2006 | Takahara | 7,281,491 | B2 | 10/2007 | Iwamaru |
| 7,001,058 | B2 | 2/2006 | Inditsky | 7,286,280 | B2 | 10/2007 | Whitehead et al. |
| 7,004,592 | B2 | 2/2006 | Varaprasad et al. | 7,287,868 | B2 | 10/2007 | Carter et al. |
| 7,004,593 | B2 | 2/2006 | Weller et al. | 7,289,037 | B2 | 10/2007 | Uken et al. |
| 7,006,173 | B1 | 2/2006 | Hiyama et al. | 7,290,919 | B2 | 11/2007 | Pan et al. |
| 7,009,751 | B2 | 3/2006 | Tonar et al. | 7,292,208 | B1 | 11/2007 | Park et al. |
| 7,012,543 | B2 | 3/2006 | DeLine et al. | 7,300,183 | B2 | 11/2007 | Kiyomoto et al. |
| 7,029,156 | B2 | 4/2006 | Suehiro et al. | 7,302,344 | B2 | 11/2007 | Olney et al. |
| 7,038,577 | B2 | 5/2006 | Pawlicki et al. | 7,308,341 | B2 | 12/2007 | Schofield et al. |
| 7,041,965 | B2 | 5/2006 | Heslin et al. | 7,310,177 | B2 | 12/2007 | McCabe et al. |
| 7,042,616 | B2 | 5/2006 | Tonar et al. | 7,311,428 | B2 | 12/2007 | DeLine et al. |
| 7,046,418 | B2 | 5/2006 | Lin et al. | 7,316,485 | B2 | 1/2008 | Roose |
| 7,046,448 | B2 | 5/2006 | Burgner | 7,317,386 | B2 | 1/2008 | Lengning et al. |
| 7,050,908 | B1 | 5/2006 | Schwartz et al. | 7,318,664 | B2 | 1/2008 | Hatanaka et al. |
| 7,057,681 | B2 | 6/2006 | Hinata et al. | 7,323,819 | B2 | 1/2008 | Hong et al. |
| 7,063,893 | B2 | 6/2006 | Hoffman | 7,324,043 | B2 | 1/2008 | Purden et al. |
| 7,064,882 | B2 | 6/2006 | Tonar et al. | 7,324,172 | B2 | 1/2008 | Yamazaki et al. |
| 7,074,486 | B2 | 7/2006 | Boire et al. | 7,324,174 | B2 | 1/2008 | Hafuka et al. |
| 7,081,810 | B2 | 7/2006 | Henderson et al. | 7,324,261 | B2 | 1/2008 | Tonar et al. |
| 7,092,052 | B2 | 8/2006 | Okamoto et al. | 7,327,225 | B2 | 2/2008 | Nicholas et al. |
| 7,095,567 | B2 | 8/2006 | Troxell et al. | 7,327,226 | B2 | 2/2008 | Turnbull et al. |
| 7,106,213 | B2 | 9/2006 | White | 7,327,855 | B1 | 2/2008 | Chen |
| 7,106,392 | B2 | 9/2006 | You | 7,328,103 | B2 | 2/2008 | McCarthy et al. |
| 7,108,409 | B2 | 9/2006 | DeLine et al. | 7,329,013 | B2 | 2/2008 | Blank et al. |
| 7,114,554 | B2 | 10/2006 | Bergman et al. | 7,329,850 | B2 | 2/2008 | Drummond et al. |
| 7,121,028 | B2 | 10/2006 | Shoen et al. | 7,331,415 | B2 | 2/2008 | Hawes et al. |
| 7,125,131 | B2 | 10/2006 | Olczak | 7,338,177 | B2 | 3/2008 | Lynam |
| 7,130,727 | B2 | 10/2006 | Liu et al. | 7,344,284 | B2 | 3/2008 | Lynam et al. |
| 7,132,064 | B2 | 11/2006 | Li et al. | 7,349,143 | B2 | 3/2008 | Tonar et al. |
| 7,136,091 | B2 | 11/2006 | Ichikawa et al. | 7,349,582 | B2 | 3/2008 | Takeda et al. |
| 7,138,974 | B2 | 11/2006 | Hirakata et al. | 7,355,524 | B2 | 4/2008 | Schofield |
| 7,149,613 | B2 | 12/2006 | Stam et al. | 7,360,932 | B2 | 4/2008 | Uken et al. |
| 7,151,515 | B2 | 12/2006 | Kim et al. | 7,362,505 | B2 | 4/2008 | Hikmet et al. |
| 7,151,997 | B2 | 12/2006 | Uhlmann et al. | 7,368,714 | B2 | 5/2008 | Remillard et al. |
| 7,153,588 | B2 | 12/2006 | McMan et al. | 7,370,983 | B2 | 5/2008 | DeWind et al. |
| 7,154,657 | B2 | 12/2006 | Poll et al. | 7,372,611 | B2 | 5/2008 | Tonar et al. |
| 7,158,881 | B2 | 1/2007 | McCarthy et al. | 7,375,895 | B2 | 5/2008 | Brynielsson |
| 7,160,017 | B2 | 1/2007 | Lee et al. | 7,379,224 | B2 | 5/2008 | Tonar et al. |
| 7,161,567 | B2 | 1/2007 | Homma et al. | 7,379,225 | B2 | 5/2008 | Tonar et al. |
| 7,167,796 | B2 | 1/2007 | Taylor et al. | 7,379,243 | B2 | 5/2008 | Horsten et al. |
| 7,168,830 | B2 | 1/2007 | Pastrick et al. | 7,379,814 | B2 | 5/2008 | Ockerse et al. |
| 7,175,291 | B1 | 2/2007 | Li | 7,379,817 | B1 | 5/2008 | Tyson et al. |
| 7,176,790 | B2 | 2/2007 | Yamazaki | 7,380,633 | B2 | 6/2008 | Shen et al. |
| 7,184,190 | B2 | 2/2007 | McCabe et al. | 7,389,171 | B2 | 6/2008 | Rupp |
| 7,185,995 | B2 | 3/2007 | Hatanaka et al. | 7,391,563 | B2 | 6/2008 | McCabe et al. |
| 7,187,498 | B2 | 3/2007 | Bengoechea et al. | 7,396,147 | B2 | 7/2008 | Munro |
| 7,188,963 | B2 | 3/2007 | Schofield et al. | 7,411,732 | B2 | 8/2008 | Kao et al. |

| Patent No. | Date | Inventor |
|---|---|---|
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,446,462 B2 | 11/2008 | Lim et al. |
| 7,446,650 B2 | 11/2008 | Scholfield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,947 B2 | 6/2009 | Varaprasad et al. |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,734,392 B2 | 6/2010 | Schofield et al. |
| 7,746,534 B2 | 6/2010 | Tonar et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,830,583 B2 | 11/2010 | Neuman et al. |
| 7,842,154 B2 | 11/2010 | Lynam |
| 7,864,399 B2 * | 1/2011 | McCabe et al. ............ 359/265 |
| 2001/0019356 A1 | 9/2001 | Takeda et al. |
| 2001/0022616 A1 | 9/2001 | Rademacher et al. |
| 2001/0026215 A1 | 10/2001 | Nakaho et al. |
| 2001/0026316 A1 | 10/2001 | Senatore |
| 2001/0030857 A1 | 10/2001 | Futhey et al. |
| 2001/0035853 A1 | 11/2001 | Hoelen et al. |
| 2001/0045981 A1 | 11/2001 | Gloger et al. |
| 2002/0036828 A1 | 3/2002 | Wong |
| 2002/0044065 A1 | 4/2002 | Quist et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2002/0196639 A1 | 12/2002 | Weidel |
| 2003/0002165 A1 | 1/2003 | Mathias et al. |
| 2003/0002179 A1 | 1/2003 | Roberts et al. |
| 2003/0007261 A1 | 1/2003 | Hutzel et al. |
| 2003/0016287 A1 | 1/2003 | Nakayama et al. |
| 2003/0016542 A1 | 1/2003 | Pastrick et al. |
| 2003/0025596 A1 | 2/2003 | Lang et al. |
| 2003/0030546 A1 | 2/2003 | Tseng |
| 2003/0030724 A1 | 2/2003 | Okamoto |
| 2003/0035050 A1 | 2/2003 | Mizusawa et al. |
| 2003/0043269 A1 | 3/2003 | Park |
| 2003/0043589 A1 | 3/2003 | Blank |
| 2003/0048639 A1 | 3/2003 | Boyd et al. |
| 2003/0052969 A1 | 3/2003 | Satoh et al. |
| 2003/0058338 A1 | 3/2003 | Kawauchi et al. |
| 2003/0069690 A1 | 4/2003 | Correia et al. |
| 2003/0080877 A1 | 5/2003 | Takagi et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0095331 A1 | 5/2003 | Bengoechea et al. |
| 2003/0098908 A1 | 5/2003 | Misaiji et al. |
| 2003/0101749 A1 | 6/2003 | Lingle et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0032655 A1 | 2/2004 | Kikuchi et al. |
| 2004/0032676 A1 | 2/2004 | Drummond et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |

| | | |
|---|---|---|
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0105614 A1 | 6/2004 | Kobayashi et al. |
| 2004/0107030 A1 | 6/2004 | Nishira et al. |
| 2004/0109060 A1 | 6/2004 | Ishii |
| 2004/0114039 A1 | 6/2004 | Ishikura |
| 2004/0170008 A1 | 9/2004 | Tenmyo |
| 2004/0202001 A1 | 10/2004 | Roberts et al. |
| 2004/0239243 A1 | 12/2004 | Roberts et al. |
| 2004/0239849 A1 | 12/2004 | Wang |
| 2004/0243303 A1 | 12/2004 | Padmanabhan |
| 2004/0264011 A1 | 12/2004 | Lynam |
| 2005/0018738 A1 | 1/2005 | Duan et al. |
| 2005/0024591 A1 | 2/2005 | Lian et al. |
| 2005/0024729 A1 | 2/2005 | Ockerse et al. |
| 2005/0078389 A1 | 4/2005 | Kulas et al. |
| 2005/0079326 A1 | 4/2005 | Varaprasad et al. |
| 2005/0099559 A1 | 5/2005 | Lee et al. |
| 2005/0099693 A1 | 5/2005 | Schofield et al. |
| 2005/0111070 A1 | 5/2005 | Lin et al. |
| 2005/0117095 A1 | 6/2005 | Ma |
| 2005/0134983 A1 | 6/2005 | Lynam |
| 2005/0140855 A1 | 6/2005 | Utsumi et al. |
| 2005/0168995 A1 | 8/2005 | Kittlemann et al. |
| 2005/0169003 A1 | 8/2005 | Lindahl et al. |
| 2005/0172504 A1 | 8/2005 | Ohm et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0164230 A1 | 7/2006 | DeWind et al. |
| 2006/0171704 A1 | 8/2006 | Bingle et al. |
| 2006/0187378 A1 | 8/2006 | Bong et al. |
| 2006/0274218 A1 | 12/2006 | Xue |
| 2006/0279522 A1 | 12/2006 | Kurihara |
| 2007/0041096 A1 | 2/2007 | Nieuwkerk et al. |
| 2007/0058257 A1 | 3/2007 | Lynam |
| 2007/0064108 A1 | 3/2007 | Haler |
| 2007/0080585 A1 | 4/2007 | Lyu |
| 2007/0118287 A1 | 5/2007 | Taylor et al. |
| 2007/0183037 A1 | 8/2007 | De Boer et al. |
| 2007/0183066 A1 | 8/2007 | Varaprasad et al. |
| 2007/0184284 A1 | 8/2007 | Varaprasad et al. |
| 2007/0201122 A1 | 8/2007 | Dozeman et al. |
| 2007/0262732 A1 | 11/2007 | Shen |
| 2008/0002106 A1 | 1/2008 | Van De Witte et al. |
| 2008/0030311 A1 | 2/2008 | Dayan et al. |
| 2008/0068520 A1 | 3/2008 | Minikey, Jr. et al. |
| 2008/0077882 A1 | 3/2008 | Kramer et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0212189 A1 | 9/2008 | Baur et al. |
| 2008/0225538 A1 | 9/2008 | Lynam et al. |
| 2008/0231704 A1 | 9/2008 | Schofield et al. |
| 2008/0266389 A1 | 10/2008 | DeWind et al. |
| 2008/0291522 A1 | 11/2008 | Varaprasad et al. |
| 2009/0002491 A1 | 1/2009 | Haler |
| 2009/0015736 A1 | 1/2009 | Weller et al. |
| 2009/0033837 A1 | 2/2009 | Molsen et al. |
| 2009/0040465 A1 | 2/2009 | Conner et al. |
| 2009/0040588 A1 | 2/2009 | Tonar et al. |
| 2009/0040778 A1 | 2/2009 | Takayanagi et al. |
| 2009/0052003 A1 | 2/2009 | Schofield et al. |
| 2009/0067032 A1 | 3/2009 | Varaprasad et al. |
| 2009/0080055 A1 | 3/2009 | Baur et al. |
| 2009/0085729 A1 | 4/2009 | Nakamura et al. |
| 2009/0096937 A1 | 4/2009 | Bauer et al. |
| 2009/0141331 A1 | 6/2009 | Skiver et al. |
| 2009/0174776 A1 | 7/2009 | Taylor et al. |
| 2009/0184904 A1 | 7/2009 | S. et al. |
| 2009/0201137 A1 | 8/2009 | Weller et al. |
| 2009/0219394 A1 | 9/2009 | Heslin et al. |
| 2009/0231741 A1 | 9/2009 | Weller et al. |
| 2009/0237820 A1 | 9/2009 | McCabe et al. |
| 2009/0243824 A1 | 10/2009 | Hook et al. |
| 2009/0244740 A1 | 10/2009 | Takayanagi et al. |
| 2009/0262192 A1 | 10/2009 | Schofield et al. |
| 2009/0262422 A1 | 10/2009 | Cross et al. |
| 2009/0290369 A1 | 11/2009 | Schofield et al. |
| 2009/0296190 A1 | 12/2009 | Anderson et al. |
| 2010/0033797 A1 | 2/2010 | Schofield et al. |
| 2010/0045790 A1 | 2/2010 | Lynam et al. |
| 2010/0045899 A1 | 2/2010 | Ockerse |
| 2010/0046059 A1 | 2/2010 | McCabe et al. |
| 2010/0053723 A1 | 3/2010 | Varaprasad et al. |
| 2010/0085645 A1 | 4/2010 | Skiver et al. |
| 2010/0091509 A1 | 4/2010 | DeLine et al. |
| 2010/0110523 A1 | 5/2010 | Varaprasad et al. |
| 2010/0110553 A1 | 5/2010 | Anderson et al. |
| 2010/0117815 A1 | 5/2010 | Deline et al. |
| 2010/0126030 A1 | 5/2010 | Weller et al. |
| 2010/0165437 A1 | 7/2010 | Tonar et al. |
| 2010/0172008 A1 | 7/2010 | McCabe et al. |
| 2010/0174485 A1 | 7/2010 | Taylor et al. |
| 2010/0194890 A1 | 8/2010 | Weller et al. |
| 2010/0195226 A1 | 8/2010 | Heslin et al. |
| 2010/0201896 A1 | 8/2010 | Ostreko et al. |
| 2010/0202075 A1 | 8/2010 | Blank et al. |
| 2010/0207013 A1 | 8/2010 | Drummond et al. |
| 2010/0214662 A1 | 8/2010 | Takayanagi et al. |
| 2010/0219985 A1 | 9/2010 | Schofield et al. |
| 2010/0222963 A1 | 9/2010 | Schofield et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2010/0289995 A1 | 11/2010 | Hwang et al. |
| 2011/0109746 A1 | 5/2011 | Schofield et al. |
| 2011/0141543 A1 | 6/2011 | Uken et al. |

FOREIGN PATENT DOCUMENTS

| | | |
|---|---|---|
| CN | 1189224 | 7/1998 |
| DE | 941408 | 4/1956 |
| DE | 944531 | 7/1956 |
| DE | 7323996 | 11/1973 |
| DE | 3248511 A1 | 7/1984 |
| DE | 3301945 | 7/1984 |
| DE | 3614882 | 11/1987 |
| DE | 3720848 | 1/1989 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |
| DE | 29902344 U1 | 7/1999 |
| DE | 19934999 | 2/2001 |
| DE | 19943355 | 3/2001 |
| DE | 20118868 | 3/2002 |
| DE | 10131459 | 1/2003 |
| EP | 0299509 A2 | 1/1989 |
| EP | 0513476 A1 | 11/1992 |
| EP | 0524766 | 1/1993 |
| EP | 0729864 A1 | 12/1995 |
| EP | 0728618 A2 | 8/1996 |
| EP | 0825477 | 2/1998 |
| EP | 0830985 | 3/1998 |
| EP | 0928723 A2 | 7/1999 |
| EP | 937601 A2 | 8/1999 |
| EP | 1075986 | 2/2001 |
| EP | 1097848 A | 5/2001 |
| EP | 1152285 A2 | 11/2001 |
| EP | 1193773 | 3/2002 |
| EP | 1256833 | 11/2002 |
| EP | 0899157 | 10/2004 |

| | | |
|---|---|---|
| EP | 1315639 | 2/2006 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2351055 A | 12/2000 |
| GB | 2362494 | 11/2001 |
| JP | 50-000638 A | 1/1975 |
| JP | 52-146988 | 11/1977 |
| JP | 55-039843 | 3/1980 |
| JP | 57-30639 | 2/1982 |
| JP | 57-208530 | 12/1982 |
| JP | 58-030729 | 2/1983 |
| JP | 58020954 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 62131232 | 6/1987 |
| JP | 63-02753 | 1/1988 |
| JP | 63085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01130578 | 5/1989 |
| JP | 02-122844 | 10/1990 |
| JP | 03-28947 | 3/1991 |
| JP | 03-052097 | 3/1991 |
| JP | 30-061192 | 3/1991 |
| JP | 328947 | 3/1991 |
| JP | 03-110855 | 5/1991 |
| JP | 03198026 | 8/1991 |
| JP | 03-243914 | 10/1991 |
| JP | 04-114587 | 4/1992 |
| JP | 04-245886 | 9/1992 |
| JP | 05080716 | 4/1993 |
| JP | 05183194 | 7/1993 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06318734 | 11/1994 |
| JP | 07146467 | 6/1995 |
| JP | 07-175035 | 7/1995 |
| JP | 07191311 | 7/1995 |
| JP | 07-266928 | 10/1995 |
| JP | 07-277072 | 10/1995 |
| JP | 07-281185 | 10/1995 |
| JP | 07267002 | 10/1995 |
| JP | 07281150 | 10/1995 |
| JP | 08-008083 | 1/1996 |
| JP | 08-083581 | 3/1996 |
| JP | 08-216789 | 8/1996 |
| JP | 08227769 | 9/1996 |
| JP | 09033886 | 2/1997 |
| JP | 09-260074 | 3/1997 |
| JP | 05-077657 | 7/1997 |
| JP | 09-220976 | 8/1997 |
| JP | 09230827 | 9/1997 |
| JP | 09-266078 | 10/1997 |
| JP | 09-288262 | 11/1997 |
| JP | 10-076880 | 3/1998 |
| JP | 10-199480 | 7/1998 |
| JP | 10190960 | 7/1998 |
| JP | 10-206643 | 8/1998 |
| JP | 10221692 | 8/1998 |
| JP | 10239659 | 9/1998 |
| JP | 10276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-222005 | 8/2001 |
| JP | 200272901 | 3/2002 |
| JP | 2002-120649 | 4/2002 |
| JP | 2002-122860 | 4/2002 |
| JP | 2002162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| JP | 2008083657 | 4/2008 |
| KR | 20060038856 | 5/2006 |
| KR | 100663930 | 1/2007 |
| WO | WO 82/02448 | 7/1982 |
| WO | W08606179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO03078941 | 9/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

G. Wang, D. Renshaw, P.B. Denyer and M. Lu, CMOS Video Cameras, article, 1991, 4 pages, University of Edinburgh, UK.

* cited by examiner

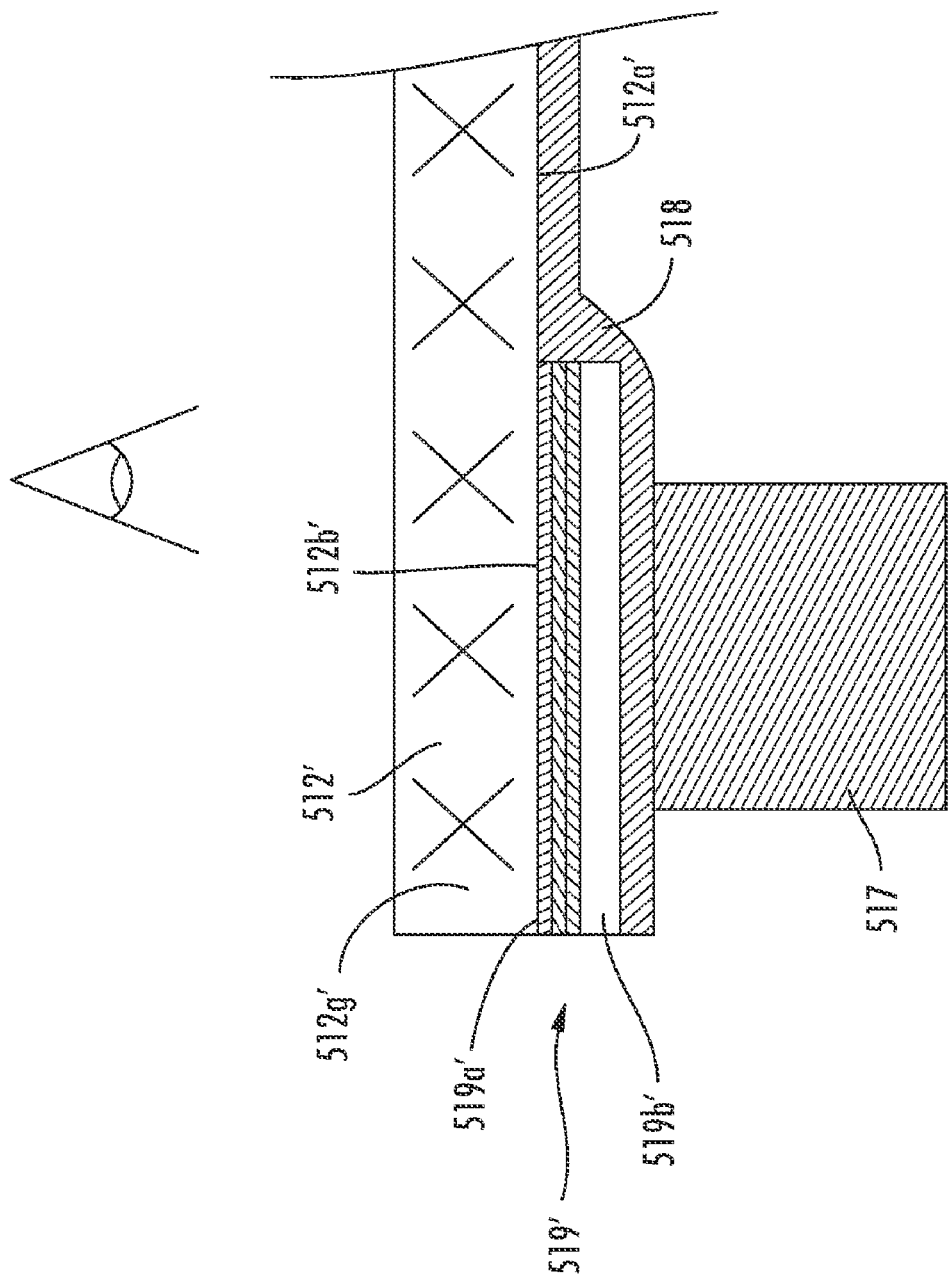

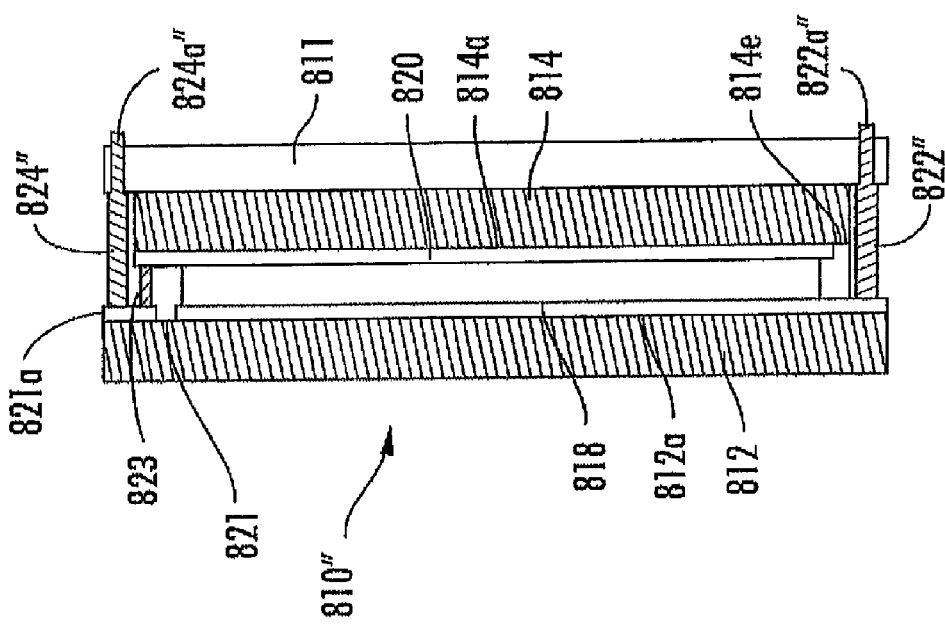
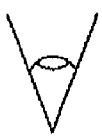
FIG. 29

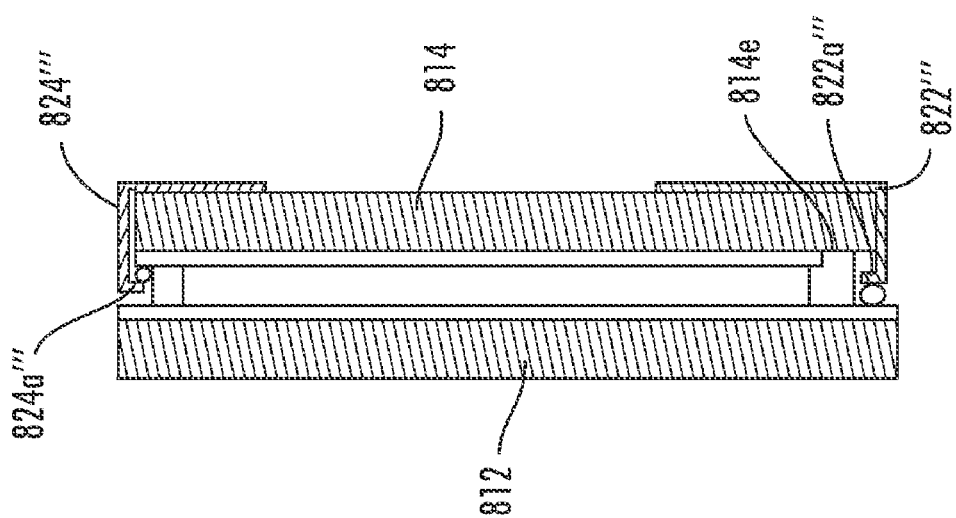
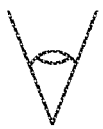
FIG. 31

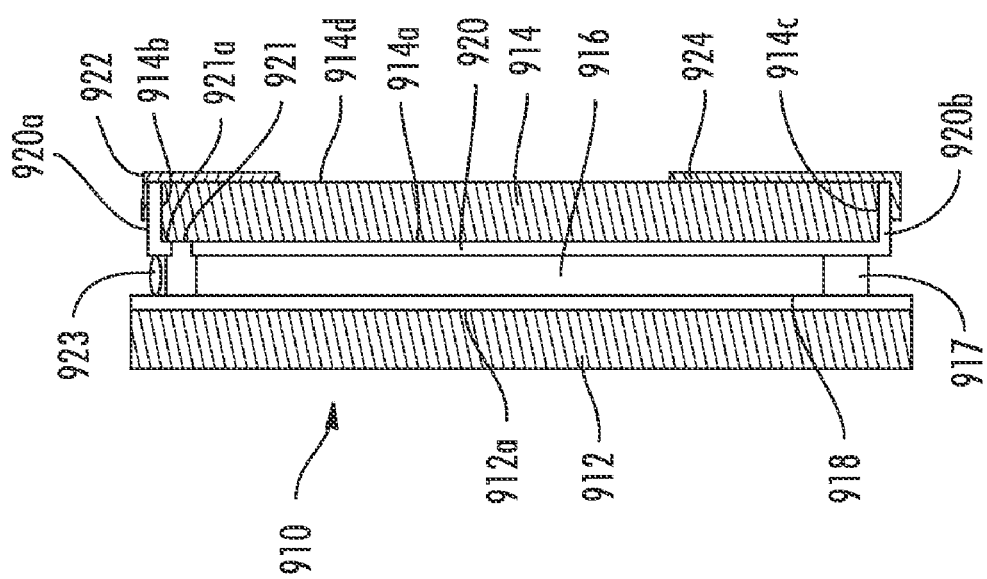
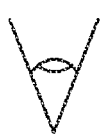
FIG. 32

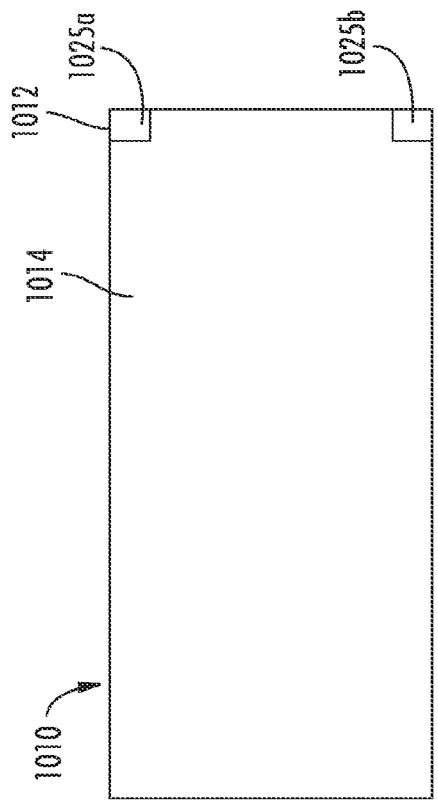
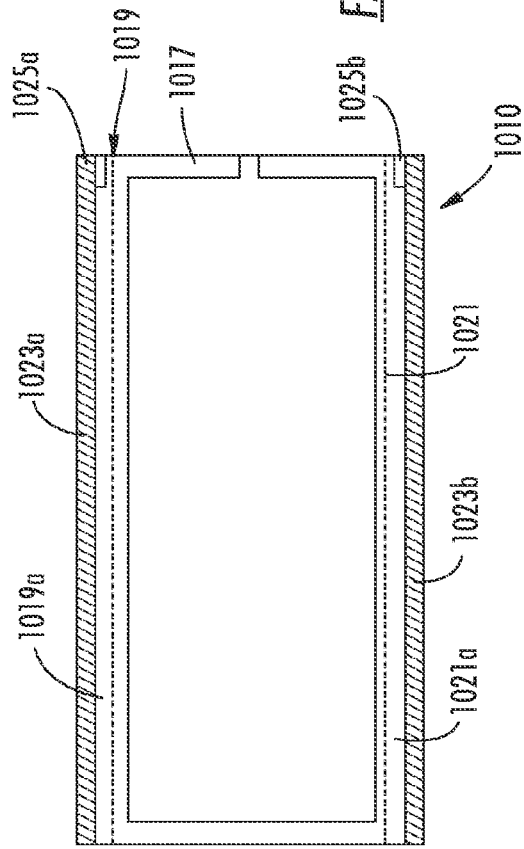
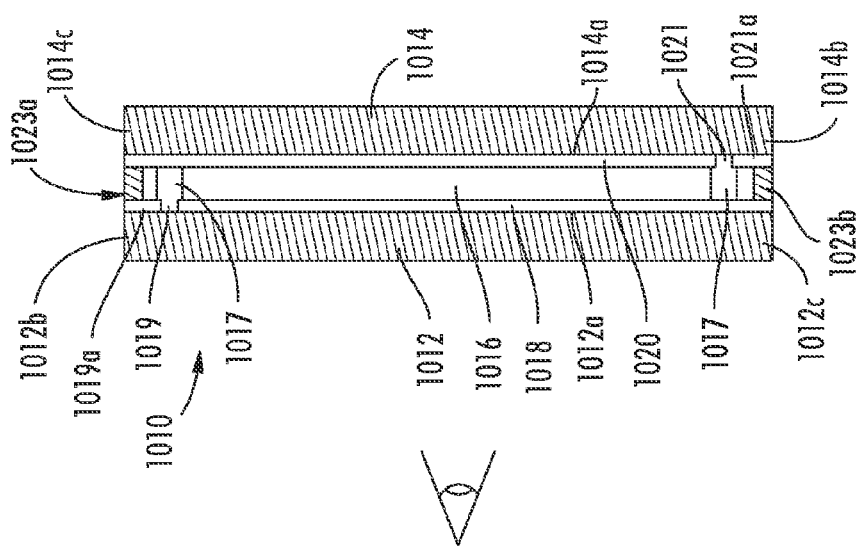

REFLECTIVE MIRROR ASSEMBLY

CROSS REFERENCE TO RELATED APPLICATIONS

The present application is a continuation of U.S. patent application Ser. No. 12/727,691, filed Mar. 19, 2010, now U.S. Pat. No. 7,864,399, which is continuation of U.S. patent application Ser. No. 12/429,620, filed Apr. 24, 2009, now U.S. Pat. No. 7,710,631, which is a continuation of U.S. patent application Ser. No. 11/956,893, filed Dec. 14, 2007, now U.S. Pat. No. 7,525,715, which is a continuation of U.S. patent application Ser. No. 11/709,625, filed Feb. 22, 2007, now U.S. Pat. No. 7,310,177, which is a continuation of U.S. patent application Ser. No. 10/533,762, filed May 4, 2005, now U.S. Pat. No. 7,184,190, which is a 371 application of PCT Application No. PCT/US2003/035381, filed Nov. 5, 2003, which claims priority of U.S. provisional applications, Ser. No. 60/490,111, filed Jul. 25, 2003, and Ser. No. 60/423,903, filed Nov. 5, 2002; and U.S. patent application Ser. No. 10/533,762 is a continuation-in-part of U.S. patent application Ser. No. 10/528,269, filed Mar. 17, 2005, now U.S. Pat. No. 7,274,501, which is a 371 application of PCT Application No. PCT/US2003/029776, filed Sep. 19, 2003, which claims priority of U.S. provisional applications, Ser. No. 60/412,275, filed Sep. 20, 2002; Ser. No. 60/424,116, filed Nov. 5, 2002; and Ser. No. 60/489,816, filed Jul. 24, 2003, which are all hereby incorporated herein by reference in their entireties.

FIELD OF THE INVENTION

The present invention relates to an electro-optic reflective element assembly for an electro-optic mirror assembly, such as an electrochromic interior or exterior rearview mirror assembly for a vehicle, and, more particularly, to an electro-optic rearview mirror assembly which includes an electro-optic reflective element assembly with a reduced bezel.

BACKGROUND OF THE INVENTION

Variable reflectivity mirror assemblies, such as electro-optic mirror assemblies, such as electrochromic mirror assemblies, are known and are widely implemented in vehicles. The reflective element assembly of such a mirror assembly often includes two substrates or glass elements with an electrochromic medium sandwiched therebetween. The back or outer surface of the second substrate (commonly referred to as the fourth surface of the reflective element assembly) may include a silvered coating to provide reflectance of an image. Each substrate is coated with at least one conductive or semi-conductive layer, which conduct electricity to the electrochromic medium from an electrical connector clipped or otherwise fastened or secured at least partially along an edge of the substrate and layer. An example of a known electrochromic reflective element assembly is shown in FIGS. 1 and 2. The reflective element includes an electrochromic (EC) medium layer 1 sandwiched between conductive layers 2 and a seal 7 at a front glass substrate 3 and a rear glass substrate 4 (and may include other conductive or semi-conductive layers). The substrates are offset so that an upper edge of one substrate and its conductive coating extends above the upper edge of the other substrate; while the lower edge of the other substrate and its conductive coating extends below the lower edge of the other substrate. This offset allows for electrical connection of electrical connectors or busbars 5 to the conductive coatings of each substrate, as shown in FIG. 2. The busbars or electrical connectors or clips extend substantially along the entire upper or lower edge of the respective substrate and coating. However, in order to manufacture the mirror element to obtain the desired offset, one or more offset or stepped spacers or pins 6 (shown in phantom in FIG. 2) must be placed along one of the upper and lower edges of the substrates to properly space the substrates from one another and to provide the offset along the edges when the substrates are placed in an assembly fixture.

As shown in FIG. 3, another conventional offset mirror element includes a coating on one of the substrates which provides a tab out portion 7 for connection of an electrical clip thereto. The substrates are offset in a similar manner as shown in the embodiment of FIGS. 1 and 2 to provide clearance at the tab out portion for the electrical connection. Such an embodiment also requires a stepped spacer or pin to provide the appropriate spacing between the substrates and to set the offset between the edges at the desired or appropriate amount.

Typically, it is desirable to minimize the size of the bezel or overlap of the casing/bezel (or even to eliminate the bezel) which extends around the reflective element of the mirror assembly. The bezel is typically required to extend over the front or first surface of the electrochromic cell or reflective element assembly to cover or hide or conceal, for example, the seal around the electrochromic medium of the electrochromic cell (that typically spaces the front substrate from the rear substrate, such as described in U.S. Pat. No. 6,002,511, which is hereby incorporated herein by reference), in order to conceal or hide the seal (and/or the electrical spring conductors, busbar conductors; clips, connectors and/or the like) which may otherwise be visible, particularly when the electrochromic medium is darkened. An exemplary and effective means for hiding the seal and, thus, minimizing the size of the bezel is disclosed in U.S. Pat. No. 5,066,112, which is hereby incorporated herein by reference. Also, and such as described in U.S. Pat. No. 6,449,082, which is hereby incorporated herein by reference, there is typically an offset to allow the clip or connector to connect to the cell or substrate that may influence the size of the overlap or bezel.

In cells or reflective element assemblies that may provide a small bezel or no bezel, it is often difficult to make electrical contact to the semi-conductive and/or conductive layers of the substrates with a restricted overhang between the substrates. A variety of methods have been used to provide electrical power to the semi-conductive and/or conductive layers of electrochromic cells, such as described in U.S. Pat. Nos. 5,066,112; 6,356,376; and 6,512,264, which are hereby incorporated herein by reference.

Therefore, there is a need in the art for an electrochromic mirror element which overcomes the above disadvantages and shortcomings of the prior art.

SUMMARY OF THE INVENTION

The present invention provides an electro-optic or electrochromic interior or exterior rearview mirror assembly which includes an electro-optic or electrochromic cell or reflective element assembly having a pair of substrates and an electro-optic or electrochromic medium disposed between the substrates. The reflective element assembly may include electrical connectors for providing electrical current to the conductive and/or semi-conductive layers or coatings at the surfaces of the substrates opposing the electro-optic medium. The electrical connectors may connect to the substrates at or behind an overhang region of the front substrate such that the connectors are substantially not viewable through the front substrate. The electrical connectors may be electrically isolated from one another and may connect to one of the substrates and may provide electrical current to the respective substrates. One edge or side of each of the substrates of the reflective element assembly may be in flush alignment, while allowing for electrical connection to one of the substrates along the generally flush edges.

According to an aspect of the present invention, a reflective element assembly for a mirror system of a vehicle includes front and rear substrates with an electro-optic medium sandwiched therebetween, a non-conductive seal disposed around a perimeter of the electro-optic medium and between the front and rear substrates, and first and second electrical connectors. The rear substrate has a smaller dimension across a dimension of the rear substrate than a corresponding dimension across the front substrate such that the front substrate defines a first overhang region at a first edge of the front substrate that extends beyond a corresponding first edge of the rear substrate. The front substrate has a first surface and a second surface opposite the first surface. The second surface faces the electro-optic medium. The front substrate has at least one first conductive layer disposed on the second surface. The rear substrate has a third surface and a fourth surface opposite the third surface. The third surface faces the electro-optic medium. The rear substrate has at least one second conductive layer disposed on the third surface. The second conductive layer includes a tab portion that extends at least to a second edge of the rear substrate. The rear substrate includes a non-conductive raceway proximate the second edge and devoid of the second conductive layer except at the tab portion. The non-conductive seal encompasses at least a portion of the second conductive layer and at least a portion of the raceway. The first electrical connector is in electrical connection with the first conductive layer and the second electrical connector is in electrical connection with the tab portion of the second conductive layer. The first electrical connector connects to the first conductive layer at the first overhang region so as to be behind the front substrate and substantially not viewable through the first surface of the front substrate.

The front substrate may include a hiding or concealing layer at the perimeter portions to substantially hide the connectors and seal from view by the driver of the vehicle.

According to another aspect of the present invention, a reflective element assembly for a mirror system for a vehicle includes front and rear substrates with an electro-optic medium sandwiched therebetween, a non-conductive seal disposed around a perimeter of the electro-optic medium and between the front and rear substrates, and first and second electrical connectors. The rear substrate has a smaller dimension across a dimension of the rear substrate than a corresponding dimension across the front substrate such that the front substrate defines a first overhang region at a first edge of the front substrate that extends beyond a corresponding first edge of the rear substrate. The front substrate has a first surface and a second surface opposite the first surface. The second surface faces the electro-optic medium. The front substrate has at least one first conductive layer disposed on the second surface. The rear substrate has a third surface and a fourth surface opposite the third surface. The third surface faces the electro-optic medium. The third surface of the rear substrate has a non-conductive portion proximate the first edge and devoid of the second conductive layer. The non-conductive seal encompasses at least a portion of the non-conductive portion of the rear substrate. The first electrical connector is in electrical connection with the first conductive layer and the second electrical connector is in electrical connection with the second conductive layer. The first electrical connector extends from the fourth surface of the second substrate and over at least a portion of the first edge of the second substrate and toward the first overhang region of the front substrate. The first electrical connector connects to the first conductive surface at the first overhang region so as to be behind the front substrate and substantially not viewable through the first surface of the front substrate. The non-conductive seal and the non-conductive portion substantially electrically isolate the first electrical connector from the second conductive layer.

According to another aspect of the present invention, an electro-optic or electrochromic mirror element includes a pair of substrates and an electro-optic or electrochromic medium sandwiched therebetween. Each of the pair of substrates includes at least one conductive or semi-conductive layer disposed thereon. The pair of substrates are positioned relative to one another such that the upper and/or lower edges of the substrates are substantially flush or aligned with one another. One of the substrates includes a relief area along the aligned edge to provide clearance for electrical connection to the conductive layer or layers of the other substrate along the aligned edge.

According to another aspect of the present invention, an electro-optic or electrochromic mirror assembly for a vehicle comprises an electro-optic or electrochromic reflective element assembly comprising a first substrate having first and second surfaces and a second substrate having third and fourth surfaces. The first and second substrates are arranged so that the second surface opposes the third surface with an electro-optic or electrochromic medium disposed therebetween. The first substrate has at least one at least partially conductive coating or layer on the second surface and the second substrate has at least one at least partially conductive coating or layer on the third surface. The first and second substrates are positioned relative to one another such that at least a portion of a first edge of the first substrate is generally flush or aligned with a corresponding edge of the second substrate. The first edge of the first substrate has a relief area formed therealong, wherein the relief area provides clearance for electrical connection to the corresponding edge of the second substrate.

In one form, the conductive coating of the second substrate includes a tab out portion at the corresponding edge. The relief area of the first substrate provides clearance for electrical connection to the tab out portion of the at least one conductive coating or layer. The first substrate may be the front substrate and the second substrate may be the rear substrate, with the aligned or generally flush edges being along the upper edges of the substrates.

Therefore, the present invention provides an electro-optic or electrochromic cell or mirror reflective element assembly that provides an overhang region at least one edge of the front substrate for electrical connection to the conductive layer at the rear surface of the substrate, such that the electrical connection is not viewable through the front surface of the front substrate. The present invention thus may provide a reflective element assembly that is suitable for use in a bezeless mirror assembly, where the front surface of the reflective element is substantially entirely viewable by a driver of the vehicle. Optionally, a reflective element assembly of the present invention may provide a flush alignment of an upper and/or lower edge of a pair of substrates, while providing clearance for electrical connection to the upper and/or lower edges of one of the substrates and the respective conductive coating. The present invention thus provides enhanced assembly processes for the mirror element, since the substrates may be aligned with one another within an assembly fixture and do not require stepped pins or spacers positioned along one edge to provide sufficient offset or staggering between the substrates to provide clearance for electrical connection to one of the substrates along the aligned or flush edge thereof.

These and other objects, advantages, purposes, and features of the present invention will become apparent from the study of the following description in conjunction with the drawings.

BRIEF DESCRIPTION OF THE DRAWINGS

FIG. 5 is a sectional view of the reflective element assembly taken along the line V-V in FIG. 4, showing the clearance provided for electrical connection to each substrate;

FIG. 6 is a sectional view of the reflective element assembly taken along the line VI-VI in FIG. 4, showing the flush alignment of the upper edge of the substrates;

FIG. 20 is another enlarged sectional view of a front substrate having a border perimeter coating in accordance with the present invention;

FIG. 29 is a sectional view of another electro-optic reflective element assembly in accordance with the present invention;

FIG. 31 is a sectional view of another electro-optic reflective element assembly in accordance with the present invention;

FIG. 32 is a sectional view of another electro-optic reflective element assembly in accordance with the present invention;

FIG. 33A is a sectional view of another electro-optic reflective element assembly in accordance with the present invention;

FIGS. 33B and 33C are plan views of the reflective element assembly of FIG. 33A;

DESCRIPTION OF THE PREFERRED EMBODIMENTS

Figure 1:
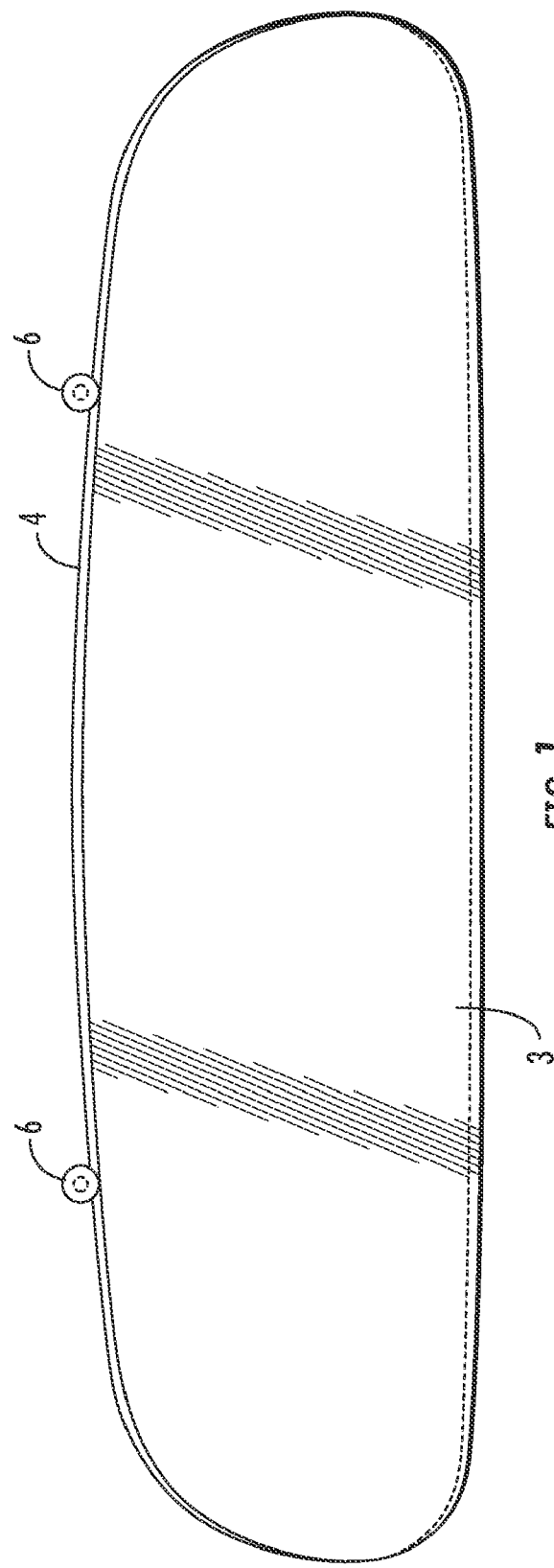
FIG. 1 is a plan view of a conventional electrochromic mirror element, showing a typical offset orientation of the two substrates.
Figure 2:
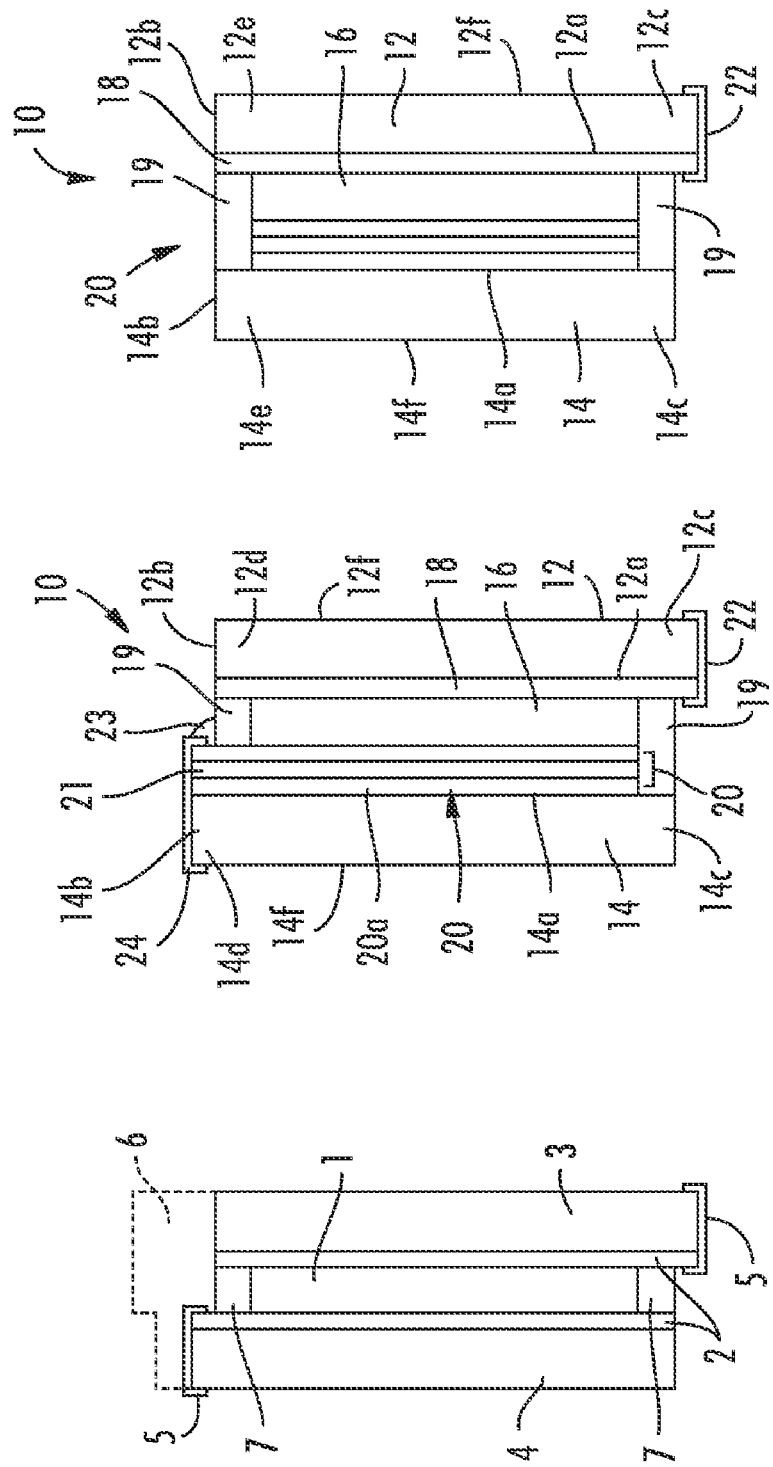
FIG. 2 is a sectional view of a conventional electrochromic mirror element, showing a conventional spacer for use in manufacturing of the conventional mirror element.
Figure 3:
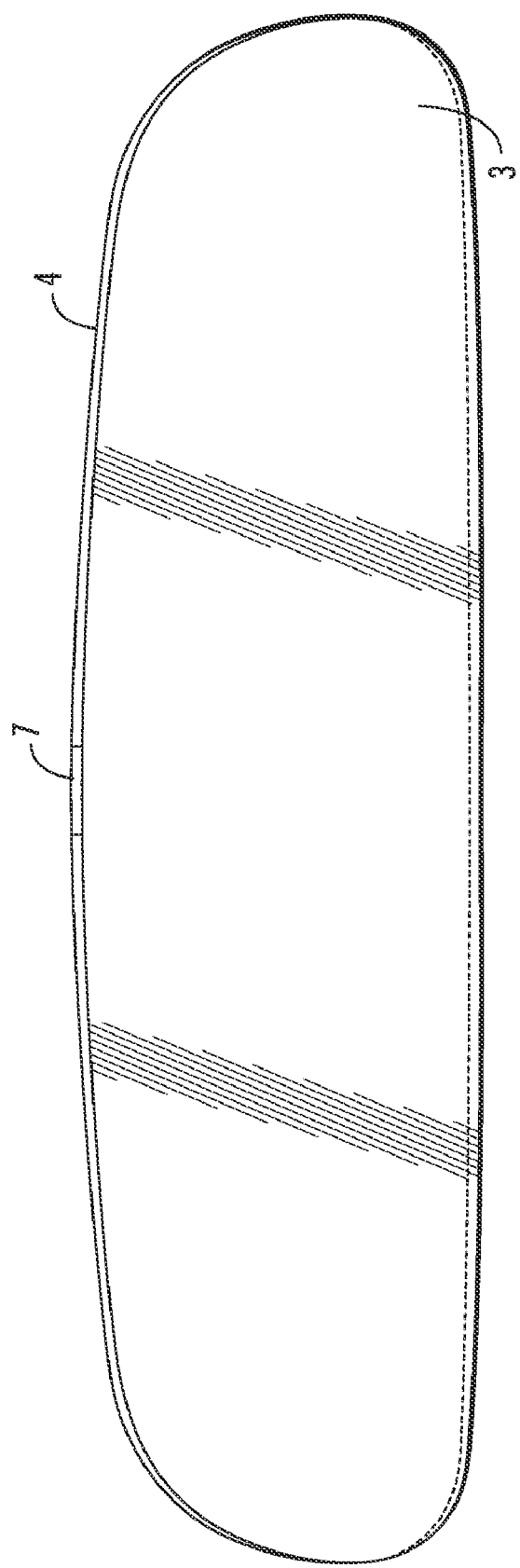
FIG. 3 is a plan view of another conventional electrochromic mirror element similar to FIG. 1, with a tab out portion for electrical connection with a conductive or semi-conductive layer on one of the substrates.
Figure 4:
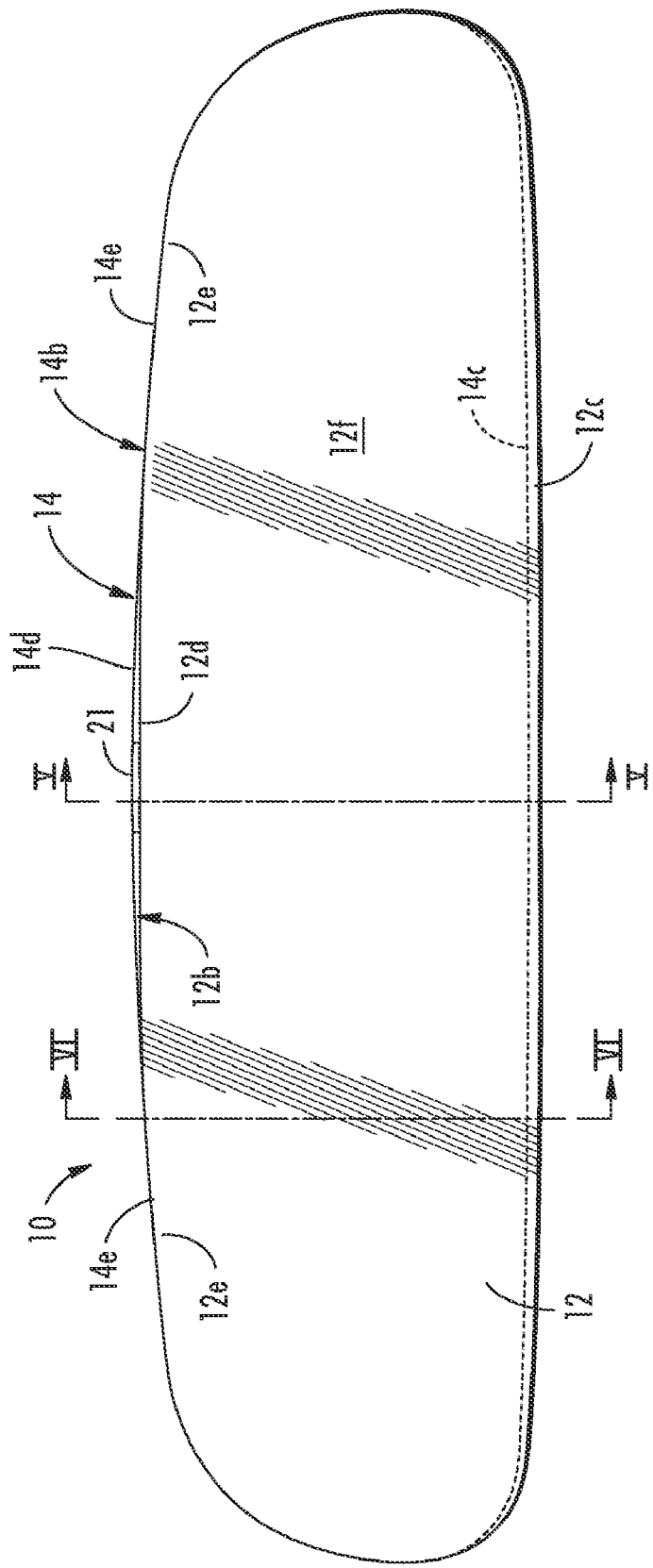
FIG. 4 is a plan view of an electro-optic reflective element assembly of the present invention.

Referring now to the drawings and the illustrative embodiments depicted therein, an electro-optic or electrochromic cell or mirror element assembly or reflective element assembly 10 for an interior rearview mirror assembly of a vehicle (not shown) includes first and second glass substrates 12, 14 and an electro-optic or electrochromic medium 16 disposed or sandwiched therebetween (FIGS. 4-6). Electrochromic medium 16 and at least one metallic and/or non-metallic conductive or semi-conductive layers 18, 20 are disposed on the inner surfaces 12a, 14a of substrates 12, 14 and between the electrochromic medium 16 and the respective substrate 12, 14. At least one of the edges or sides 12b, 14b of the substrates 12, 14 are generally aligned with or flush with one another (as seen in FIGS. 4 and 6) at least along a portion of the edges. The reflective element or mirror element of the present invention is equally suitable for interior or exterior rearview mirror assemblies for vehicles or for other mirror assemblies, without affecting the scope of the present invention.

Electrochromic mirror element assembly 10 comprises a first or front substantially transparent substrate 12 and a second or rear substantially transparent substrate 14 (which may be glass substrates or the like). The substrates are generally elongated along a longitudinal axis and define upper and lower edges and generally curved opposite side or end edges. Although shown and described as a reflective element assembly for an interior rearview mirror assembly or system, the reflective element assembly may be formed to be suitable for other mirror assemblies or systems, such as for an exterior rearview mirror assembly of a vehicle or the like.

The first substrate 12 of reflective element assembly 10 includes one or more electrically conductive or semi-conductive layers 18 (shown in FIGS. 5 and 6 and a single layer), such as a tin oxide or indium tin oxide (ITO) or any other transparent electrically semi-conductive layer or coating or the like (such as indium cerium oxide (ICO), indium tungsten oxide (IWO), indium oxide (IO) layers or the like, or a zinc oxide layer or coating, or a zinc oxide coating or the like doped with aluminum or other metallic materials, such as silver or gold or the like, or other oxides doped with a suitable metallic material or the like), deposited on an inward surface 12a of first substrate 12 (i.e., the second surface 12a of the mirror element assembly 10). As shown in FIGS. 5 and 6, coating 18 may extend substantially up to and along a lower edge 12c of substrate 12 and may be electrically connected to a clip or busbar 22 extending along edge 12c to provide electricity to coating or layer 18.

Rear or second substrate 14 includes at least one layer or coating of metallic conductive (such as a layer of silver, aluminum or an alloy of silver or an alloy of aluminum or other metal or metal alloy) or non-metallic semi-conductive material (such as an ITO layer or the like) 20 disposed on a forward or third surface 14a of rear substrate 14 (shown in FIGS. 5 and 6 as three layers). The layers or coatings may be selected to provide sufficient reflectance of the mirror element and may provide a desired transmissivity if the mirror element includes a display at the fourth surface of the rear substrate, as discussed below. Optionally, the layers or coatings may define reflective and conductive layers or stacks of the types described in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference. Such a stack of layers comprises a metallic layer sandwiched between two semi-conductive layers (both of which preferably are the same material, but either of which can be different from the other). As shown in FIGS. 4 and 5, at least one layer 20a is deposited directly on surface 14a of substrate 14 and includes a tab out portion 21 extending toward and substantially up to edge 14b at a generally central region 14d thereof. An electrical clip 24 is connected to tab out portion 21 to provide electricity to the layer or layers 20 on substrate 14. The outer perimeter portion of rear substrate 14 is masked during the coating process such that the coatings or layers 20 do not cover surface 14a at the outer perimeter portions except at tab out portion 21.

As can be seen in FIGS. 5 and 6, the first and second substrates 12, 14 are positioned in spaced-apart relationship with one another with an electro-optic or electrochromic medium 16 disposed between semi-conductive layer or layers 18 and semi-conductive layer or layers 20. A non-conductive seal 19 is positioned around the perimeter of the electrochromic medium 16 and around the perimeter of the semi-conductive layer 20 except at the tab out portion 21. The electrochromic medium 16 changes color or darkens in response to electricity or voltage applied to or through the semi-conductive layers 18 and 20 at either side of the electrochromic medium. The electrochromic medium 16 disposed between the front and rear substrates 12, 14 may be a solid polymer matrix electrochromic medium, such as is disclosed in U.S. Pat. No. 6,154,306, which is hereby incorporated by reference herein, or other suitable medium, such as a liquid or solid medium or thin film or the like, such as the types disclosed in U.S. patent application Ser. No. 09/793,002, filed Feb. 26, 2001 by Schofield et al. for VIDEO MIRROR SYSTEMS INCORPORATING AN ACCESSORY MODULE, now U.S. Pat. No. 6,690,268, and/or in U.S. Pat. Nos. 5,668,663 and 5,724,187, the entire disclosures of which are hereby incorporated by reference herein, without affecting the scope of the present invention. The electrochromic mirror element assembly may utilize the principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 or 4,712,879, which are hereby incorporated herein by reference, or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein, and in U.S. patent application Ser. No. 09/793,002, filed Feb. 26, 2001 by Schofield et al. for VIDEO MIRROR SYSTEMS INCORPORATING AN ACCESSORY MODULE, now U.S. Pat. No. 6,690,268, which is hereby incorporated herein by reference. Mirror element assembly 10 may also include a seal (not shown) positioned around the outer portions of the layers 18, 20 and the electrochromic medium 16 to seal the layers and avoid corrosion of the metallic layer or layers.

During operation, a voltage may be applied to mirror element assembly 10 via busbars or clips or electrical connectors 22, 24 positioned around and engaging at least a portion of an outer edge of the semi-conductive layers 18, 20 (FIG. 5). The connectors may be connected to an appropriate power source or circuitry or control or the like, such as to a circuit board or the like at the rear of the electrochromic cell or reflective element assembly. Optionally, the circuitry may be applied to the rear surface of the rear substrate utilizing the principles described in U.S. provisional application Ser. No. 60/508,086, filed Oct. 2, 2003 by Schofield for MIRROR REFLECTIVE ELEMENT ASSEMBLY INCLUDING ELECTRONIC COMPONENT, which is hereby incorporated herein by reference.

The voltage applied by connectors 22, 24 is bled from semi-conductive layers 18, 20 to the electrochromic medium 16. Preferably, the layers provide for reduced resistance through the layers, which provides for faster, more uniform coloration of the electrochromic medium 16, since the electrons applied via busbars 24 at semi-conductive layer 20a may bleed through the other semi-conductive layers 20 faster due to the enhanced conductivity in the conductive layers 20. Preferably, the layers 20 provide a sheet resistance of less than approximately 10 ohms per square, more preferably less than approximately 5 ohms per square, and most preferably less than approximately 2 ohms per square. Desirably, and particularly for larger area mirrors, the sheet resistance is less than approximately 1 ohm per square, such as in the range of approximately 0.1 to 0.7 ohms per square.

In order to provide enhanced performance of the electrochromic mirror element, each of the layers of the combination or stack of layers may have substantial conductivity and none of the layers significantly retard electron/electrical conductivity from one layer to the other throughout the stack, and, thus, do not impede the flow of electrons into the electrochromic (EC) medium. In this regard, it is desirable that one or more of the metallic layers comprises a metallic material (which is preferably a highly reflective material, such as silver or silver alloys or the like) having a specific resistivity of preferably less than approximately $5 \times 10^{-5}$ ohm·cm, more preferably less than approximately $1 \times 10^{-5}$ ohm·cm, and most preferably less than approximately $5 \times 10^{-6}$ ohm·cm. Preferably, such a highly conductive metallic layer or layers is/are sandwiched between two non-metallic, partially conductive layers, preferably formed of a non-metallic material (such as a semi-conducting oxide, such as indium oxide, tungsten oxide, tin oxide, doped tin oxide or the like) having a specific resistivity of less than approximately $1 \times 10^{-2}$ ohm·cm, more preferably less than approximately $1 \times 10^{-3}$ ohm·cm, and most preferably less than approximately $5 \times 10^{-4}$ ohm·cm, such as disclosed in PCT application No. PCT/US03/29776, filed Sep. 19, 2003 by Donnelly Corporation et al, for MIRROR REFLECTIVE ELEMENT ASSEMBLY, published Apr. 1, 2004 as International Publication No. WO 2004/026633 A2, which is hereby incorporated herein by reference.

In the illustrated embodiment of FIGS. 4-6, semi-conductive layers 18, 20a are deposited on the inward surfaces 12a, 14a of the respective substrates 12, 14. The semi-conductive layer 18, 20a may be deposited on the glass or substrate 12, 14 via any suitable process. The particular thickness of the conductive layers may vary depending on the particular application of mirror element 10. Optionally, the semi-conductive layer 20a on rear substrate 14 need not be transparent and may comprise a chromium layer or the like. However, the semi-conductive layer 20a may comprise a generally transparent semi-conductive layer of coating, such as a tin oxide layer, an indium tin oxide (ITO) layer or the like, without affecting the scope of the present invention.

The transparent semi-conductive non-metallic layers on rear substrate 14 preferably comprise non-metallic transparent electrically conductive or semi-conductive materials, such as tin oxide, indium oxide, indium cerium oxide, indium tungsten oxide, nickel oxide, tungsten oxide, indium tin oxide, half-wave indium tin oxide, full wave indium tin oxide, doped tin oxides, such as antimony-doped tin oxide and fluorine-doped tin oxide, doped zinc oxides, such as antimony-doped zinc oxide and aluminum-doped zinc oxide and/or the like.

The metallic layer or layers on rear substrate 14 comprise a thin film or layer of metal, such as silver, aluminum, or alloys thereof, or the like, with a selected thickness to provide sufficient reflectivity and/or transmissivity, depending on the application of the mirror element and whether the mirror element includes a display, such as a display-on-demand or display-on-need type of display or the like, as discussed below. Preferably, the selected metallic material comprises silver, but may otherwise comprise a material selected from aluminum, silver alloys, aluminum alloys (such as 6061 or 1100 aluminum alloys or the like), manganese, chromium or rhodium, or any other metallic material which is sufficiently reflective and/or transmissive at a selected thickness, without affecting the scope of the present invention.

In a preferred embodiment, the semi-conductive layers 18, 20a comprise indium tin oxide (ITO) and are deposited onto the surfaces 12a, 14a of the respective substrate 12, 14 via a hot deposition process, which may involve, for example, sputter deposition onto a heated substrate, with the heated substrate often being heated to a temperature of greater than about 200° C., sometimes greater than 300° C., as is known in the art. The combination of the semi-conductive layers 18, 20a on the substrates 12, 14 defines a conductive substrate which may be used for various embodiments of a mirror element in accordance with the present invention.

The other semi-conductive layers and metallic layers of the layers 20 on rear substrate 14 (or other layers on front substrate 12) may be deposited onto semi-conductive layer 20a via a cold deposition process, such as sputter coating or the like, onto an unheated substrate. Preferably, each of the layers 20 is deposited on second substrate 14 by a sputter deposition process. More particularly, the substrate 14 (including the semi-conductive layer 20a already deposited thereon) may be positioned in one or more sputter deposition chambers with either planar or rotary magnetron targets, and with deposition of the layers being achieved by either reactive deposition of an oxide coating by sputtering from a metal target (or from a conductive, pressed oxide target) in an oxygen-rich atmosphere, or by DC sputtering from an oxide target, such as an indium oxide (IO), indium tungsten oxide (IWO), indium tin oxide (ITO) or indium cerium oxide (ICO) target or the like, such as described in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference. However, other processes for applying or depositing layers of conductive material or layers and metallic material or layers may be implemented, without affecting the scope of the present invention.

The rear substrate 14 is masked substantially around the outer region of surface 14a during the deposition process, such that the semi-conductive and/or conductive layer or layers 20 is/are not deposited in the masked outer region. However, substrate 14 is not masked over the entire outer edge or region of substrate 14, in order to allow deposition of the layer or layers at a particular un-masked area, such that a tab-out portion or area 21 is formed in the layer or layers 20. The tab out area 21 facilitates electrical connection of connector 24 with the conductive layers 20.

As shown in FIG. 4, the upper edge 12b of first or front substrate 12 is formed to have a flattened area or relief area 12d along a generally central region thereof. The relief area 12d may be formed by cutting the glass substrate along the edge 12b. The relief area 12d allows the upper edge 12b along the outer or side regions 12e to generally align with the outer or side regions 14e of upper edge 14b of rear substrate 14, while providing clearance at the center region 14d of rear substrate 14 for the electrical connector or clip 24 to clip onto rear substrate 14 and coatings or layers 20. The relief area 12d also forms a pocket that helps to contain the silicone material 23 (such as Shin-Etsu 3421 or the like) which protects the tab out portion 21. As can be seen in FIG. 4, front substrate 12 is slightly larger than rear substrate 14, such that when the outer or side regions 12e, 14e of upper edges 12b, 14b are aligned, the lower edge 12c of front substrate 12 extends downward below the lower edge 14c of rear substrate 14, to provide for connection of the busbar 22 along lower edge 12c of front substrate 12.

Because the relief area 12d along upper edge 12b of front substrate 12 provides clearance for electrical connection to the other substrate 14, while also allowing for substantially flush alignment of the upper edges 12b, 14b of the substrates 12, 14, the present invention provides for enhanced assembly processes for assembling the mirror element and obviates the need for a stepped or offset spacer or pin. During assembly of the mirror element assembly 10, the substrates 12, 14 may be placed in a fixture with the outer regions 12e, 14e of the upper edges 12b, 14b of both substrates abutting a wall of the fixture. The wall of the fixture thus aligns the upper edges of the substrates, and a stepped pin or the like is not necessary to provide the appropriate offset or clearance for the electrical connections to each substrate. This eases the assembly process, since stepped pins do not have to be carefully placed at the appropriate places along the edges, of the substrates to achieve the desired offset or clearance. Uniform pins may be placed between the substrates to provide the appropriate spacing or separation gap between the substrates during assembly.

Although shown and described as being generally aligned along the upper edges, the lower edges may alternately be aligned in a similar manner, without affecting the scope of the present invention. It is further envisioned that a similar relief area may be formed at both the upper edge of one substrate and the lower edge of the other substrate, such that both the upper and lower edges may be generally flush or aligned with one another, while providing clearance for electrical connection to both substrates and their respective conductive or semi-conductive layer or layers.

Optionally, the first (outermost) surface 12f of front substrate 12 may be coated with an anti-wetting property, such as via a hydrophilic coating (or stack of coatings), such as is disclosed in U.S. Pat. Nos. 6,193,378; 5,854,708; 6,071,606 and 6,013,372, the entire disclosures of which are hereby incorporated by reference herein. Also, the first (outermost) surface 12f of front substrate 12 may be optionally coated with an anti-wetting property, such as via a hydrophobic coating (or stack of coatings), such as is disclosed in U.S. Pat. No. 5,724,187, the entire disclosure of which is hereby incorporated by reference herein. Such a hydrophobic property on the first/outermost surface of the electrochromic mirror reflective elements (and on the first/outermost surface of a non-electrochromic mirror, non-electro-optical, conventional reflective elements) can be achieved by a variety of means such as by use of organic and inorganic coatings utilizing a silicone moiety (for example, a urethane incorporating silicone moieties) or by utilizing diamond-like carbon coatings. For example, long-term stable water-repellent and oil-repellent ultra-hydrophobic coatings, such as described in PCT International Publication Nos. WO0192179 and WO0162682, the entire disclosures of which are hereby incorporated by reference herein, can be disposed on the first (outermost) surface 12f of front substrate 12. Such ultra-hydrophobic layers comprise a nano structured surface covered with a hydrophobic agent which is supplied by an underlying replenishment layer (such as is described in Classen et al., "Towards a True "Non-Clean" Property: Highly Durable Ultra-Hydrophobic Coating for Optical Applications", ECC 2002 "Smart Coatings" Proceedings, 2002, 181-190, the entire disclosure of which is hereby incorporated by reference herein).

Figure 7:
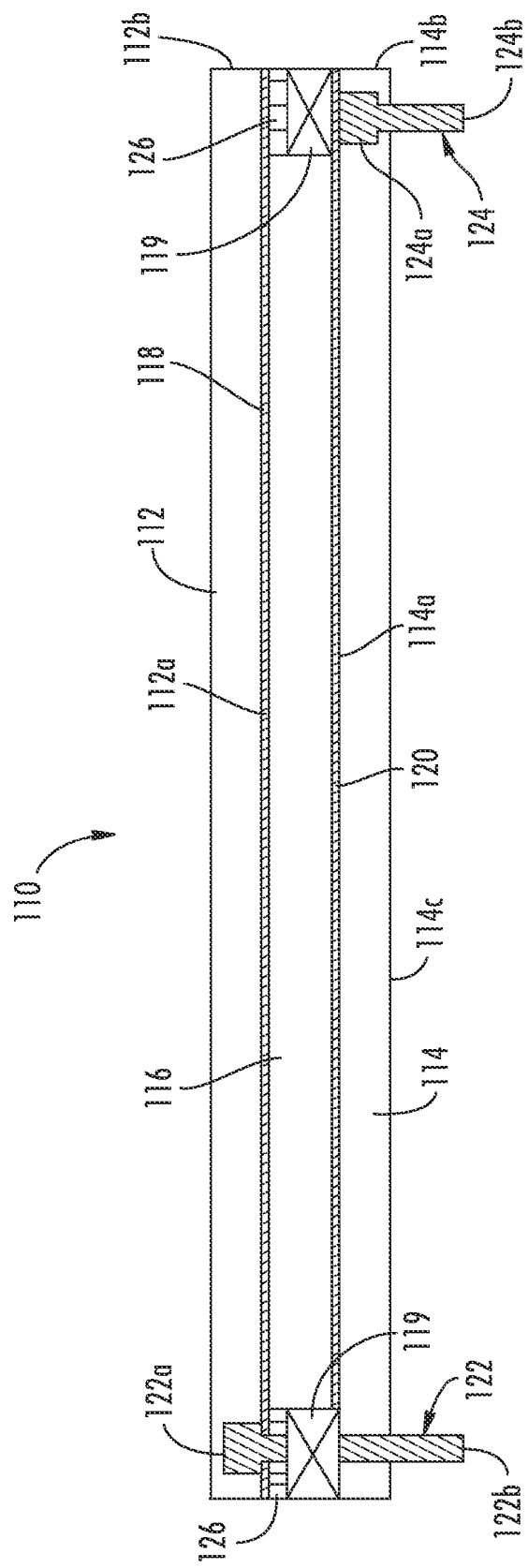
FIG. 7 is a sectional view of a generally flush electro-optic reflective element assembly in accordance with the present invention, with electrically conducting pins providing the electrical connection to the appropriate semi-conductive layer of the substrates of the reflective element assembly.

Referring now to FIG. 7, an electro-optic or electrochromic cell or reflective element assembly 110 for a rearview mirror assembly of a vehicle includes a first or front substrate 112 and a second or rear substrate 114 (which typically are made of glass, but may comprise a polymeric material or the like), with an electrochromic medium 116 disposed or sandwiched therebetween. The front substrate 112 includes a non-metallic, transparent semi-conductive layer 118 (such as indium tin oxide (ITO), doped tin oxide or the like, such as described in U.S. Pat. No. 6,002,511, which is hereby incorporated herein by reference) disposed on the rear or second surface 112a, while the second or rear substrate 114 includes one or more metallic and/or non-metallic conductive or semi-conductive layers 120 (such as silver, silver alloy or other metal or metal alloy or the like) disposed on the front or inwardly facing or third surface 114a of rear substrate 114. The electrochromic medium 116 is sandwiched between the semi-conductive or conductive layers 118, 120, and is contained therein via a seal 119 positioned around the perimeter of the electrochromic medium 116. The conductive or semi-conductive layers 118, 120, electrochromic medium 116 and seal 119 may be substantially similar to the layers, electrochromic medium and seal of mirror assembly 10, discussed above, such that a detailed description of these items need not be repeated herein.

As can be seen with reference to FIG. 7, reflective element assembly 110 may comprise a generally flush cell or reflective element assembly, with at least some of the perimeter edges 112b, 114b of the substrates 112, 114 being generally flush or aligned with one another. Electrical current may be applied to each of the semi-conductive or conductive layers 118, 120 via a respective pin or connecting member 122, 124 that contacts the respective semi-conductive or conductive layer and extends rearwardly out the back or fourth surface 114c of the rear substrate 114 for electrical connection to an appropriate power source or circuitry or control or the like at the rear of the electrochromic cell or reflective element assembly.

The first pin or connecting member 122 may be attached to the first or front substrate 112, such as by counter sinking a head 122a of pin 122 into the rear surface 112a of front substrate 112, such that a body or shaft portion 122b of pin 122 extends rearward therefrom. The pin 122 thus may contact (or may be contacted by) the semi-conductive layer or coating 118 on the second surface 112a of front substrate 112 to make the electrical connection thereto. The pin may be countersunk in the rear surface 112a of front substrate 112 prior to depositing or applying the semi-conductive layer 118 to the rear surface 112a of the substrate 112. The substrate and pin assembly may then be placed in a vacuum deposition chamber/apparatus, such as a sputter deposition chamber or the like, to have the semi-conductive coating 118 deposited on both the surface 112a of substrate 112 and on at least a portion of the pin 122 itself. Such an approach provides an effective electrical connection between the pin and the semi-conductive coating because the coating is also deposited on and contacts the electrical connector or pin.

As can be see in FIG. 7, the pin 122 may be countersunk within the rear surface 112a of the front substrate 112 such that the head 122a of the pin 122 is within the glass substrate and generally flush with the surface 112 of the substrate. A metallic layer or coating or busbar 126 may be applied around the perimeter region or surface of the substrate 112 to enhance the electrical connection between the pin and the outer perimeter portion of the semi-conductive layer 118. The metallic layer or coating 126 may comprise an opaque metallic layer to conceal or hide the seal 119 and electrical connectors and the like, so as to reduce the size of the bezel overhang which may otherwise be needed to provide the desired appearance of the perimeter edges of the mirror assembly. Optionally, the perimeter coating 126 may comprise a chromium oxide (often referred to as "black chrome") or other metal or metal oxide or metal compound that is dark, such as black, and thus effectively hides or conceals the seal, connectors and the like, thereby obviating the need for a bezel around the perimeter of the reflective element assembly. The shaft portion 122b of pin 122 may then extend through the seal and through a hole or aperture in the rear substrate 114. As can be seen in FIG. 7, the conductive coating 120 may not extend to the area where the pin 122 passes through rear substrate 114, such that a non-conductive glass surface or area or region 115 may be defined at the perimeter region of the surface 114a of rear substrate 114. The non-conductive seal 119 may partially or substantially fill or encompass the non-conductive area 115, such that the non-conductive area 115 and non-conductive seal 119 electrically isolate or insulate the pin 122 from conductive layer 120 of rear substrate 114.

Similar to pin 122, pin 124 may be countersunk within the front or third surface 114a of rear substrate 114, such that the head 124a of pin 124 is generally flush with the third surface 114a of the substrate. After the pin is countersunk within the rear substrate 114, the third surface 114a of the substrate may be coated with the semi-conductive layer or layers, such that the semi-conductive layer 120 coats or contacts the head 124a of pin 124 and makes electrical contact therewith. The shaft or body portion 124b of pin 124 may extend through a hole or opening through substrate 114 and rearwardly from the substrate or cell for electrical connection to the appropriate power source or circuitry or control or the like at the rear of the reflective element assembly. As can be seen in FIG. 7, the front or third surface 114a of rear substrate 114 may be masked during coating of the third surface in the area of the first pin 122, such that the conductive and/or semi-conductive coatings or layers 120 are not applied to or deposited on the surface 114a in the region where shaft 122b of pin 122 extends through substrate 114. This substantially precludes the possibility that pin 122 may come in contact with both semi-conductive layers 118, 120, which may short the electrochromic cell or reflective element assembly.

The pin connectors of the electrochromic cell or reflective element assembly of the present invention thus may facilitate a flush electrochromic cell or reflective element assembly, because no clips or busbars are required around the outside of the perimeter edges of the substrates to contact the semi-conductive and/or conductive layers of the substrates. Optionally, a perimeter coating, which may be substantially opaque and may be conductive or semi-conductive, may be applied along the perimeter regions or border of the semi-conductive layer of the first or front substrate, in order to mask or hide or conceal the seal and connectors and the like to enhance the aesthetic appearance of the electrochromic reflective element assembly and to minimize the size or overhang of the bezel of the mirror assembly. The perimeter coating or layer may be of the type disclosed in U.S. Pat. No. 5,066,112, which is hereby incorporated herein by reference, or may be any other type perimeter coating which may provide the desired result or appearance.

Figure 8:
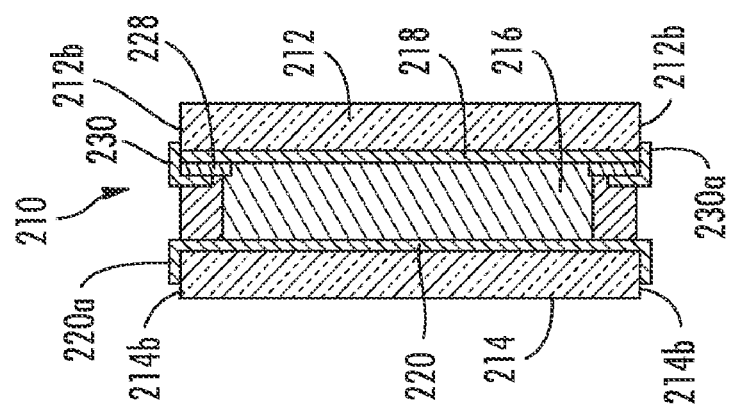
FIG. 8 is a sectional view of another electro-optic reflective element assembly in accordance with the present invention.

Referring now to FIG. 8, an electrochromic cell or reflective element assembly 210 comprises a flush or generally flush electrochromic reflective element assembly and includes a front substrate 212 having an semi-conductive coating or layer 218, and a rear substrate 214 having a conductive and/or semi-conductive coating 220, with an electrochromic medium 216 disposed or sandwiched between the conductive or semi-conductive layers 218, 220. An opaque or darkened or substantially opaquifying or hiding or concealing or light absorbing perimeter coating 228 may be applied around the perimeter region or surface of the semi-conductive coating 218 of front substrate 212 to mask or hide or conceal the seal 219 of the electrochromic reflective element assembly 210. Perimeter coating 228 may comprise a black or darkened or opaque coating (such as a substantially opaque or dark, such as black, coating or layer) and may be conductive (such as a metallic electric conductive layer or element) or a combined opaquifying or dark or black non-conductive layer closest to the substrate surface and a conductive layer on the opaquifying layer. The perimeter coating may provide a class A appearance (i.e. a surface readily viewable by a user of the vehicle and thus required to be aesthetically and functionally acceptable) and may comprise a black ink or the like that may provide a substantially uniform hiding and concealing layer which may be applied via an inkjet or screen print process or the like. If a non-conductive opaque layer (such as paint or ink or the like) is used on the substrate surface, it is desirable to apply a conductive layer (such as a conductive tape or coating or the like) overt the opaque layer. Optionally, the opaquifying layer may comprise a chrome oxide (sometimes referred to as "black chrome"), which may be substantially dark on the surface, and may be coated with a substantially pure metal or chrome (such as discussed below with respect to FIG. 20) to provide a conductive layer or raceway along the substrate. Preferably, the opaquifying conductive coating or layer comprises a silver and aluminum alloy, but may comprise other dark colored (preferably black) conductive inks and/or adhesives based on silver and/or silver alloys, such as an electrically conductive black epoxy, such as EPO-TEK H32E or EPO-TEK H32C, both of which are available from Epoxy Technology of Billerica, Mass. It is further envisioned that other colors (other than black) may be used for perimeter coatings an busbar hiding coatings to match the color of the mirror case or to match other desired colors or shades or the like.

A metallic or conducting connector layer 230 may be applied or disposed or positioned around the perimeter region of the perimeter coating 228 and may be folded or wrapped around to at least partially cover the perimeter edges 212b of the substrate 212 so that an outer or edge portion 230a may extend partially along the outer perimeter edge 212b of the substrate and may be in contact with the semi-conductive layers on the surface 212a of substrate 212. As shown in FIG.

8, an outer or edge portion 220a of the conductive layers 220 of rear substrate 214 may also extend around or wrap around the outer perimeter edges 214b of rear substrate 214.

The outer or edge portions 230a of the metallic layer 230 and the outer or edge portions 220a of the layers or layers 220 of rear substrate 214 thus may provide for electrical contact to the conductive layers of the substrate substantially around the perimeter of the electrochromic cell or reflective element assembly, without requiring overlap or offset between the cells, such as for known or conventional clips and busbars. The metallic layer 230 and conductive layers 220 thus may provide an electrical raceway around at least a portion of the reflective element to enhance electrical flow along the substrates to enhance the performance of the mirror cell. Optionally, the metallic layer 230 may be substantially hidden by the Class A type appearance of the opaque layer 228, such that the mirror cell or reflective element assembly may minimize the size of any bezel associated with the mirror assembly, while providing an aesthetically pleasing mirror reflective element and mirror assembly. The reflective element assembly of the present invention thus may provide a minimum bezel size or no bezel mirror cell or reflective element assembly.

Figure 9:
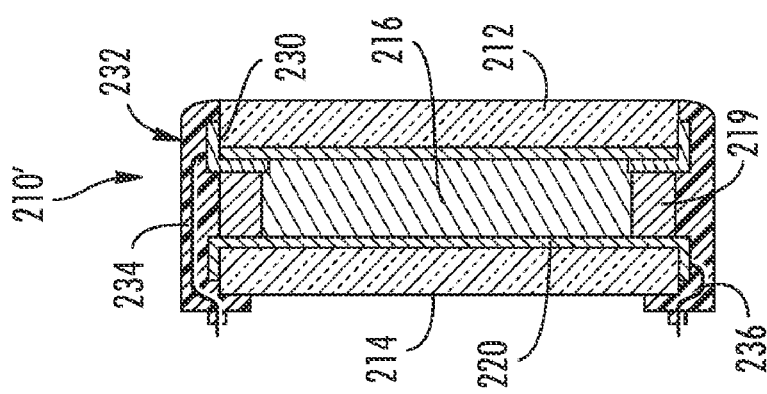
FIG. 9 is a sectional view of another flush electro-optic reflective element assembly in accordance with the present invention, with an extruded wraparound connector for providing electrical contact to the semi-conductive layers of the substrates of the reflective element assembly.

With reference to FIG. 9, an electrochromic cell or reflective element assembly 210' may be substantially similar to the electrochromic cell or reflective element assembly 210 shown in FIG. 8, and may include an outer wraparound connector 232, which may wrap around the perimeter of the reflective element assembly and provides for electrical contact between the metallic contacts or layers 230, 220 and the appropriate power source, circuitry or control or the like. In the illustrated embodiment, wraparound connector 232 comprises an extruded flexible member which includes a wire connector 234. The wire connector 234 extends along and through the wraparound connector 232 and connects to the metallic connector 230, and may connect at the other end to the appropriate power source, circuitry or control or the like. Wraparound connector 232 also includes a second wire connector 236 which extends through the wraparound connector 232 and may connect the conductive and/or semi-conductive layers 220 of the rear substrate 214 to the appropriate power supply, circuitry or control or the like. The extruded wraparound connector 232 may be formed with the wires positioned or inserted therein and extending or protruding partially from an appropriate location or locations along the wraparound connector so as to make a strong electrical connection or contact with the respective member or layer when the wraparound connector 232 is wrapped around and secured to the reflective element assembly 210'.

Figure 10:
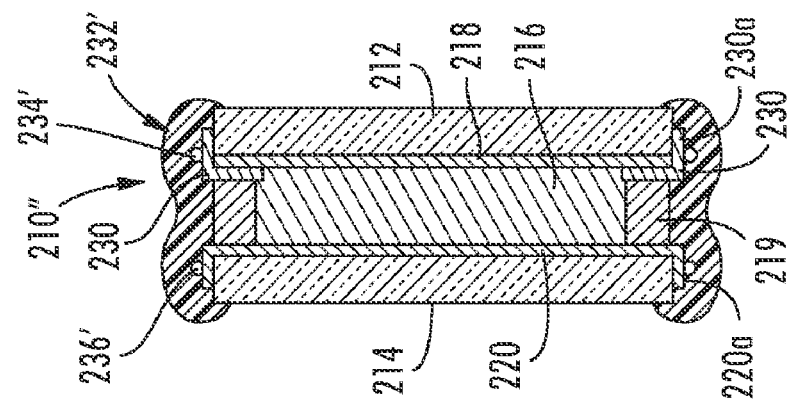
FIG. 10 is a sectional view of another electro-optic reflective element assembly similar to the reflective element assembly of FIG. 9.

Similarly, as shown in FIG. 10, a wraparound connector 232' may include a pair of electrical wires or metallic members 234', 236' extending therealong and partially protruding from an inner surface of the extruded wraparound connector 232'. One of the wires or members 234' may partially protrude along the inner surface of the connector to contact the outer or edge portion 230a of the metallic layer or connector 230 to make electrical connection thereto at least partially or substantially around the perimeter of the front substrate 212 of the electrochromic cell or reflective element assembly 210". Likewise, the other wire or metallic member 236' may protrude partially from the extruded wraparound connector 232' to contact the outer or edge portion 220a of the layer or layers 220 along the outer perimeter edge of the rear substrate 214 to make electrical connection thereto at least partially or substantially around the perimeter edge or edges of the rear substrate. One or more electrical wires or connectors may extend through the wrap around connector 232' to contact the appropriate one of the wires or metallic members 234', 236', in order to provide electrical connection to between the wires 234', 236' and the appropriate power source, circuitry or control or the like at the rear of the reflective element assembly.

Although shown as having a single perimeter electrical connector or layer 230 along the second surface of the front substrate 212, the reflective element assemblies 210', 210" may optionally include a substantially opaque Class A layer between the connectors 230 and semi-conductive layer 218, such as described above with respect to the reflective element assembly 210 of FIG. 8. Optionally, the electrical connectors 230 may comprise an opaque conductive material and may provide a black or opaque appearance to hide or conceal the seal 219 and connectors of the reflective element assemblies, such as via utilizing principles disclosed in U.S. Pat. No. 5,066,112, which is hereby incorporated herein by reference.

Figure 11:
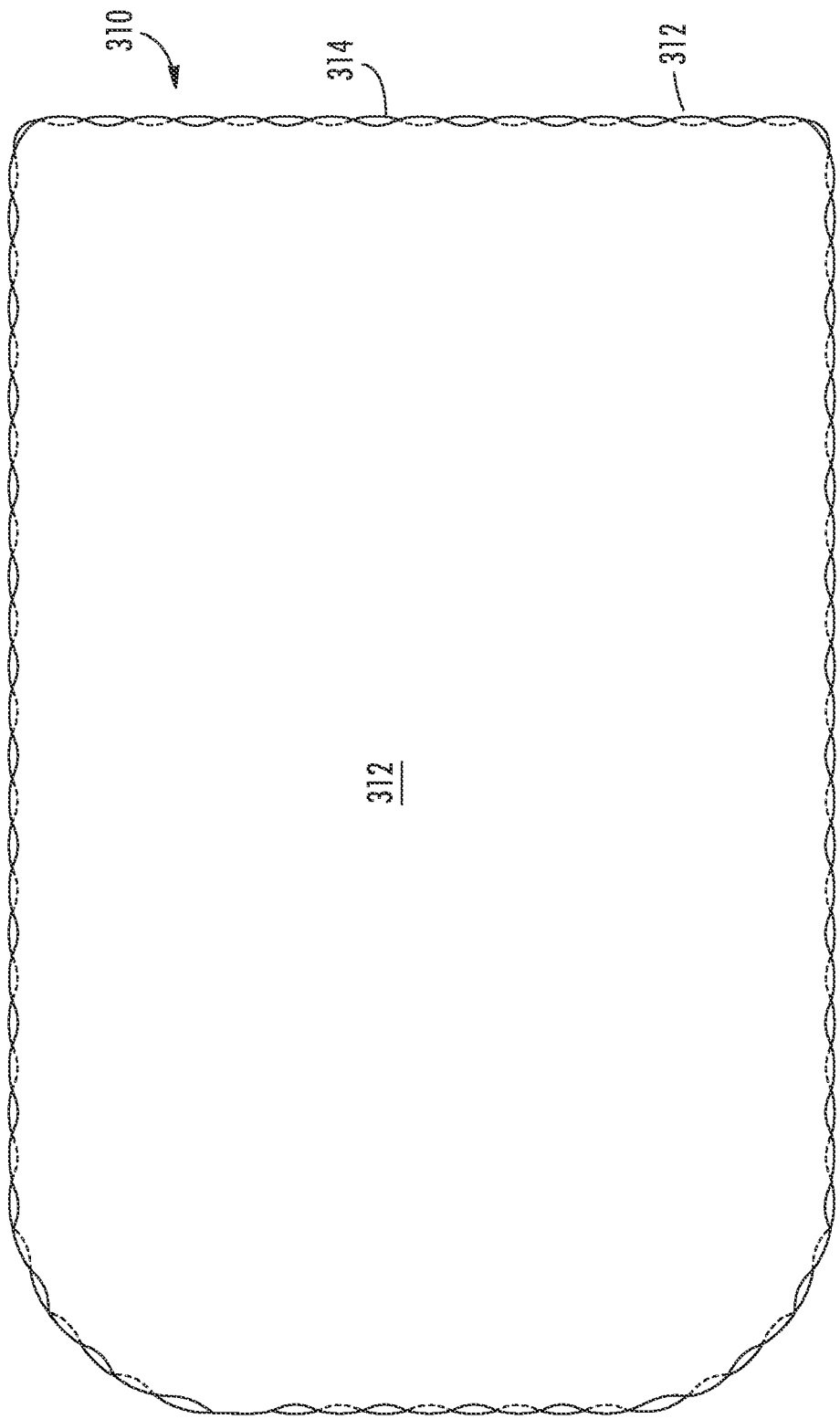
FIG. 11 is a plan view of a generally flush electro-optic reflective element assembly for an exterior rearview mirror assembly in accordance with the present invention, with the substrates cut in generally opposite wave patterns to facilitate electrical connection to the respective semi-conductive layers of the substrates.
Figure 12:
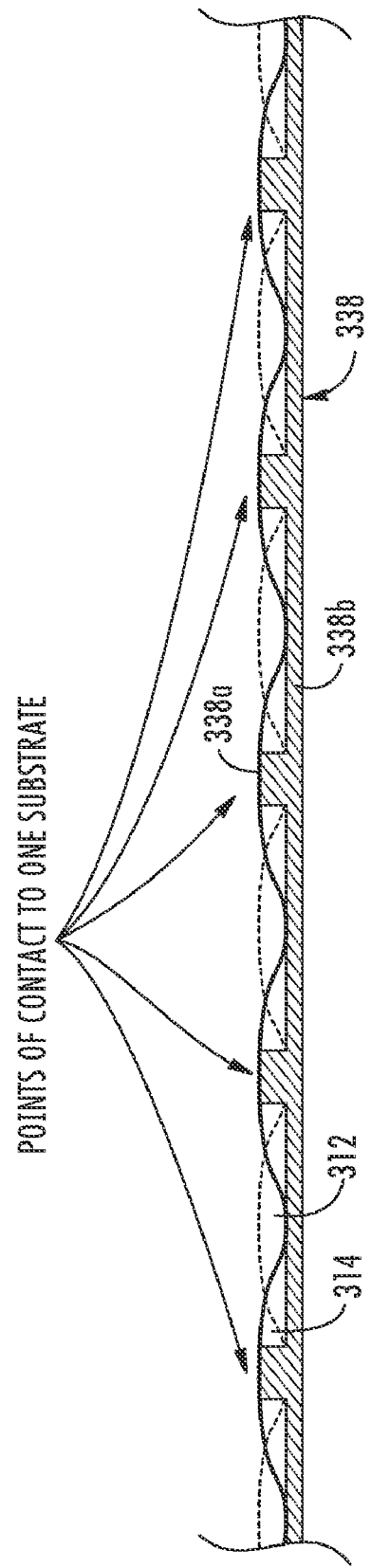
FIG. 12 is an enlarged plan view of a portion of the reflective element assembly of FIG. 11, with an electrical connector connecting to the exposed portion or wave peaks of an edge of one of the substrates of the reflective element assembly.

Referring now to FIGS. 11 and 12, a flush electro-optic or electrochromic cell or reflective element assembly 310 for an exterior rearview mirror assembly of a vehicle comprises a front substrate 312 and a rear substrate 314. The reflective element assembly 310 also includes semi-conductive and/or conductive layers and electrochromic medium (not shown in FIGS. 11 and 12), such as described above or such as otherwise known in the art. As can be seen in FIGS. 11 and 12, both of the substrates 312, 314 are cut in a wave like pattern, such as a sine wave or the like, around the perimeter edges of the substrate, with the wave cut of the rear substrate 314 being about 180 degrees out of phase with the wave cut of the front substrate 312. When the substrates are generally aligned with one another, the waves are out of phase and provide alternating outward peaks for connection of an electrical connector at least substantially around the entire perimeter of the substrates and reflective element assembly.

The front and rear substrates of the reflective element assembly thus may have a full wraparound busbar connected at least some of or most of or each of the outer points or peaks of the waves. As shown in FIG. 12, a clip or busbar 338 for providing electrical connection to the outward protrusions or peaks of the respective one of the substrates may include a plurality of clips or clip portions 338a connected together by a connecting member 338b. The spacing between the clips 338a generally corresponds to the wavelength of the wave cut around the substrates. Although only one of the clips or busbars for the rear substrate 314 is shown in FIG. 12, the other clip or busbar for the front substrate 312 would be substantially similar to busbar 338, but with the clips aligning with the outward peaks or protrusions or wave portions of the wave cut around the front substrate. The clips may connect to or contact conductive layers or busbars or raceways (not shown in FIGS. 11 and 12) that are disposed along the perimeter edge of the substrate. The wave design or pattern may vary depending on the size and particular application of the mirror assembly, the conductivity of the semi-conductive and/or conductive coatings on the substrates, and/or the like. For example, the wave cut may change in amplitude and/or frequency depending on the particular application. The clips or busbars may also change to correspond with the changes in the wave profile.

The wave cut reflective element assembly or electrochromic cell may provide a faster coloring of the reflective element assembly or electrochromic cell and a more uniform transition from bleached to color because the electrical potential may be generally uniformly distributed at substantially all of the points along the perimeter of the reflective element assembly. The benefits associated with the wave cut design may be even more significant for larger mirror sizes. The wave cut design of the present invention may also facilitate implementation of a less expensive or lower conductivity substrate while having little or no affect on the performance of the reflective element assembly or electrochromic cell. The cell gap may thus also be made smaller to assist in reducing double imaging of the mirror assembly. Also, because the voltage may be distributed more uniformly across the electrochromic cell, the "banding effect" may be significantly less for the wave cut design. Because the electrochromic cell may be a generally flush electrochromic cell, multiple cells may be stacked on one another during the manufacturing process using less complicated and less costly fixtures and jigs, in order to reduce the manufacturing costs associated with the electrochromic cells. Also, by taking advantage of the overlapping areas of the substrates, the effective surface area of the perimeter seal around the electrochromic cell may be made larger than in conventional cells.

Figure 13:
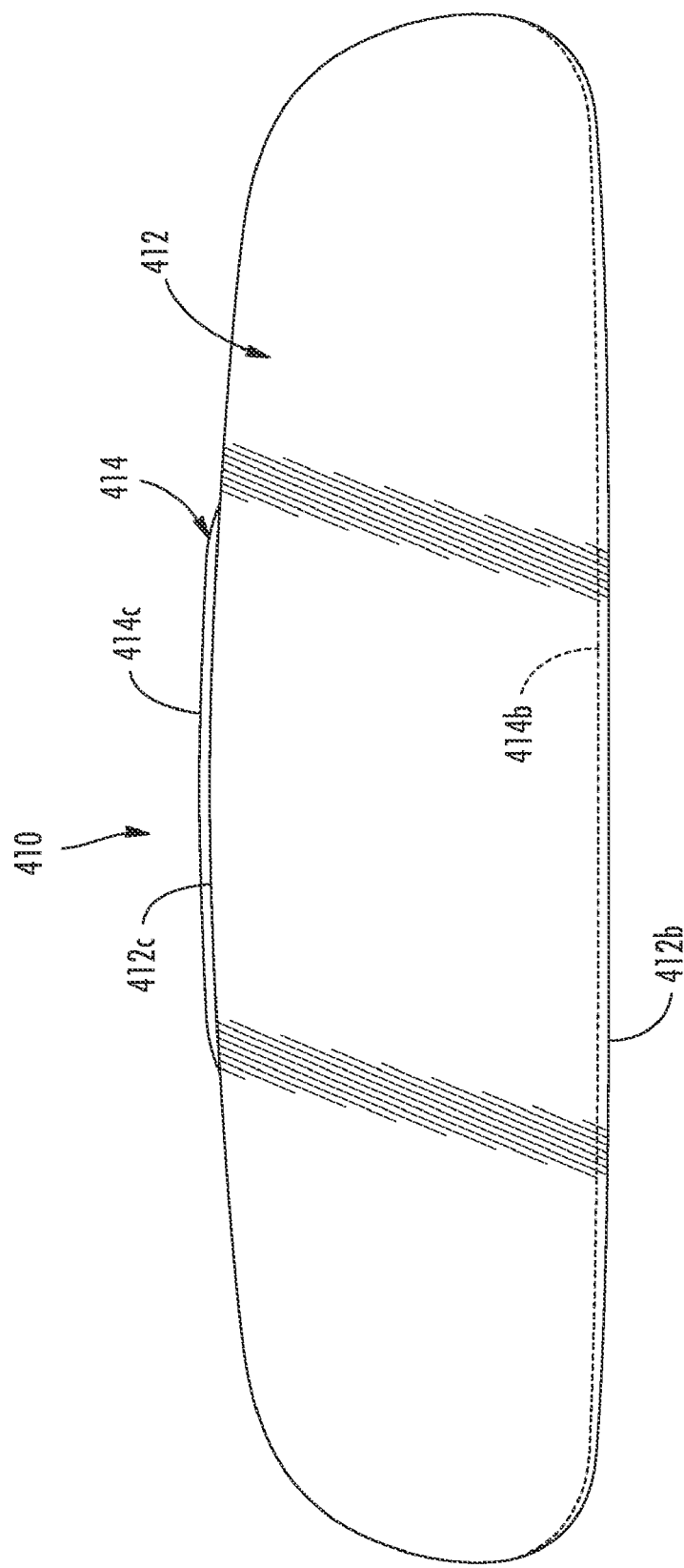
FIG. 13 is a plan view of another one sided flush electro-optic reflective element assembly in accordance with the present invention.
Figure 14:
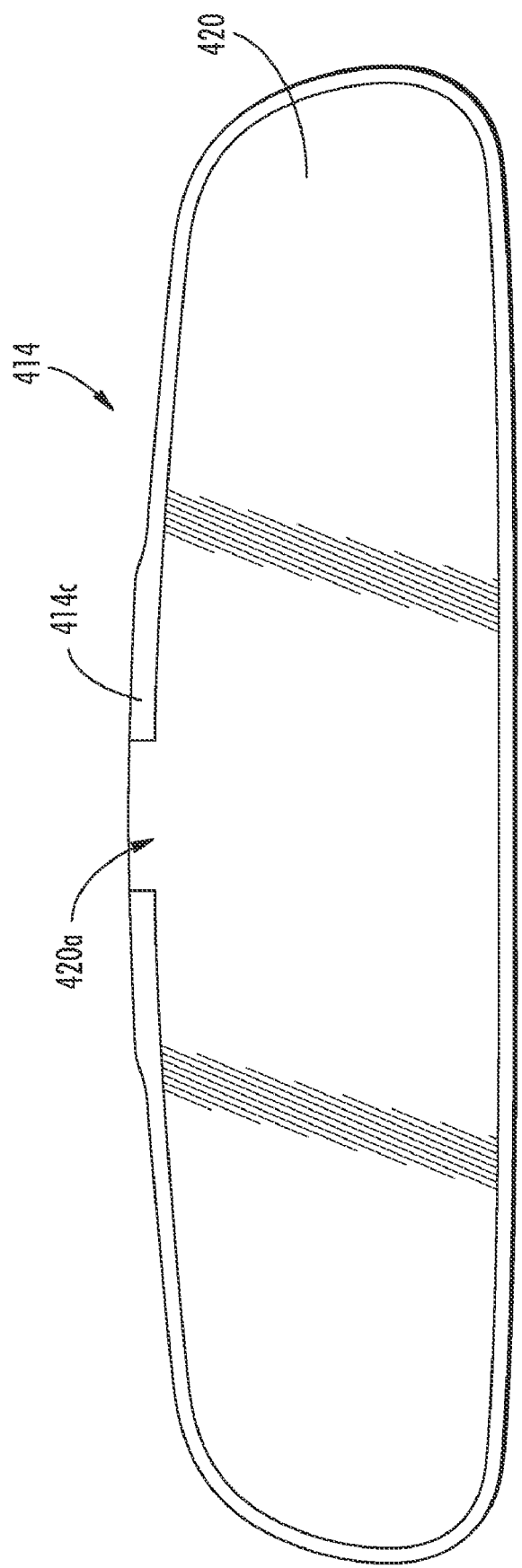
FIG. 14 is a plan view of the rear substrate of the reflective element assembly of FIG. 13, with a semi-conductive layer or coating on the third surface of the rear substrate.
Figure 15:
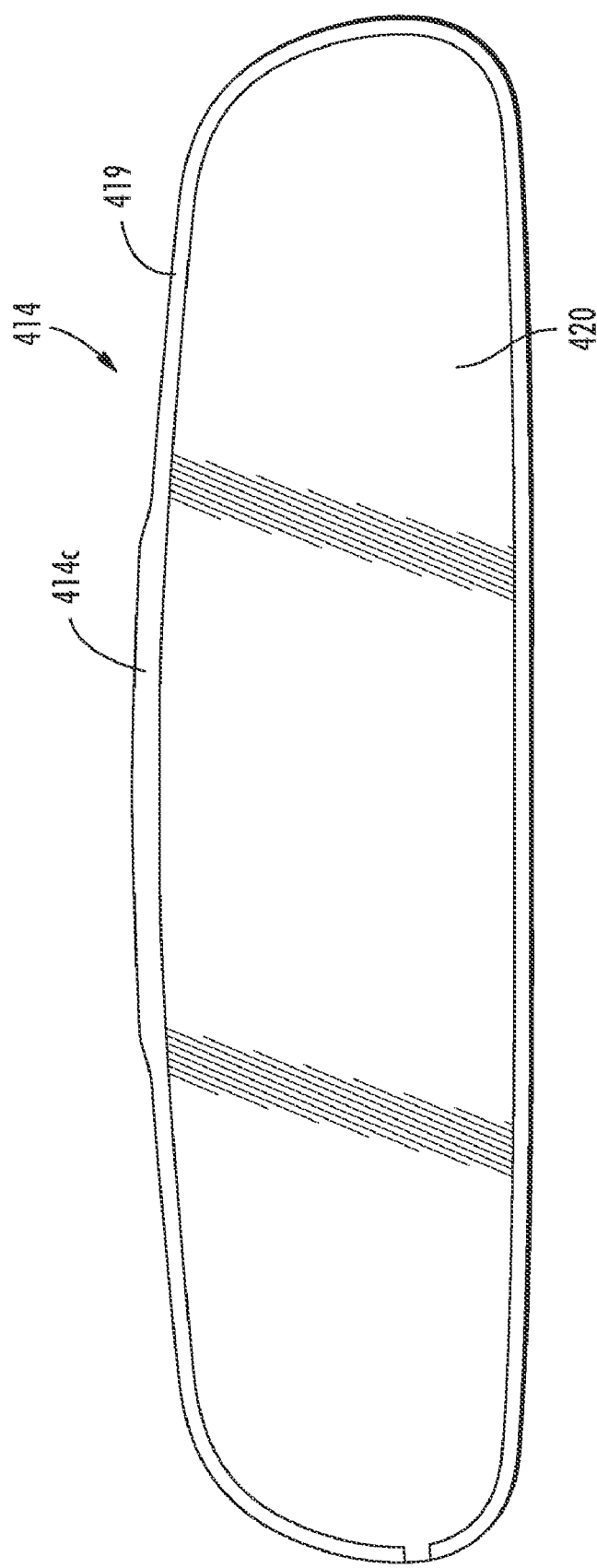
FIG. 15 is a plan view of the rear substrate of FIG. 14, with a seal applied or disposed around the perimeter surface or region of the rear substrate.

Referring now to FIGS. 13-15, a one sided flush electro-optic or electrochromic cell or reflective element assembly 410 includes a front substrate 412 and a rear substrate 414. The reflective element assembly 410 also includes an electro-optic or electrochromic medium and conductive and/or semi-conductive layers or coatings, which may be substantially similar to the elements of the reflective element assembly 10 of FIGS. 4-6, discussed above. As shown in FIG. 13, the front substrate 412 may comprise a substantially oval shaped substrate and may be downwardly offset with respect to the rear substrate 414, such that the lower edge 412b of the front substrate 412 extends over and below the lower edge 414b of the rear substrate 414 to facilitate electrical connection thereto. The rear substrate 414 is formed to have an upwardly extending portion or top hat portion 414c along the middle region of the upper edge of the substrate 414, such that the upward extending portion 414c is generally offset from the upper edge 412c of front substrate 412, while the side portions or regions of the upper edges of the substrates are generally flush or aligned with one another.

The upward extending portion or top hat portion 414c of rear substrate 414 thus may provide or facilitate electrical connection to the rear substrate, without requiring the substrates to be offset along the upper edges in the conventional manner. As shown in FIG. 14, the conductive coating 420 on the third surface of the rear substrate 414 may include a tab out portion 420a for the electrical connector to connect thereto. The upward extending portion or top hat portion 414c of the rear substrate 414 thus may provide for electrical connection to the conductive coatings on the rear substrate, while also providing for a substantially flush upper edge along a substantial portion of the upper edges of the reflective element assembly, such that offset pins and the like are not required during the manufacturing processes of the electrochromic cell or reflective element assembly 410. A seal 419 (FIG. 15) may be provided around the perimeter region or surface of the rear substrate 414 to encase or seal the electrochromic medium, such as discussed above.

Figure 17:
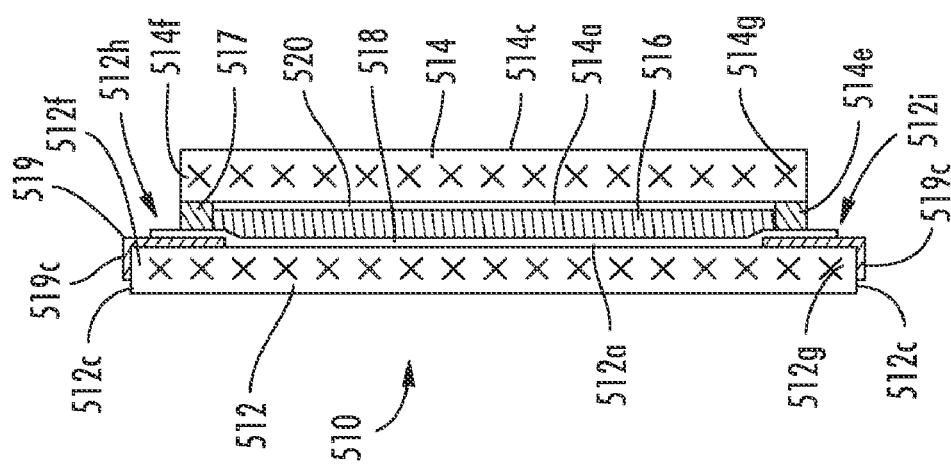
FIG. 17 is a sectional view of an electro-optic reflective element assembly having the substrates of FIG. 16.
Figure 18:
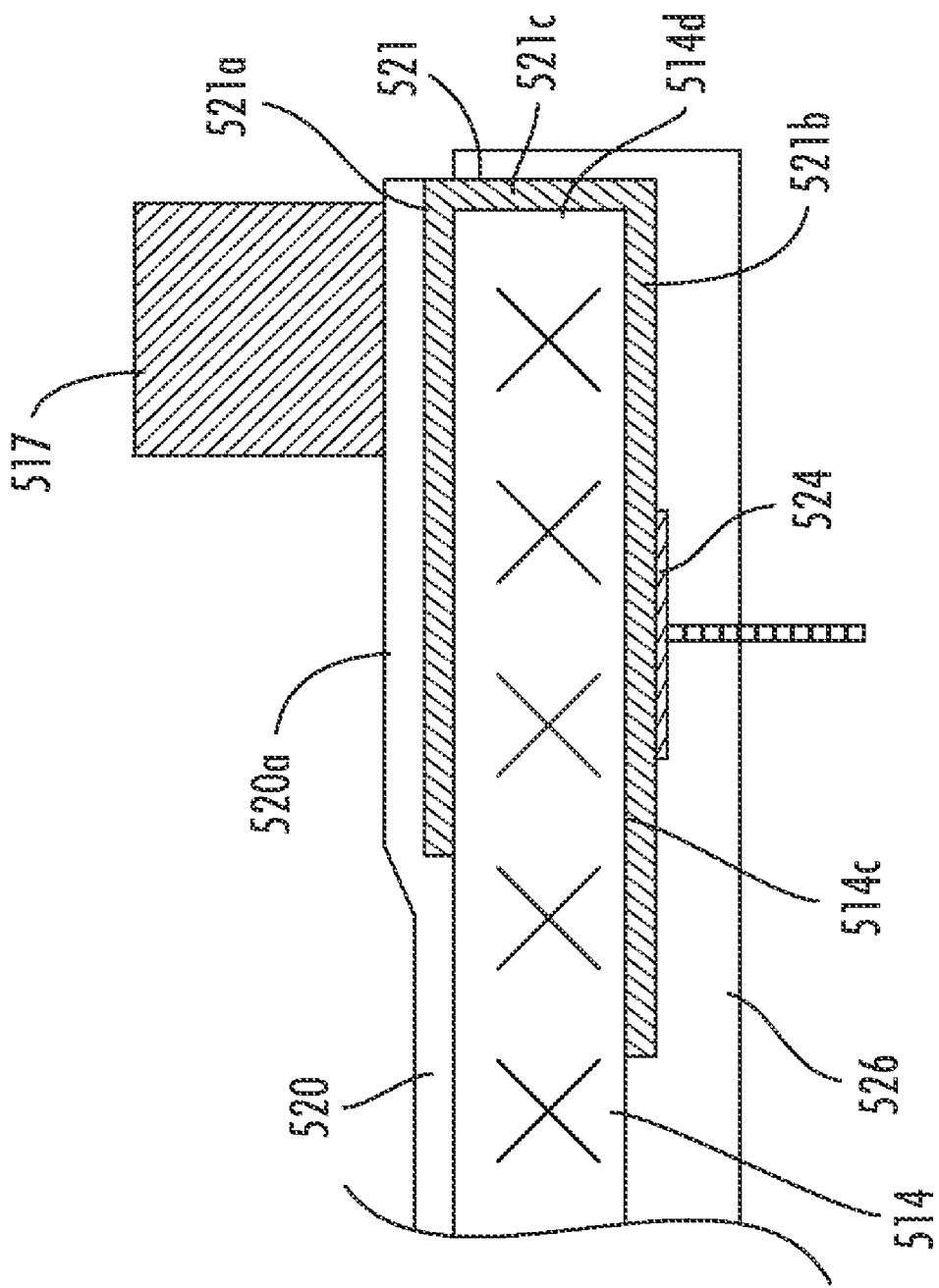
FIG. 18 is an enlarged sectional view of an edge portion of the rear substrate of the electro-optic reflective element assembly of FIG. 17, showing an electrical connector extending from the rear surface of the rear-substrate.
Figure 19:
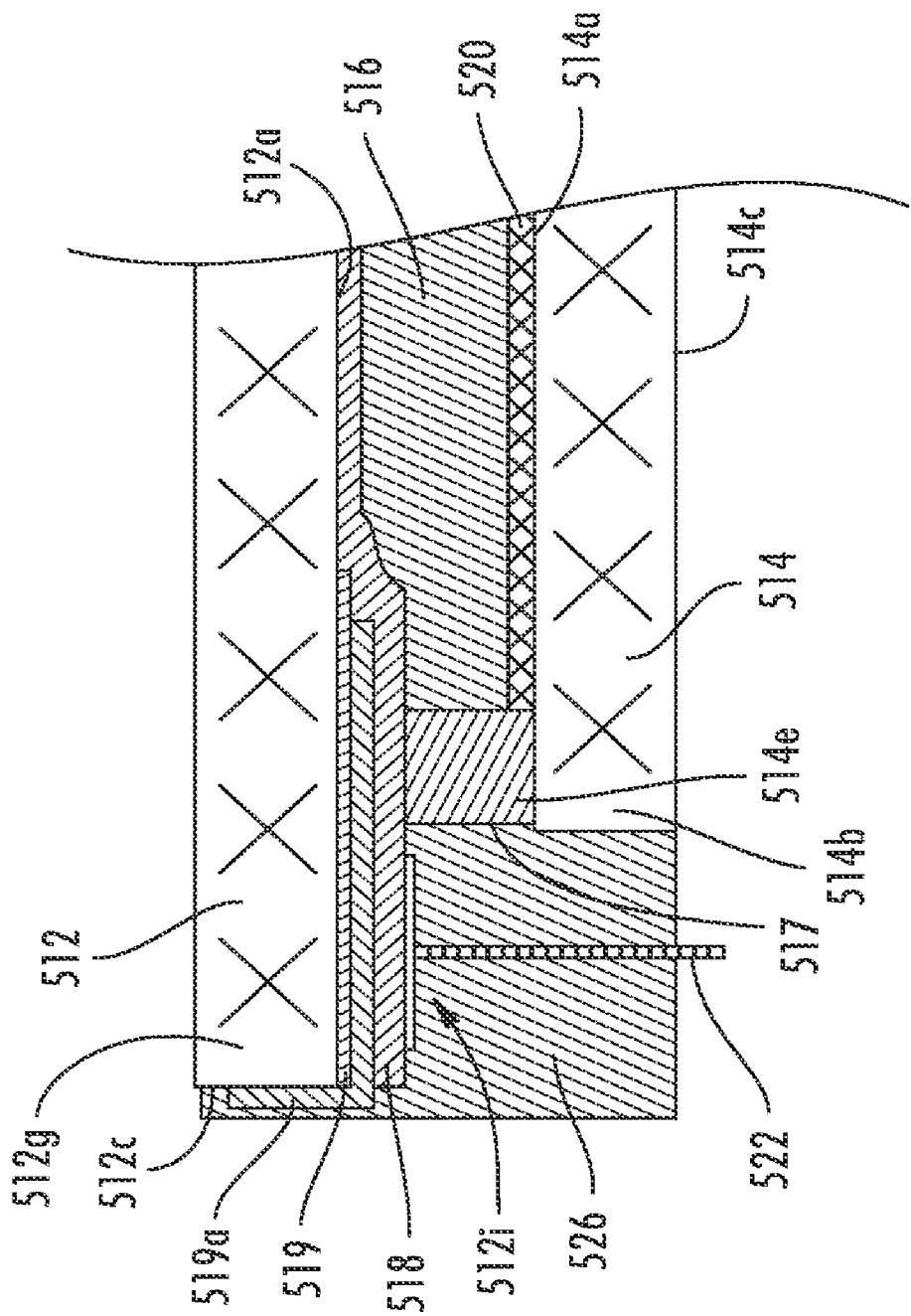
FIGS. 19 and 19A are enlarged sectional views of an edge portion of the electro-optic reflective element assembly of FIG. 17, showing an electrical connector for providing electrical connection to the rear surface of the front substrate.

Referring now to FIGS. 16-19, an electro-optic or electrochromic cell or reflective element assembly 510, such as for an interior or exterior rearview mirror assembly of a vehicle, includes a front substrate 512 and a rear substrate 514, with an electro-optic or electrochromic medium 516 (FIGS. 17 and 19) disposed or sandwiched therebetween. Front substrate 512 includes an opaquifying or darkening or hiding conductive coating or layer 519 (such as, for example, an opaque or black conductive epoxy or dark colored conductive frit or chrome oxide/metallic chrome bilayer or the like, or other materials such as described above with respect to layer 228) applied or deposited around the border or perimeter of the front substrate 512. The opaquifying layer 519 may at least partially wrap around the perimeter edges of the substrate so that an edge portion 519c of opaquifying layer 519 extends at least partially along the perimeter edge 512c of substrate 512. The front substrate 512 also includes a semi-conductive, transparent coating or layer 518 (such as an ITO layer or doped ITO layer or the like) applied to or deposited on the rear surface 512a of front substrate 512 and overlapping the opaquifying or hiding conductive border layer or coating 519 (as can be seen with reference to FIG. 17). Alternately, the semi-conductive layer 518 may be applied to or deposited on the rear surface 512a of front substrate 512 first, and then the opaquifying or black conductive layer may be applied to or deposited on the perimeter region of the semi-conductive layer 518. The conductive layer 519 provides an electrical raceway (due to the lower resistance provided by the conductive layer 519 versus the semi-conductive or ITO layer 518) around the perimeter of and in contact with the semi-conductive layer 518 to provide quick electrical flow around the perimeter of the semi-conductive layer to quickly energize the layer and get substantially uniform and even and rapid coloring or darkening of the reflective element assembly when electrical connection is made at the conductive layer 519, such as via an electrical connector 522 (FIG. 19).

The rear substrate 514 includes a metallic or conductive layer or coating 520, preferably a highly reflective metallic layer or coating (such as, for example, chromium, chromium/rhodium, silver, aluminum, silver alloy, aluminum alloy, ITO/silver/ITO stack, ITO/aluminum/ITO stack (such as ITO-silver-ITO stacks, display on demand stacks or infrared transmitting stacks of the types disclosed in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference) or the like) applied to or deposited on and substantially over the third surface 514a of rear substrate 514. The outer perimeter edge area or border region 514b of the third surface 514a of the rear substrate 514 may be masked while the metallic reflector 520 is applied, such that the border region 514b of the front surface 514a of substrate 514 provides a non-conductive surface or path or raceway 514e (such as a glass surface or the like) at least partially around the metallic reflector 520 and proximate to the edge 514d of substrate 514.

Figure 16:
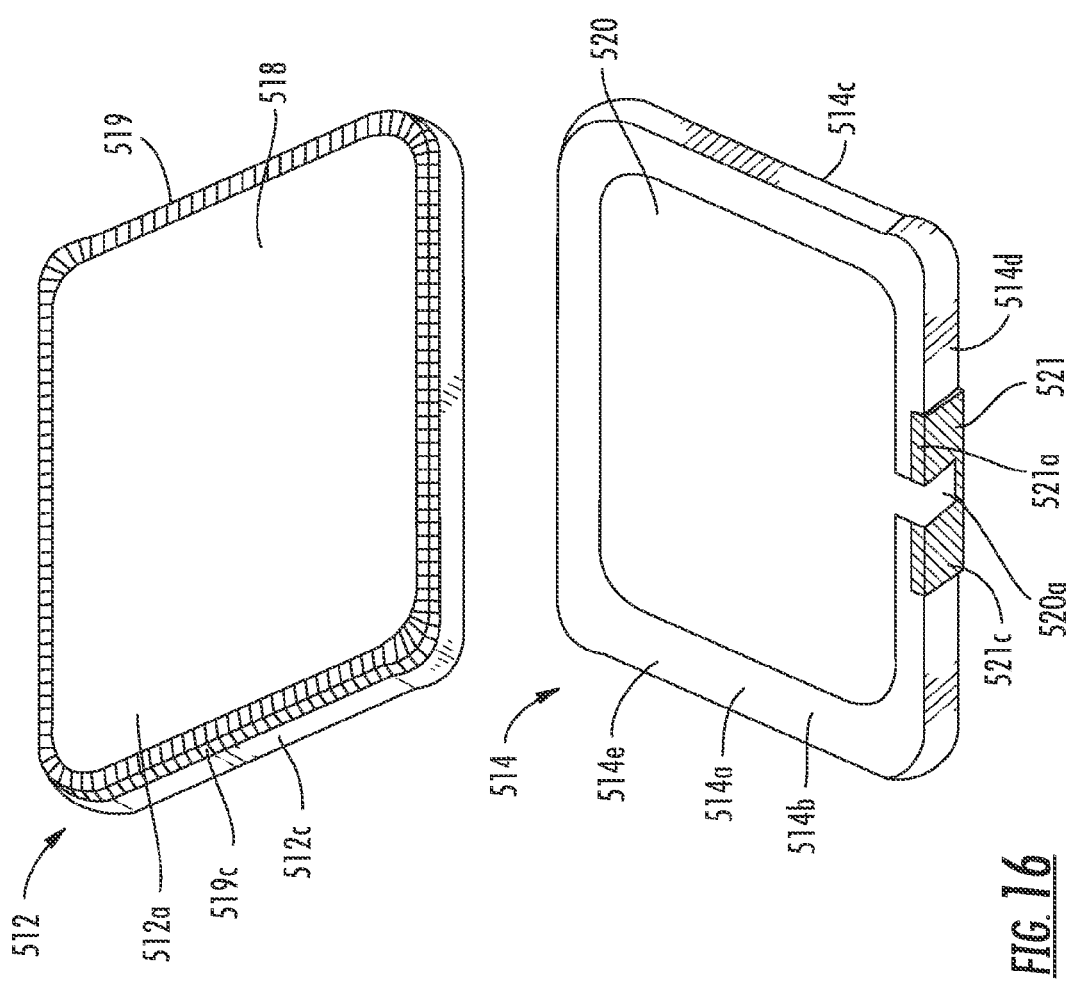
FIG. 16 is a perspective view of a front substrate and a rear substrate of an electro-optic reflective element assembly in accordance with the present invention.

As shown in FIG. 16, rear substrate 514 may also include a conductive coating or layer 521 (such as, for example, a conductive epoxy layer or a conductive silver fit layer or the like) applied to or deposited on or positioned at and partially along a perimeter edge 514d of the substrate 514 (optionally, a third surface portion 521a of the conductive layer 521 may extend partially along the border region 514b of the third surface 514a, or the conductive layer 521 may have an edge portion 521c that may partially wrap around and onto and over the edge 514d of substrate 514, or the conductive layer 521 may further include a rear portion 521b (FIG. 18) that may extend or wrap further around to the rear or fourth surface 514c of substrate 514). A tab out portion 520a of conductive layer 520 may extend over the border region 514b or raceway 514e and may overlap the conductive coating 521 to provide an electrical contact point or region or area for the rear substrate 514, as discussed below. The non-conductive raceway 514e thus is substantially devoid of the conductive layer 520 except at the tab portion. Optionally, the tab out portion 520a may wrap at least partially around the edge dimension 514d of the substrate 514 (such as shown in FIG. 16, where the tab out portion 520a extends along an outer perimeter or border region 514b of third surface 514a of substrate 514 and may further extend at least partially along and over the perimeter edge 514d of substrate 514 and over edge portion 521c of conductive coating 521).

As shown in FIG. 17, the front substrate has a height dimension that is greater than a corresponding height dimension of the rear substrate, such that the upper perimeter region or edge portion 512f and lower perimeter region or edge portion 512g of front substrate 512 extend beyond the corresponding perimeter regions or edge portions 514f, 514g of rear substrate 514 and define upper and lower overhang regions 512h, 512i. The connector or connectors may connect to the conductive layer at the rear surface of the front substrate at the overhang region or regions 512h, 512i and thus may not interfere or overlap the perimeter edge of the front substrate. The overhang regions of the front substrate relative to the rear substrate thus may allow for the electrical connectors to connect to the respective conductive layers substantially or entirely within the viewable profile of the front substrate by extending along the respective perimeter edges of the rear substrate, such that the connectors do not overlap the perimeter regions of the front substrate and, thus, are not viewable at the front surface of the front substrate. The front substrate may include a hiding layer or concealing layer at the perimeter regions or overhang regions, such as at the rear surface of the front substrate, to substantially hide or conceal the connectors and the seal of the reflective element assembly. The reflective element assembly thus may be suitable for a bezel-less or minimal bezel mirror assembly.

Although shown and described herein as having upper and lower overhang regions, the reflective element assembly of the present invention may have only one overhang region, such as for the electrical connection to the conductive layer on the rear surface of the front substrate, or may have one or more overhang regions elsewhere along the perimeter of the reflective element assembly, such as along one or both sides of the reflective element assembly or the like, without affecting the scope of the present invention. The overhang region or regions may be selected at the upper or lower edges or at one or both side edges of the reflective element assembly depending on the particular application of the reflective element assembly. For example, for an interior rearview mirror assembly, where the longitudinal axis of the reflective element assembly typically extends lengthwise along the reflective element assembly (such as generally horizontally when the reflective element assembly is installed in a vehicle), the overhang region or regions may be at the upper and/or lower edges of the reflective element assembly. Similarly, for an exterior mirror assembly of, for example, a truck or the like, where the longitudinal axis of the reflective element assembly may extend generally vertically when the reflective element assembly is installed at the truck or vehicle (in other words, where the width of the reflective element assembly is less than the height of the reflective element assembly), the overhang regions may be at the side edges of the reflective element assembly. The overhang regions may thus extend along the width dimension of the reflective element assembly. However, the overhang regions may be elsewhere along or around the edges of the reflective element assembly, without affecting the scope of the present invention.

As can also be seen with reference to FIG. 17, reflective element assembly 510 may provide an electrically conductive opaque or hiding or concealing layer 519 at least substantially around the perimeter edges of the front substrate, with the transparent semi-conductive layer 518 overlapping the opaque conducting layer 519 in the area at which the seal 517 is positioned around the electrochromic medium 516. The opaque conducting layer 519 thus provides a contacting region around the perimeter of the substrate for contacting the transparent semi-conductive layers or coatings 518. The seal 517 is positioned along the opaque conductive layer 519 and is thus masked or hidden by the opaque conductive layer to enhance the appearance of the reflective element assembly, particularly when the electro-optic or electrochromic medium is darkened or colored. The opaque conductive layer may thus allow for a smaller or no bezel overhang around the perimeter of the reflective element assembly. As can be seen in FIGS. 17 and 19, the seal 517 may be positioned around the masked or border region 514b of the rear substrate 514. The non-conductive perimeter seal 517 at least partially fills or covers or encompasses the non-conductive glass surface or masked region 514e to electrically isolate or insulate the conductive coating 520 from the conductive adhesive 526, such that the conductive coating 520 of rear substrate 514 is electrically isolated from connector 522 that connects to the conductive surface 518 of front substrate 512.

As shown in FIGS. 18 and 19, the front substrate 512 and rear substrate 514 may include electrical connectors or terminals 522 and 524, respectively, for providing electrical connection to the conductive or semi-conductive layers 518, 520. Particularly, and as shown in FIG. 18, rear substrate 514 may include an electrical connection terminal or connector 524 at its rear or fourth surface 514c for providing electrical connection between the conductive metallic layer 520 and the appropriate electrical source, circuitry or control or the like at the rear of the reflective element assembly. The electrical connection terminal 524 may be soldered or adhered or attached (such as via electrically conductive adhesive or the like, such as a conductive coating or layer or the like) to, or may be mechanically contacting at (such as via a spring-action contact or the like) a rear portion 521b of the conductive coating or layer 521 along the fourth or rear surface 514c of rear substrate 514. The conductive layer 521 thus provides electrical connection between the terminal 524 at the rear or fourth surface 514c of rear substrate 514 and the conductive layer 520 at the front or third surface 514a of rear substrate 514.

As discussed above, the electrically conductive layer 521 may provide electrical connection to the metallic reflector 520 via the tab-out portion 520a of the metallic reflector, which may be overcoated or applied to the front portion 521a of the electrically conductive layer 521 along the front or third surface 514a of the rear substrate 514. A potting material 526 (such as, for example, a silicone or urethane elastomer, preferably a conductive semi-elastomeric material or the like) may be applied or positioned over the rear surface (and may be applied partially or entirely around the outer perimeter edge of the substrate) to seal the connection of the connector terminal 524 and the conductive layer 521. The electrical connection terminal 524 may extend rearward from the reflective element assembly 510 and may protrude from the potting material 526 for electrical connection to a connector associated with the appropriate electrical power, circuitry or control or the like.

As shown in FIG. 19, the front substrate 512 of reflective element assembly 510 may include one or more electrical connection terminals 522 at or along its rear or second surface 512a. The electrical connection terminal 522 may comprise a stick or ribbon or pin connector for providing electrical connection to the semi-conductive transparent layer 518 at the second surface 512a of front substrate 512 and generally at or along the lower overhang region 512i. The electrical connector or terminal 522 may be positioned entirely within a perimeter profile (as viewed from the front of the reflective element assembly) of the front substrate and generally rearward of the overhang region, so that the electrical connector or terminal is substantially not viewable through the front surface of the front substrate. The electrical connection terminal 522 may be soldered or adhesively attached, such as via an electrically conductive epoxy or the like, to the semi-conductive layer 518, or may be mechanically attached to or contacting the semi-conductive layer 518, such as via a spring-action contact or the like, and may extend or protrude rearward from the front substrate (and may extend rearward of the rear substrate as shown in FIG. 19) for electrical connection to the appropriate electrical power, circuitry or control or the like at the rear of the reflective element assembly.

As discussed above, the semi-conductive layer 518 may be applied to or deposited on the second surface 512a of substrate 512 and on or over a perimeter black out or opaquifying layer 519. Optionally, as also discussed above, the perimeter layer 519 may be conductive. Optionally, as shown in FIG. 19, the perimeter opaquifying layer 519 may be non-conducting and applied to or deposited on the outer perimeter region 512g of the rear surface 512a of front substrate 512, and an electrical conducting perimeter busbar layer 519a (such as a metallic or high electrical conducting layer) may be applied to the opaquifying layer 519 and may overlap or fold over to cover a portion of the side edge 512c of substrate 512, such that the metallic or high electrical conducting busbar layer 519a may provide the electrical connection to the semi-conductive layer 518, while the opaquifying layer 519 may function to substantially hide or conceal the metallic busbar layer 519a and seal 517 of the reflective element assembly, such that the layers and seals and connectors are not viewable by a driver or occupant of the vehicle when viewing the reflective element assembly of the mirror assembly of the vehicle.

Figure 19A:
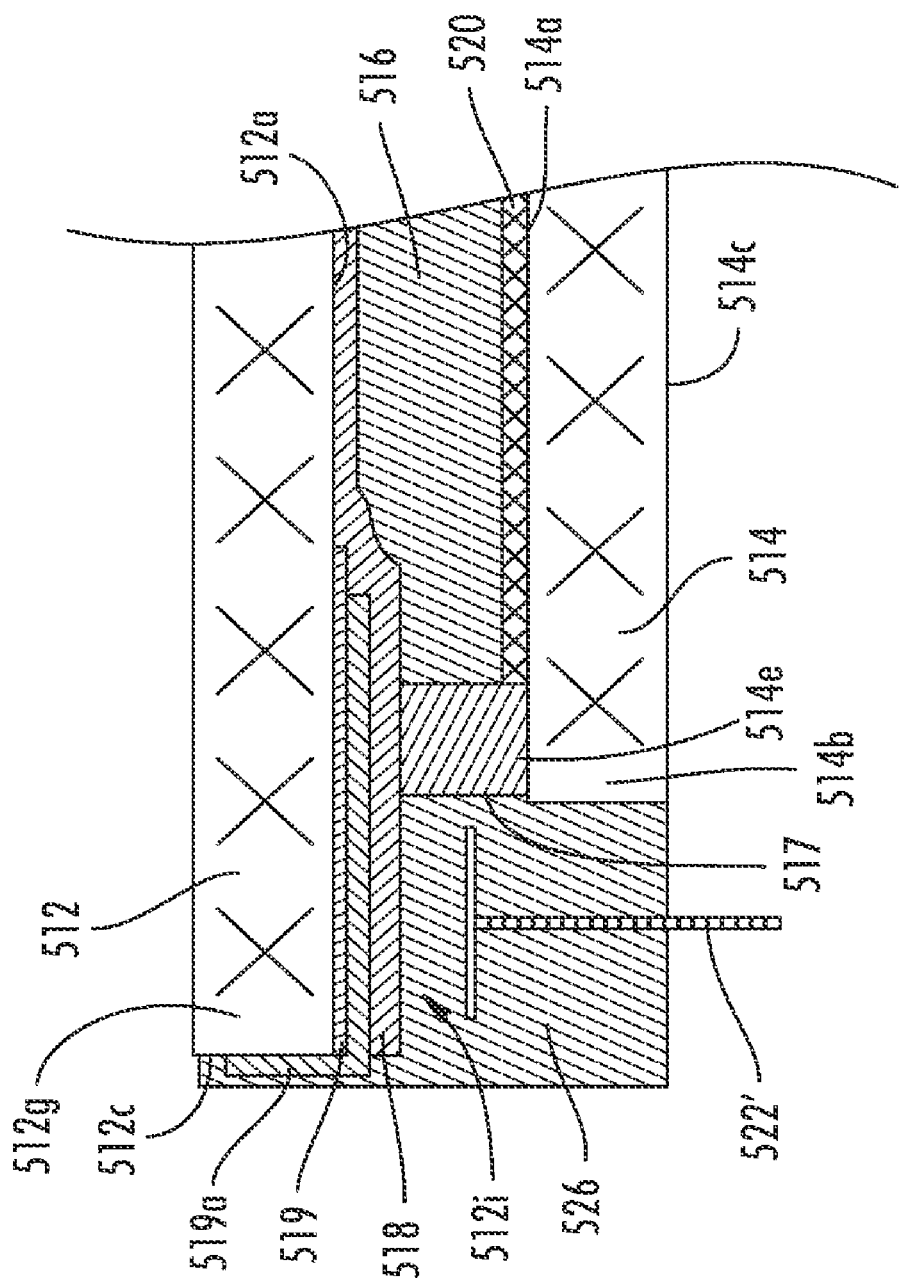

The potting material 526 may extend partially around the perimeter edge of the front substrate and substantially surround and seal the electrical connector 522 at the rear surface of the front substrate. Preferably, the material 526 surrounding the connector 522 may comprise a conductive material, such as a conductive epoxy, such as a conductive epoxy commercially available from DuPont, a conductive paste, a conductive tape, such as a copper tape with conductive adhesive, a conductive frit or the like, to provide an enhanced connection of the pin or connector 522 to the conductive layer or raceway and the semi-conductive or ITO layer or the like on the front substrate. As shown in FIG. 19, the connector 522 may contact the semi-conductive layer 518 at the conductive busbar layer 519a, and the conductive material 526 may substantially surround the connector 522 to enhance the electrical connection between the connector and the semi-conductive layer 518 and/or the conductive busbar layer 519a. Optionally, and with reference to FIG. 19A, the connector 522' may be spaced from the semi-conductive layer 518 and conductive busbar layer 519a and substantially surrounded by the conductive material 526, such that the conductive material 526 connects the connector 522 along the semi-conductive layer 518 and busbar layer 519a. Because a substantial amount of conductive material 526 may be packed in or disposed around the connectors and along the semi-conductive layer and busbar layer to substantially fill the overlap region or area, the conductive material may provide enhanced electrical flow and electrical contact between the connector and the busbar layer, thereby improving the performance of the reflective element assembly. Therefore, the conductive material may provide a substantial raceway effect along the semi-conductive layer and busbar layer even if the conductive material is a weak conductor.

The conductive material or epoxy may be injected or disposed into the area of the reflective element assembly outside and around the perimeter seal to substantially fill the area and to enhance the conductivity around the connector 522 and conductive coating 518 of front substrate 512. Optionally, the conductive material or epoxy may be applied to the overlap region at the "empty cell" stage of the manufacturing process, where the cell has not yet been filled with the electrochromic medium. The empty cell, with the seal and conductive epoxy disposed thereon, may then be fired or heated together to cure or harden both the seal and the conductive epoxy in a single process.

Therefore, the opaquifying layer and semi-conductive and conductive layers, and the electrical connectors of the reflective element assembly 510 provide a concealed or hidden seal and electrical connectors, such that the bezel size may be reduced or eliminated, while providing an aesthetically pleasing rearview mirror assembly and reflective element. The overhang region of the front substrate relative to the rear substrate may allow for multiple electrical connectors or multiple-point contact between the front electrical/perimeter busbar and the appropriate electrical power or circuitry or control or the like at the rear of the reflective element assembly or cell.

Optionally, and as shown in FIG. 20, the rear or second surface 512a' of a front substrate 512' may include multiple hiding layers 519' around the perimeter regions (such as lower perimeter region 512g' of FIG. 20) of the substrate to conceal or hide the seal 517 and connectors (not shown in FIG. 20) of the reflective element assembly. For example, the hiding layers 519' may include a "black chrome" layer 519a' (such as a chromium oxide layer or the like) applied to or deposited on the rear surface 512a' of the substrate and along the perimeter regions and overhang regions, and a chromium metal layer 519b', which may be sputter deposited or otherwise applied to the layer or layers of chromium oxide 519a'. Alternately, other metals or metal compounds may be deposited on the perimeter regions of front surface 512a' of front substrate 512', and preferably may be applied in a manner that results in a substantially opaque layer (that may be substantially non-conductive) at the surface of the substrate and a substantially pure, highly conductive metallic layer over the opaque layer, such as discussed below.

The coatings or layers on the second surface 512a' of substrate 512' may be applied to or deposited on the second surface in a manner to provide multiple and varying layers of chromium oxide or other metals or metal compounds or the like to enhance the performance of the layers. For example, the central region of the second surface 512a' may be masked while leaving the border or perimeter region 512b' unmasked during the application or deposition of the layers 519'. The chromium oxide layer or layers 519a' or the like may be reactively sputter deposited or evaporated in an oxygen atmosphere to deposit a dark, light absorbing chromium layer on the perimeter region 512b' of the second surface 512a' of the front substrate 512'. While the chromium oxide is being deposited or applied to the perimeter region 512b', the oxygen gas level in the vacuum chamber may be gradually reduced to approximately zero, thereby providing varying layers 519a' of chromium oxide on the perimeter region 512b'. The chromium metal conductive layer 519b' may then be sputter deposited or coated onto the chromium oxide layer or layers 519a', such as in a zero oxygen atmosphere, to deposit a metal conducting perimeter coating at the perimeter region 512b' of the rear surface 512a' of front substrate 512'. The front substrate 512' may be removed from the vacuum chamber and the mask over the central region may be removed. The transparent semi-conductive coating or layer 518 may then be sputter deposited or coated or otherwise applied to or deposited on or across the entire rear surface 512a' of front substrate 512'. Such a process and coatings provide a build up of "black chrome" (such as approximately 500 angstroms to approximately 2,000 angstroms thick) initially, followed by "metallic chrome" (such as approximately 500 angstroms to approximately 3,000 angstroms thick), thereby forming a border or perimeter electrically conductive busbar, but with the black chrome layer being substantially non-reflecting when viewed from the first surface side of the front substrate or reflective element assembly. Although described as comprising chrome oxide, other metals may be provided to form a metal compound (such as chrome oxide, nickel oxide, silver oxide or the like) at the substrate surface and a substantially pure metallic deposit (such as chromium, nickel, silver or the like) to provide a highly conductive raceway. The metal compound may be sandwiched between the substrate and the substantially pure metal, and provides a dark (such as black) layer at the substrate surface to at least substantially conceal or hide the seals and connectors and the like, while the substantially pure metal is at the semi conductive layer or ITO layer or the like.

Optionally, and according to another aspect of the present invention, an electro-optic or electrochromic mirror assembly for a vehicle may comprise an electro-optic or electrochromic mirror element or reflective element assembly comprising a front or first substrate having first and second surfaces and a rear or second substrate having third and fourth surfaces. The first and second substrates are arranged so that the second surface opposes the third surface with an electro-optic or electrochromic medium disposed therebetween. The first substrate has at least one at least partially conductive or semi-conductive coating or layer on the second surface and may also have an opaquifying conductive border/perimeter coating/layer around the perimeter edges or regions of the substrate. The second substrate has at least one at least partially conductive coating or layer on the third surface. The first and second substrates are positioned relative to one another such that at least a portion of an edge of the first substrate is generally flush or aligned with a corresponding edge of the second substrate. The edge of the second substrate may have a relief area formed therealong relative to the edge of the first substrate, wherein the relief area provides clearance or access for electrical connection to the conductive border/perimeter coating/layer on the second surface of the corresponding edge of the first substrate. The electrical connections to the first substrate may provide or deliver electrical power to the semi-conductive coating on the second surface of the first substrate and to the conductive coating on the third surface of the second substrate, as discussed below.

The perimeter seal of the reflective element assembly may be formed such that the outer edge of the perimeter seal is generally flush with the edges of both the first and second substrates except in the relief area or areas formed along the edge of second substrate. The perimeter seal profile in the relief areas along the edge of the second substrate may be configured such that the outer edge of the perimeter seal is recessed from the outer edges of both the first and second substrates, such that a gap or spacing between the first and the second substrates is created outside of the seal. A conductive material or bridge may be disposed or applied at the gap or spacing to couple the conductive coating on the third surface of the second substrate with the appropriate electrical connector or contact at the border/perimeter conductive coating/layer on the second surface of the first substrate. In addition, in order to avoid shorting of the positive and negative electrical contacts, a small portion of the border/perimeter conductive coating/layer and the underneath transparent semi-conductive coating on the second surface of the first substrate may be removed (electrically isolated) in a pattern generally around the electrical contact for the second substrate at the spacing created in the relief area or areas formed along the edge or edges of the substrates. Electrical contact to the semi-conductive layer of the second surface of the first substrate may be made by affixing an electrical lead to the perimeter/border conductive coating/layer in the relief areas, while electrical contact to the third surface of the second substrate may be made by affixing an electrical lead to the perimeter/border conductive coating/layer of the first substrate in the electrically isolated portion of the relief area or areas. The electrical contact is then made to the third surface of the second substrate via the conductive material or bridge between the first and second substrates at the electrically isolated relief area or areas.

The electrical contacts to the transparent semi-conductive layer on the front substrate and the reflective conductive layer on the rear substrate may thus be made at one of the substrates, with a conductive bridge connecting one of the contacts at one substrate to the coating or layer on the other substrate. Such a configuration or arrangement may provide for a true flush, bezelless cell or reflective element assembly and may facilitate making both electrical contacts to the front substrate at specified areas or relief areas along the perimeter edges or regions of the substrates.

Figure 21:
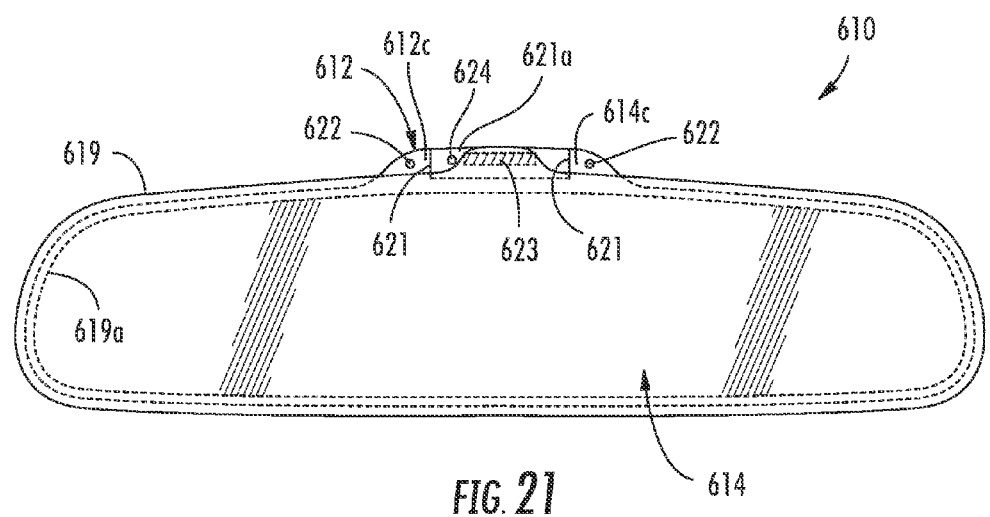
FIG. 21 is a plan view of the rear surface of another electro-optic reflective element assembly in accordance with the present invention, with the electrical connections provided at the front substrate.

For example, and with reference to FIG. 21, an electro-optic or electrochromic reflective element assembly or cell 610 includes a front substrate 612 and a rear substrate 614 and may provide generally flush edges of the substrates substantially around the reflective element assembly. As shown in FIG. 21, the front substrate 612 may provide a top hat form or protrusion 612c along the upper edge of the front substrate, and the rear substrate 614 may also provide a smaller top hat form or protrusion 614c along its upper edge (such as discussed above with respect to the rear substrate 414 of FIGS. 13-15). The seal around the electrochromic medium is positioned along and between the outer edges of the substrates, except at the top hat forms. The top hat form 614c of rear substrate 614 thus generally overlaps the top hat form 612c of front substrate 612, with a gap or spacing defined between the top hat forms 612c, 614c and outward of the seal.

The second surface or rear surface of front substrate 612 is coated with a semi-conductive transparent coating or layer and a perimeter busbar layer 619a and perimeter opaquifying or "black-out" layer 619 around its perimeter edges, such as, for example, coatings or layers similar to the busbar layer 519a and opaquifying layer 519 of reflective element assembly 510, discussed above. As can be seen in FIG. 21, the top hat form 612c of front substrate 612 provides for electrical contacts or connectors 622 (such as pins or clips or the like) at the perimeter busbar layer 619a at either or both ends of the top hat form 612c. A gap or deletion line 621 may be provided along a portion of the conductive layer on top hat form 612c to electrically isolate a center portion or region 621a of the top hat form 612c from the ends of the top hat form where the positive electrical contacts are provided. An electrical contact or connector 624 (such as a pin or clip or the like) may be provided at the electrically isolated region 621a.

Top hat form 614c of rear substrate 614 may be coated with the conductive coating on the third surface of the substrate and/or may have a conductive coating or layer and tab-out edge of the conductive coating on the surface (such as, for example, a conductive coating or layer and tab-out portion of the types described above with respect to FIG. 16). The second or rear substrate 614 may include a perimeter, electrically conductive coating or layer around the perimeter edges and perimeter regions of the third surface of the rear substrate 614 (such as, for example, a perimeter electrically conductive coating of the type described above with respect to FIG. 18).

Reflective element assembly 610 further includes a conductive material or bridge 623, such as a conductive epoxy or the like, disposed at the electrically isolated region 621a and spanning the gap between the top hat forms 612c, 614c of the front and rear substrates. The conductive bridge 623 provides for electrical connection between the electrically isolated region 621a (and the electrical connector 624 connected thereto) of the top hat form 612e of front substrate 612 and the conductive coating or layer or tab-out region of the top hat form 614e of rear substrate 614.

Accordingly, electrical power may be applied to the semiconductive coating or layer on the second surface of the front substrate via an electrical connector or contact (such as a pin or clip or the like) at the top hat form of the front substrate. Electrical power may also be applied to the conductive coating or layer on the third surface of the rear substrate via an electrical connector or contact (such as a pin or clip or the like) also positioned at the top hat form of the front substrate (and via the conductive bridge). The present invention thus provides a flush electro-optic or electrochromic cell or reflective element assembly with electrical contacts at only one of the substrates.

Figure 22:
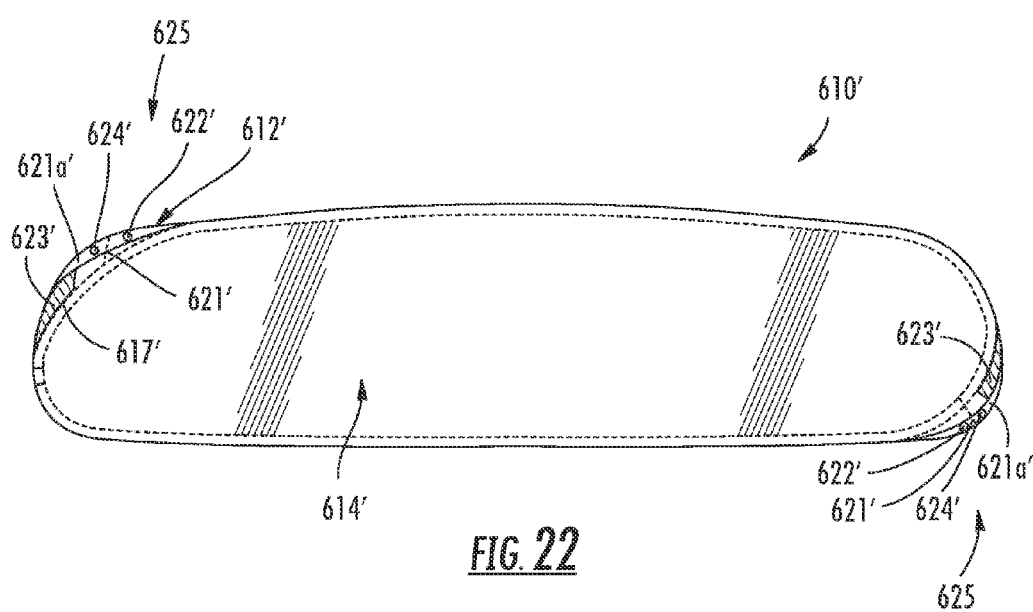
FIG. 22 is a plan view of the rear surface of another electro-optic reflective element assembly similar to FIG. 21, but with the electrical connections provided at opposite corners of the reflective element assembly.
Figure 23:
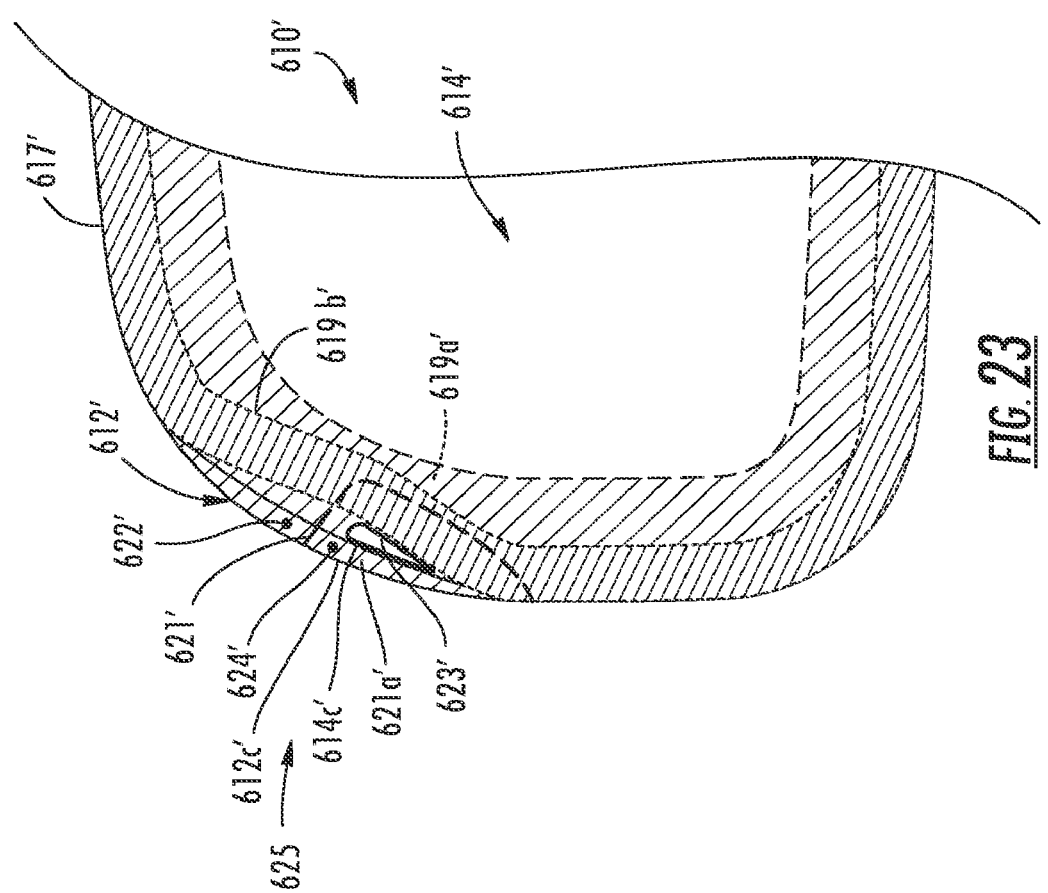
FIG. 23 is an enlarged plan view of one of the corners of the reflective element assembly of FIG. 22.

Optionally, and with reference to FIGS. 22 and 23, an electro-optic or electrochromic mirror cell or reflective element assembly 610' may provide one or more relief regions 625 around the perimeter edges of the reflective element assembly, such as at generally opposite corners of the reflective element assembly 610'. The relief regions 625 may be defined by areas or regions of the rear substrate 614' which may be cut back relative to the corresponding edge or edges of the front substrate 612' to provide a relief area exposing the second surface of the front substrate 612' when the reflective element assembly is viewed from the rear of the reflective element assembly. The front and rear substrates 612', 614' may otherwise be generally flush along their edges except at the relief regions 625.

The front substrate 61T may include a transparent semiconductive layer on its second or rear surface and may include a busbar layer 619a' (which may include a tab out portion 619b' over the relief region or regions 625) and/or a opaquifying or black-out layer around its perimeter edges and an electrical contact 622' at each of the areas or regions exposed by the relief regions (such as discussed above). The electrical contact 622' is electrically connected to the semi-conductive layer and busbar layer or tab out portion on the front substrate 612'. Each of the areas or regions of the second surface of the front substrate that are exposed by the relief regions also includes a deletion line 621' that defines an electrically isolated area or region 621a'. A second electrical contact 624' is applied or connected to the electrically, isolated region 621a' of each of the relief regions.

As can be seen in FIGS. 22 and 23, the seal 617' around the electro-optic or electrochromic medium of the reflective element assembly may be configured or arranged to be between the front and rear substrates and generally along the perimeter edges of the front and rear substrates, except in the relief regions 625. At the relief regions 625, the seal may be positioned inward of the outer edges 614c' of the rear substrate 614', which are inward of the outer edges 612c' of the front substrate 612'. A gap or spacing thus exists between the front and rear substrates outside of the seal 617' and at each of the relief regions 625. The electrically isolated region 621a' is formed to generally correspond with the area of the substrates that have the gap or spacing therebetween. A conductive material or bridge 623' is provided between the front and rear substrates at each of the relief regions to conductively span the gap between the electrically isolated area 621a' (and electrical connector 624') of the front substrate 612' and the conductive coating or layer or layers of the rear substrate 614'.

Figure 24:
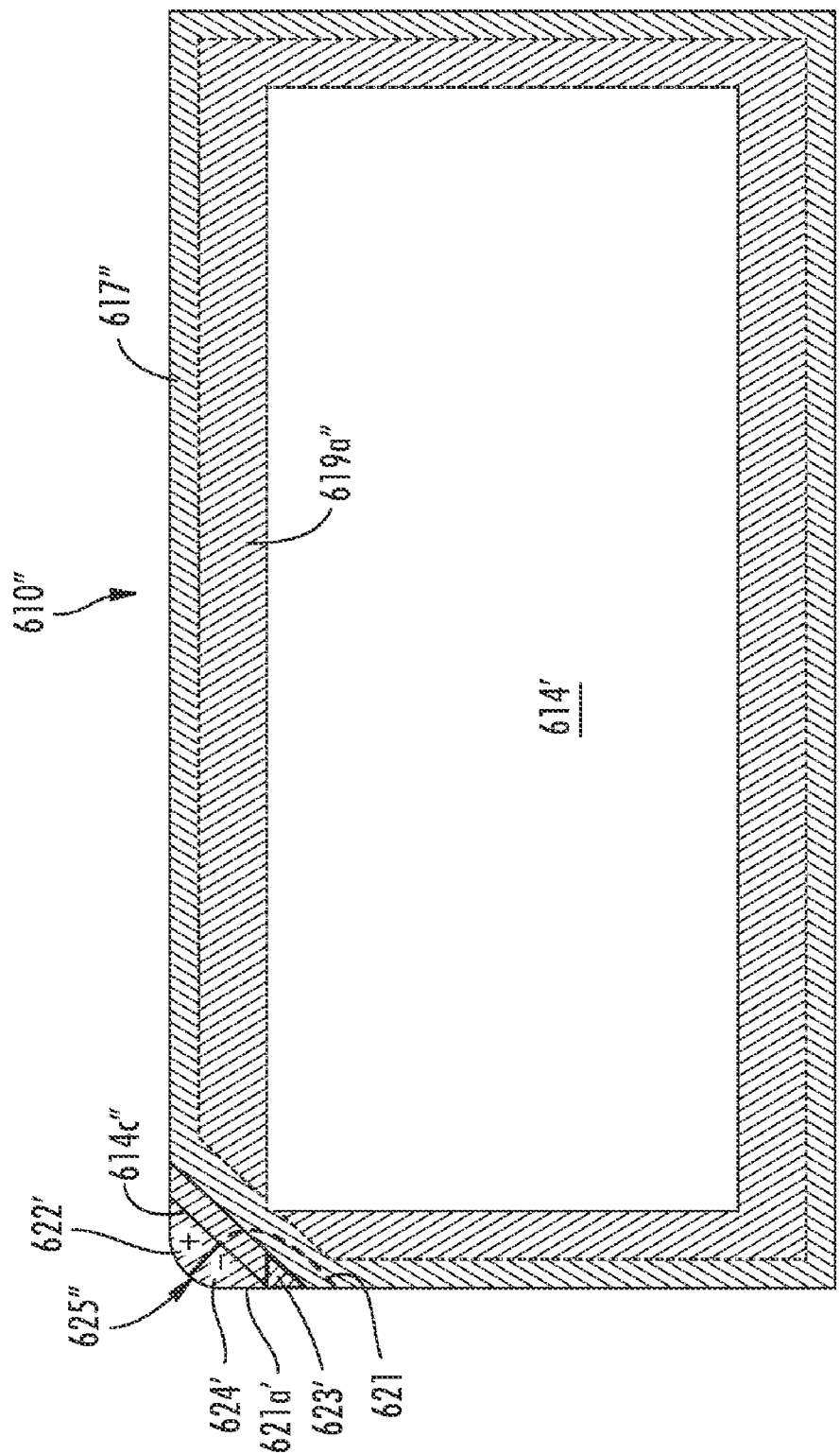
FIG. 24 is a plan view of another electro-optic reflective element assembly similar to the reflective element assembly of FIG. 21.

Optionally, and as shown in FIG. 24, the reflective element assembly 610" may include a perimeter conductive coating or busbar coating 619a" around the perimeter of the front substrate 612' and a seal 617" around the perimeter of the substrates except at the relief region 625" of the rear substrate 614". In the illustrated embodiment of FIG. 24, the electro-optic or electrochromic reflective element assembly includes one relief region 625" (defined by the cut off or reduced edge 614c" of rear substrate 614"), but could include two or more, such as at opposite corners of the reflective element assembly or the like, without affecting the scope of the present invention. The reflective element assembly 610" is otherwise substantially similar to reflective element assembly 610', discussed above, such that a detailed discussion of the reflective element assembly will not be repeated herein.

The electro-optic or electrochromic mirror cell or reflective element assembly 610' thus may provide for electrical connections at two or more locations around the mirror cell or reflective element assembly, and may provide for the electrical connections at only the front substrate of the reflective element assembly. The reflective element assembly may provide a flush reflective element assembly or mirror cell that may be implemented in a bezelless mirror assembly, while providing enhanced performance or coloring or darkening of the reflective element assembly.

Figure 25:
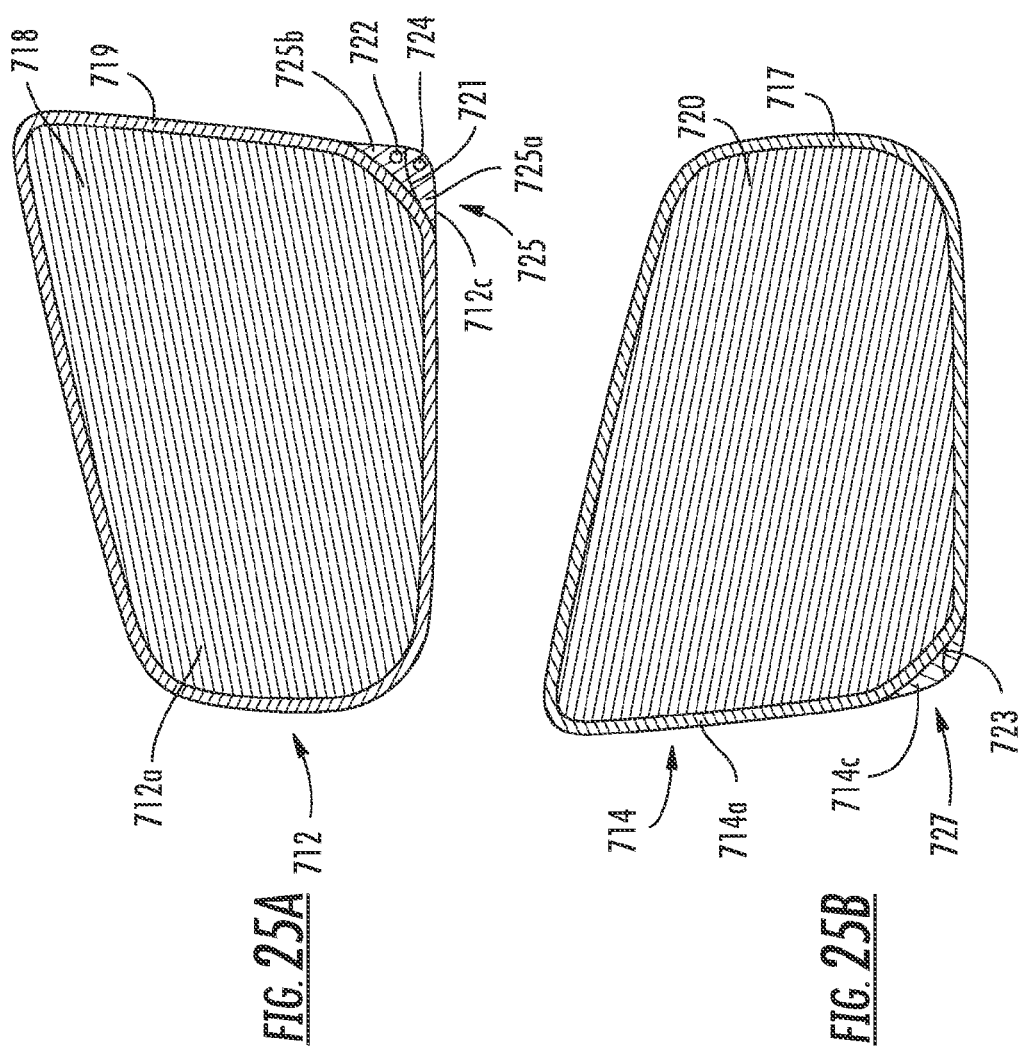
FIG. 25A is a plan view of the third surface of a rear substrate for an exterior electro-optic reflective element assembly in accordance with the present invention.
FIG. 25B is a plan view of the second surface of a front substrate for the exterior electro-optic reflective element assembly.

Optionally, and with reference to FIGS. 25A and 25B, an exterior rearview mirror cell or reflective element assembly for an exterior rearview mirror assembly of a vehicle includes a first or front substrate 712 (FIG. 25A) and a second or rear substrate 714 (FIG. 25B) and an electro-optic or electrochromic medium and seal 717 sandwiched therebetween, such as described above. As also described above, the front substrate 712 may have a transparent semi-conductive layer or coating 718 (such as ITO or the like) applied to the second or rear surface 712a of the substrate, and may include an opaquifying conductive border/perimeter coating or layer 719 (such as, for example, a black conductive epoxy or dark colored conductive frit or black chrome/metallic chrome layer or the like) applied around the perimeter edges of the front substrate 712. As shown in FIG. 25A, the perimeter coating or layer 719 may be along the perimeter edges of the front substrate 712 except in an electrical connection area or region 725 of substrate 712, where the perimeter coating 719 is inward of the outer edges of substrate 712. The electrical connection region 725 is coated by the semi-conductive layer 718 and/or a conductive layer or the like. A deletion line 721, such as a non-conductive area in the region 725 where the busbar layer and semi-conductive layer is etched off or otherwise removed from or not applied to the surface of the substrate, is formed at the electrical connection area 725 to separate and define and electrically isolate a rear substrate electrical connection area 725a or raceway portion of the semi-conductive layer from a front substrate electrical connection area 725b or surface portion of the semi-conductive layer.

An electrical connection or contact 722 is connected to or applied to the front substrate electrical connection area 725b to provide electrical power or connection to the semi-conductive layer 718 on the rear surface of the front substrate 712. Likewise, an electrical connection or contact 724 is connected to or applied to the electrically isolated rear substrate electrical connection area 725a and is in electrical communication with the conductive layer of the third surface 714a of rear substrate 714 via a conductive material or bridge 723, as discussed below.

With reference to FIG. 25B, rear substrate 714 includes a metallic reflector layer 720 (such as a layer or layers comprising, for example, chromium, chromium/rhodium, aluminum, silver, aluminum alloy, silver alloy, an ITO/silver/ITO stack, an ITO/aluminum/ITO stack or the like, such as ITO-silver-ITO stacks or layers, or display on demand stacks or layers or infrared transmitting stacks or layers of the types described in PCT application No. PCT/US03/29776, filed Sep. 19, 2003 by Donnelly Corporation et al. for MIRROR REFLECTIVE ELEMENT ASSEMBLY, published Apr. 1, 2004 as International Publication No. WO 2004/026633 A2, which is hereby incorporated herein by reference) on its front or third surface 714a, and a perimeter black seal 717 generally around the perimeter edges of the substrate. As can be seen in FIG. 25B, an electrical connection area 727 may be defined at a region of the rear substrate 714, such as at a corner of the substrate, where the perimeter seal 717 is positioned inward of the outer edge of the substrate. The rear substrate 714 is formed to be substantially identical in shape to the front substrate 712, except at the electrical connection area 727, where the rear substrate may be cut back or reduced along a cut-away or cut back edge 714c. The conductive bridge 723 is positioned at a portion of the electrical connection area 727 to provide electrical connection to the metallic reflective coating or layer 720 via electrical connector 724 at front substrate 712.

When the substrates 712, 714 are placed together to form the electro-optic or electrochromic mirror cell or reflective element assembly (with the electro-optic or electrochromic medium disposed or sandwiched therebetween), the electrical connection area 727 of rear substrate 714 generally aligns with a portion of the electrical connection area 725 of front substrate 712. The conductive bridge 723 bridges or spans the gap or spacing between the electrical connection areas 725a and 727 to connect the electrical contact or connector 724 and electrical connection area 725a to the metallic conductive reflective layer 720 of rear substrate 714.

The cut-away edge 714c of rear substrate 714 provides for exposure of the electrical connectors or contacts 722, 724 along the outer edge 712c of the electrical connection area 725 of front substrate 712. The electrical contacts for providing electrical power to the conductive or semi-conductive layers at both substrates are made at only one of the substrates. The other edges of the substrates 712, 714 are generally flush or aligned to form a flush reflective element assembly for an exterior rearview mirror assembly. The reflective element assembly may thus be implemented in a mirror assembly having a minimal bezel or a bezelless mirror assembly to enhance the appearance of the mirror assembly.

Figure 26:
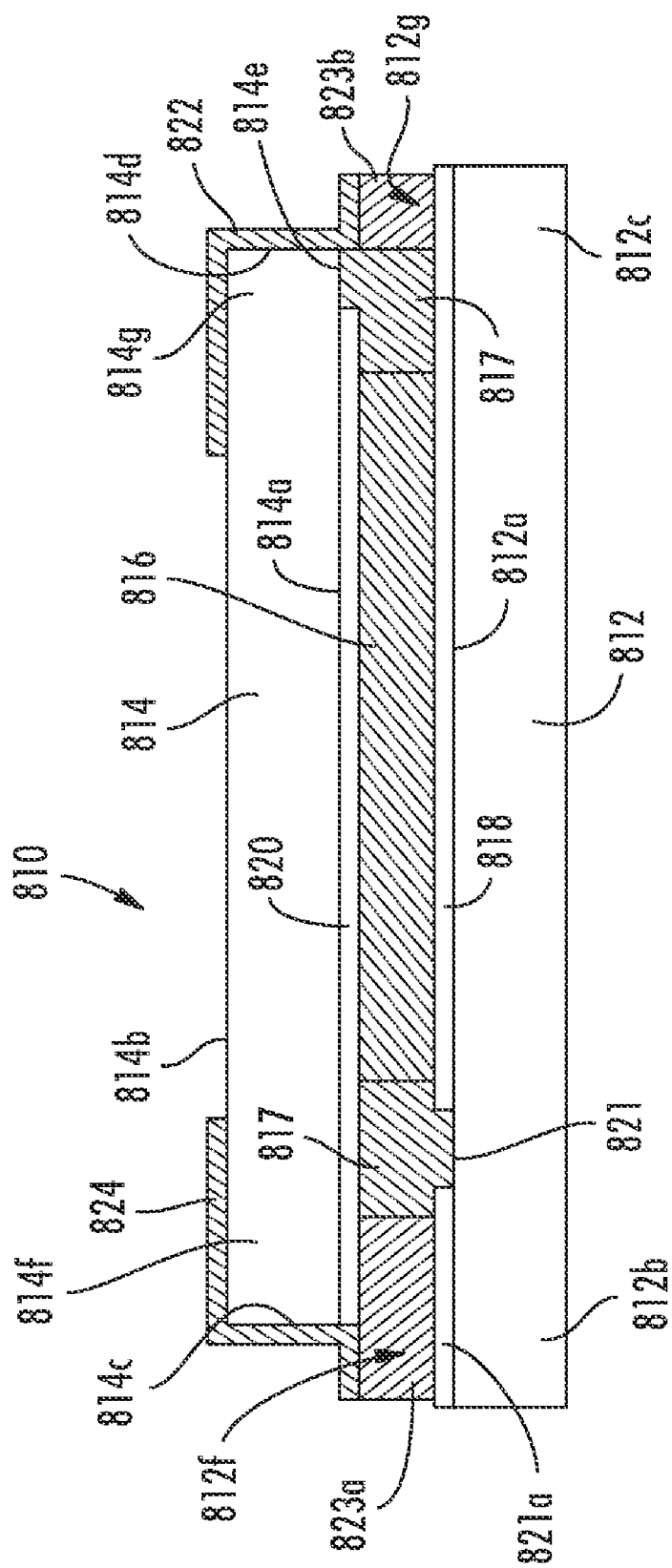
FIG. 26 is a sectional view of another electro-optic reflective element assembly in accordance with the present invention, with the electrical connections provided at the front substrate.
Figure 27:
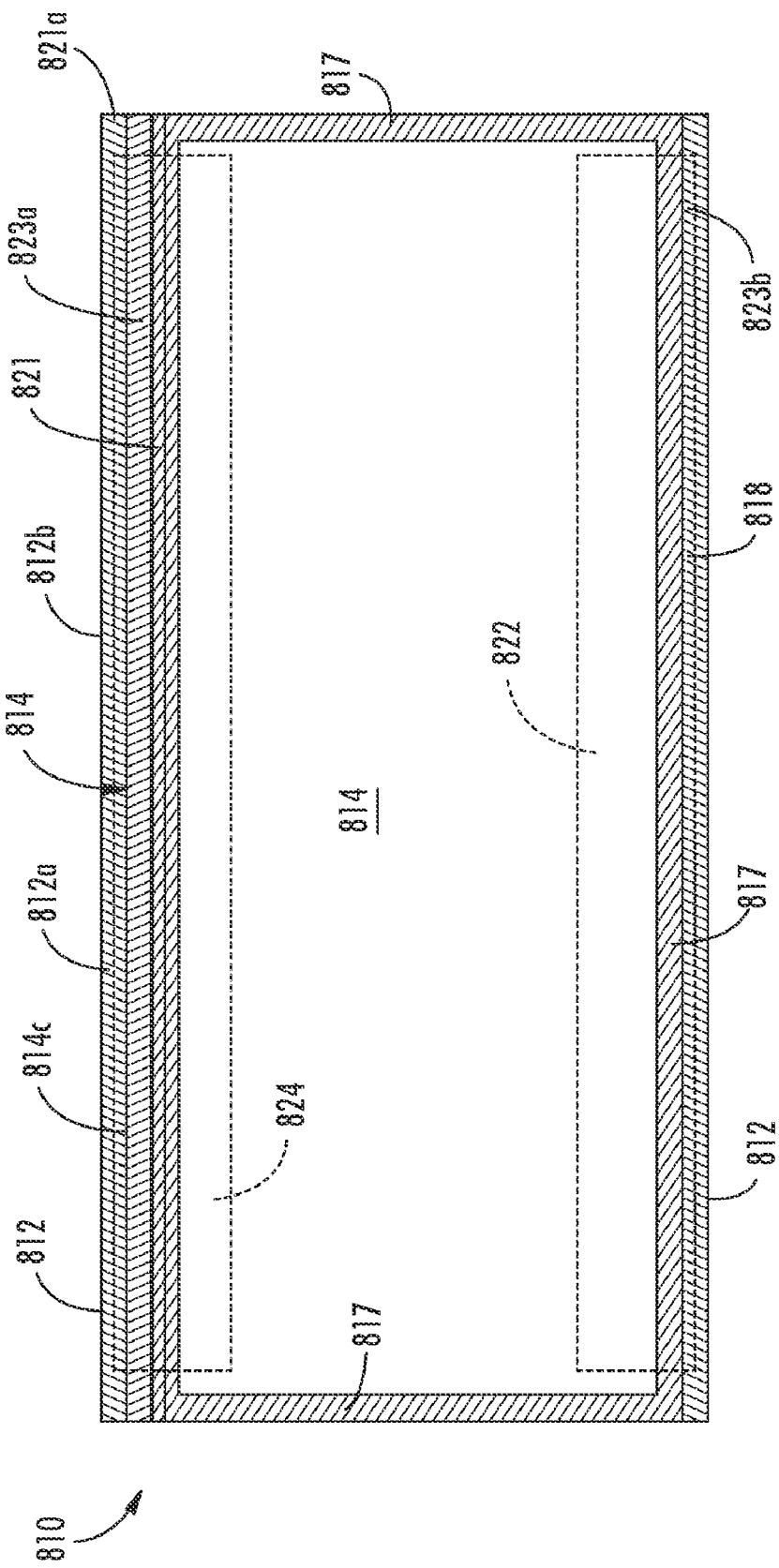
FIG. 27 is a plan view of the electro-optic reflective element assembly of FIG. 26.

Referring now to FIGS. 26 and 27, an electro-optic or electrochromic mirror cell or reflective element assembly 810 includes a front substrate 812 and a rear substrate 814 and an electro-optic or electrochromic medium 816 sandwiched between the semi-conductive or conductive layers 818, 820 on the surfaces 812a, 814a of the substrates 812, 814, respectively. A dimension of the front substrate, such as a height dimension, is greater than that of the rear substrate, such that the upper and lower perimeter regions or edge portions 812b, 812c of front substrate 812 extend beyond the upper and lower perimeter regions or edge portions 814f, 814g of rear substrate 814 and define overhang regions 812f, 812g. As shown in FIG. 26, the conductive layer 820 of rear substrate 814 does not extend fully over third surface 814a at the perimeter region 814g of substrate 814. Third surface 814a may be masked during the coating process, such that a non-conductive glass surface 814e is provided generally along the perimeter region 814g of surface 814a.

Reflective element assembly 810 includes electrical connectors 824, 822 at a rear surface 814b of rear substrate 814 and at least partially along the upper edge 814c and lower edge 814d of rear substrate 814, respectively. The connectors may be disposed partially at the rear surface 814b of rear substrate 814 and may extend along and overlap the edges 814c, 814d of rear substrate 814. The electrical or metallic connectors 824, 822 are in electrical connection with the respective conductive layers 820, 818 and may be connected to an electrical power source or circuitry or the like to provide electrical power to the semi-conductive coatings 818, 820 to darken or color the electrochromic medium 816. The front substrate 812 includes a deletion line 821 along the upper portion 812b of the substrate and along the semi-conductive coating or layer 818 on the rear surface 812a of substrate 812. The deletion line 821 defines an electrically isolated area or region 821a along a perimeter region of substrate 812, such as along the upper portion of the substrate 812.

As can be seen with reference to FIG. 27, the reflective element assembly 810 includes a non-conductive perimeter seal 817 around the electrochromic medium 816, as is known in the art. The seal 817 overlaps and at least partially or substantially fills or encompasses the deletion line 821 along one side of the reflective element assembly and at least partially or substantially fills or covers or encompasses the masked surface 814e along the other side of the reflective element assembly. A conductive material or adhesive or bridge or the like 823a is disposed or applied along the upper region of the front substrate and outside of the seal 817, while a conductive material or adhesive or bridge or the like 823b is disposed or applied along the lower region of the front substrate and outside of the seal 817. Accordingly, when power is applied to connector 822, the connector provides or delivers power to or energizes the semi-conductive layer 818 on front substrate 812 via the conductive bridge 823b (whereby the conductive bridge may function as an electrical raceway along the edge of the reflective element assembly). The non-conductive seal 817 and non-conductive surface 814e of rear substrate 814 function to electrically isolate or insulate connector 822 and conductive bridge 823b from conductive coating or layer 820 of rear substrate 814. When power is applied to connector 824, the connector provides or delivers power to the conductive layer 820 on rear substrate 814 via contact of the connector 824 along the edge of the conductive coating 820 and via the conductive bridge 823a along the edge or perimeter region of the reflective element assembly. The conductive bridge 823a and raceway portion 821a may function as an electrical raceway along an edge portion or perimeter region of the conductive layer or coating 820 of rear substrate 814. The conductive bridge 823a does not power the semi-conductive layer 818 on front substrate 812 because the conductive bridge 823a is at the electrically isolated area 821a along the upper portion or perimeter region of the front substrate.

Figure 28:
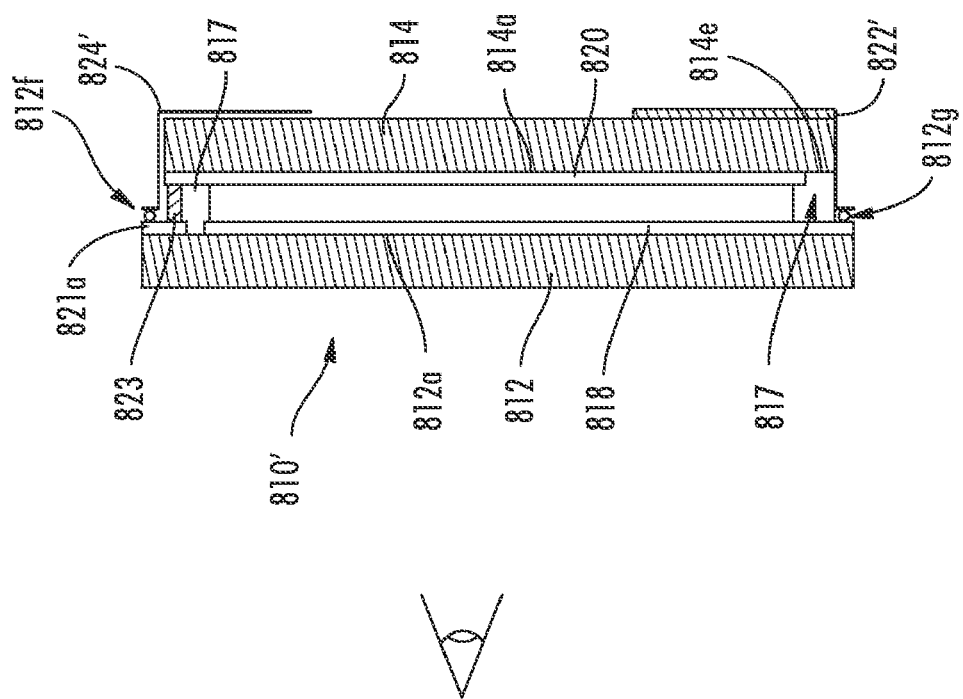
FIG. 28 is a sectional view of another electro-optic reflective element assembly in accordance with the present invention.

Optionally, and as shown in FIG. 28, an electro-optic or electrochromic mirror cell or reflective element assembly 810' may include metallic connectors 822', 824' that extend across the gap between the substrates 812, 814 and contact the semi-conductive layer 818 on the rear surface 812a of the front substrate 812. The conductive bridge 823 functions to communicate the power from connector 824' to the conductive layer 820 on the front surface 814a of rear substrate 814. The deletion line 821 defines the electrically isolated area 821a along the front substrate where the connector 824' connects to or contacts the semi-conductive layer 818 of the front substrate 812 at the overhang region 812f of front substrate 812. The connector 822' contacts the surface portion of the semi-conductive layer 818 (which substantially covers the rear surface of the front substrate 812) along the other border or perimeter region or overhang region 812g of the front substrate. The non-conductive glass surface 814e and non-conductive perimeter seal 817 function to electrically isolate or insulate the connector 822' from conductive coating 820 of rear substrate 814. The mirror cell or reflective element assembly 810' is otherwise substantially similar to the reflective element assemblies discussed above, such that a detailed discussion of the reflective element assembly will not be repeated herein.

Optionally, and as shown in FIG. 29, a reflective element assembly 810" is substantially similar to the reflective element assembly 810', discussed above, but includes conductive pins or foil strips 822", 824". The foil strips 822", 824" are disposed between a heater pad or backing plate 811 and the semi-conductive layer 818 at the rear surface 812a of the front substrate 812. The strips 822", 824" may include one or more pins or extensions 822a", 824a" extending rearwardly through the backing plate 811 for connection to an appropriate power source, control or circuitry or the like. The conductive bridge 823 functions to communicate the power from strip 824" to the conductive layer 820 on the front surface 814a of rear substrate 814. The deletion line 821 defines the electrically isolated area 821a along the front substrate where the strip 824" connects to or contacts the semi-conductive layer 818 of the front substrate 812. The strip 822" contacts the surface portion of the semi-conductive layer 818 along the other border or perimeter region of the front substrate and may function as an electrical raceway along the border region of the semi-conductive layer 818. The mirror cell or reflective element assembly 810" is otherwise substantially similar to the reflective element assemblies discussed above, such that a detailed discussion of the reflective element assembly will not be repeated herein.

Figure 30:
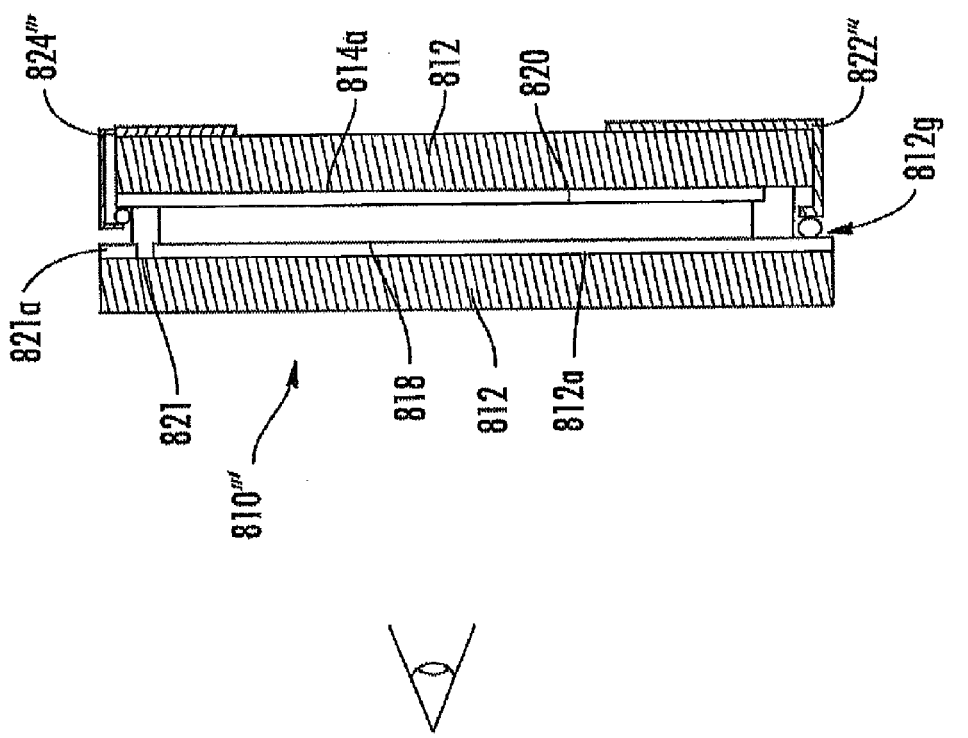
FIG. 30 is a sectional view of another electro-optic reflective element assembly in accordance with the present invention.

Optionally, and with reference to FIG. 30, a reflective element assembly 810''' includes metallic connectors or strips or foil 822', 824''' that are inserted partially between the substrates 812, 814. The strip or foil 822''' extends across the gap between the substrates 812, 814 and contacts the semi-conductive layer 818 on the rear surface 812a of the front substrate 812 and generally at the overhang region 812g. The strip or foil 824''' contacts and connects to the conductive layer 820 on the front surface 814a of rear substrate 814. The deletion line 821 defines the electrically isolated area or raceway portion 821a along the front substrate where the strip or foil 824''' is generally positioned to isolate that portion of the front substrate to avoid shorting of the cell or reflective element assembly due to any contacting of the strip or foil 824''' to the surface portion of the semi-conductive layer 818 of the front substrate 812. The mirror cell or reflective element assembly 810''' is otherwise substantially similar to the reflective element assemblies discussed above, such that a detailed discussion of the reflective element assembly will not be repeated herein. As can be seen in FIG. 31, the connectors or strips or foils 822''', 824''' may be insulated on their sides 822a''', 824a''' opposite to their electrically contacting side, such that the deletion line is not necessary.

Optionally, and with reference to FIG. 32, an electro-optic or electrochromic cell or reflective element assembly 910 includes a front substrate 912 and a rear substrate 914 with an electro-optic or electrochromic medium 916 sandwiched between a semi-conductive layer or coating (such as ITO or the like) 918 on the rear surface 912a of the front substrate 912 and a conductive layer or coating 920 (such as silver, silver alloy, or the like) on the front surface 914a of the rear substrate 914. A perimeter seal 917 is disposed around the electrochromic medium 916. As can be seen in FIG. 32, the conductive layer 920 is applied or coated or oversprayed at least partially onto the edges 914b, 914c of the rear substrate 914. The conductive layer 920 on the rear substrate 914 includes a deletion line 921 to define an electrically isolated area or raceway portion 921a along a perimeter or border region or portion of the rear substrate 914. A conductive material or bridge 923 (such as a conductive epoxy, frit, paste or the like) is disposed along the perimeter or border region and between the electrically isolated area 921a and the semi-conductive layer 918 of front substrate 912.

An electrical connector 922 is disposed at the rear substrate, such as partially along the rear surface 914d of rear substrate 914, and overlaps at least a portion 920a of the conductive layer 920 on the edge 914b of rear substrate 914, thereby providing an electrical connection from the rear of the reflective element assembly 910 to the electrically isolated area 921a of the conductive layer 920. The connector 922 thus provides an electrical connection to the semi-conductive layer 918 on the rear surface 912a of the front substrate 912 via the conductive bridge 923 extending along and between the isolated area 921a and the semi-conductive layer 918 at the perimeter or border regions of the front and rear substrates. The isolated area 921a and the conductive bridge 923 provide an electrical raceway along a perimeter or border portion of the semi-conductive layer 918 to enhance the performance of the reflective element assembly 910.

A second electrical connector 924 is disposed partially along the rear surface 914d of the rear substrate 914 and overlaps at least a portion 920b of the conductive layer 920 at the edge 914c of rear substrate 914, thereby providing an electrical connection from the rear of the reflective element assembly 910 to the conductive layer 920 along the front surface 914a of rear substrate 914.

Referring now to FIGS. 33A-C, an electro-optic or electrochromic cell or reflective element assembly 1010 includes a front substrate 1012 and a rear substrate 1014 with an electro-optic or electrochromic medium 1016 sandwiched between a semi-conductive layer or coating (such as ITO or the like) 1018 on the rear surface 1012a of the front substrate 1012 and a conductive layer or coating (such as silver, silver alloy or the like) 1020 on the front surface 1014a of the rear substrate 1014. A perimeter seal 1017 is disposed around the electrochromic medium 1016. The semi-conductive layer 1018 on the front substrate 1012 includes a deletion line 1019 to define an electrically isolated area or raceway portion 1019a along a perimeter or border region or portion 1012b of the front substrate 1012, while the conductive layer 1020 on the rear substrate 1014 includes a deletion line 1021 to define an electrically isolated area or raceway portion 1021a along a perimeter or border region or portion 1014b of the rear substrate 1014. A conductive material or bridge 1023a (such as a conductive epoxy, film, frit, paste or the like) is disposed along the perimeter or border region 1012b and between the electrically isolated area 1019a and the conductive layer 1020 of rear substrate 1014, while a second conductive material or bridge 1023b (such as a conductive epoxy, film, fit, paste or the like) is disposed along the opposite perimeter or border region 1014b and between the electrically isolated area 1021a and the semi-conductive layer 1018 of front substrate 1012.

As can be seen in FIGS. 33B and 33C, the rear substrate 1014 includes a pair of notches 1025a, 1025b to provide for electrical contact to the respective conductive bridges 1023a, 1023b. As best shown in FIG. 33C, an electrical connector or contact (not shown) may engage or contact the conductive bridge 1023a at the notch or cut away 1025a, whereby the conductive bridge 1023a may function as an electrical raceway along the border region 1014c of rear substrate 1014, while the electrically isolated area 1019a and deletion line 1019 of border region 1012b of front substrate 1012 substantially precludes electrical power from reaching the semi-conductive layer 1018 along the rear surface 1012a of front substrate 1012. Likewise, another electrical connector or contact may engage or contact the conductive bridge 1023b at the notch or cut away 1025b, whereby the conductive bridge 1023b may function as an electrical raceway along the border region 1012c of front substrate 1012, while the electrically isolated area 1021a and deletion line 1021 of border region 1014b of rear substrate 1014 substantially precludes electrical power from reaching the conductive layer 1020 along the front surface 1014a of rear substrate 1014.

Figure 34:
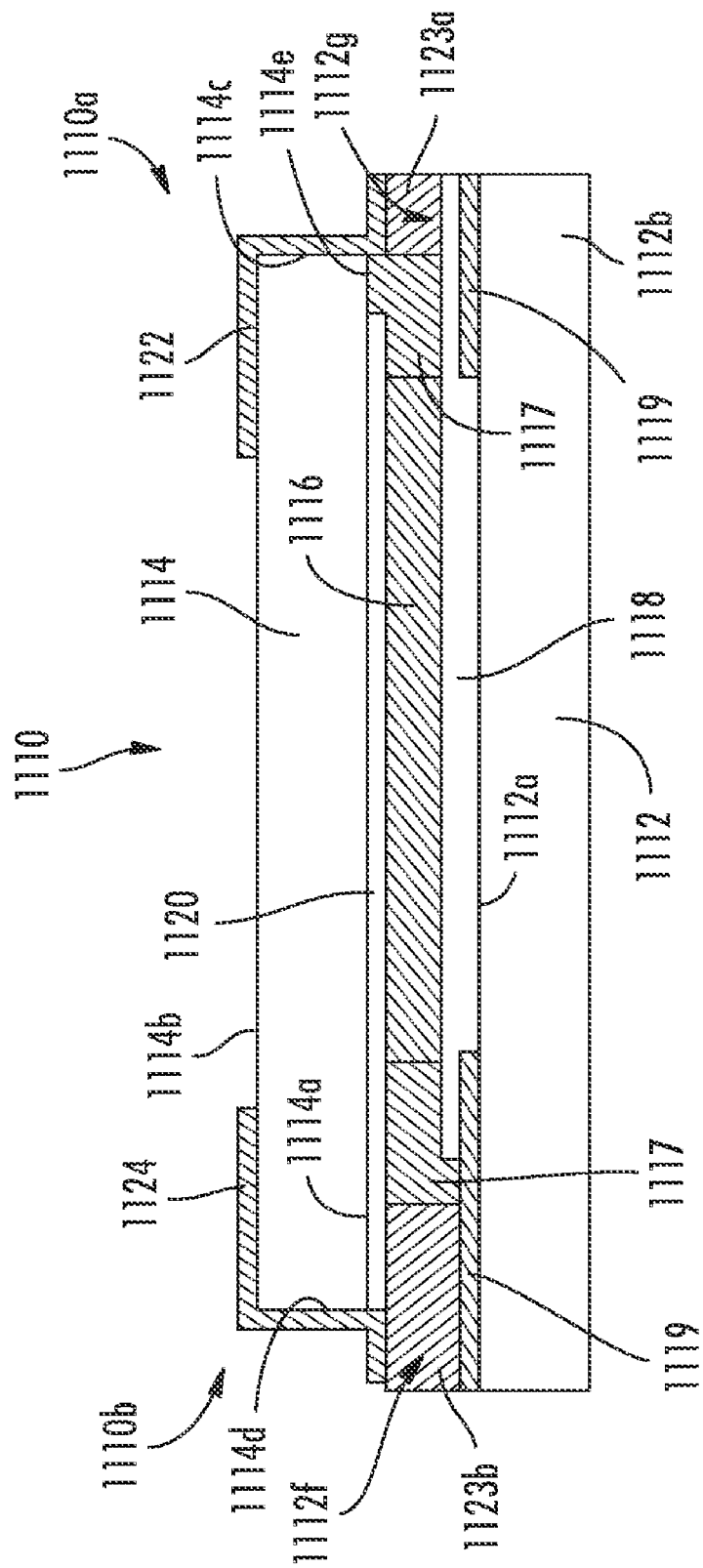
FIG. 34 is a sectional view of another electro-optic reflective element assembly in accordance with the present invention.

Referring now to FIG. 34, an electro-optic or electrochromic cell or reflective element assembly 1110 includes a front substrate 1112 and a rear substrate 1114 with an electro-optic or electrochromic medium 1116 sandwiched between a semi-conductive layer or coating (such as ITO or the like) 1118 on the rear surface 1112a of the front substrate 1112 and a conductive layer or coating (such as silver, silver alloy, or the like) 1120 on the front surface 1114a of the rear substrate 1114. A perimeter seal 1117 is disposed around the electrochromic medium 1116. The front substrate 1112 includes an opaquifying or darkening or blackening or concealing or hiding non-conductive border coating 1119 disposed around the perimeter regions or border of the rear surface 1112a. The border coating 1119 may comprise a decorative and/or color matching coating, and may be colored to match the body color, the color of the mirror case or the color of the electrochromic medium in its night state, or any other desired color. The transparent semi-conductive coating or layer 1118 is disposed on the rear surface 1112a of front substrate 1112 and may at least partially overlap the non-conductive border coating 1119, at least along one border region 1112b of the front substrate 1112, such as shown in FIG. 34.

Reflective element assembly 1110 includes an electrical connector 1122 that may be disposed at a perimeter or border region 1110a of the reflective element assembly for providing or delivering electrical power to the semi-conductive layer 1118 of front substrate 1112 via a conductive bridge or adhesive 1123a. As can be seen in FIG. 34, the connector 1122 is formed to overlay the rear surface 1114b of rear substrate 1114 and extend along an edge 1114c of the rear substrate and contact the conductive bridge 1123a disposed between the connector 1122 and the semi-conductive layer 1118 and outside of the perimeter seal 1117 at the overhang region 1112g. The conductive layer 1120 may not extend fully across the front surface 1114a of rear substrate 1114 at the connector 1122, so that a non-conductive glass surface 1114e is defined along the perimeter edge portion or region 1114c of rear substrate, whereby a gap is defined between the connector 1122 and conductive layer 1120. The non-conductive glass surface 1114e or gap and the non-conductive perimeter seal 1117 function to electrically isolate or insulate the connector 1122 from conductive coating 1120 of rear substrate 1114 to preclude shorting of the electrochromic cell or reflective element assembly.

Likewise, a second electrical connector 1124 may be disposed on another perimeter region 1110b of the reflective element and may be formed to overlay the rear surface 1114b of rear substrate 1114 and extend along an edge 1114d of the rear substrate and contact the conductive bridge 1123b disposed between the connector 1124 and the conductive layer 1120 and outside of the perimeter seal 1117. The conductive layer or coating 1118 of front substrate 1112 may not extend fully across the surface 1112a of front substrate 1112 so as to define a non-conductive surface or area of border coating 1119 at conductive bridge 1123b and generally at the overhang region 1112f. The second surface 1112a of front substrate 1112 and the non-conductive border coating 1119 and non-conductive seal 1117 function to electrically isolate or insulate the connector 1124 and conductive adhesive 1123b from the conductive coating 1118 of front substrate 1112. The second connector 1124 may provide electrical power to the metal reflector coating or conductive layer 1120 on the rear substrate 1114, with the conductive adhesive 1123b acting as a raceway along a perimeter or border region of the front surface of the rear substrate 1114. The connectors 1122, 1124 may be connected to an appropriate power source, control, circuitry or the like for controlling the electrochromic cell or reflective element assembly.

Figure 35:
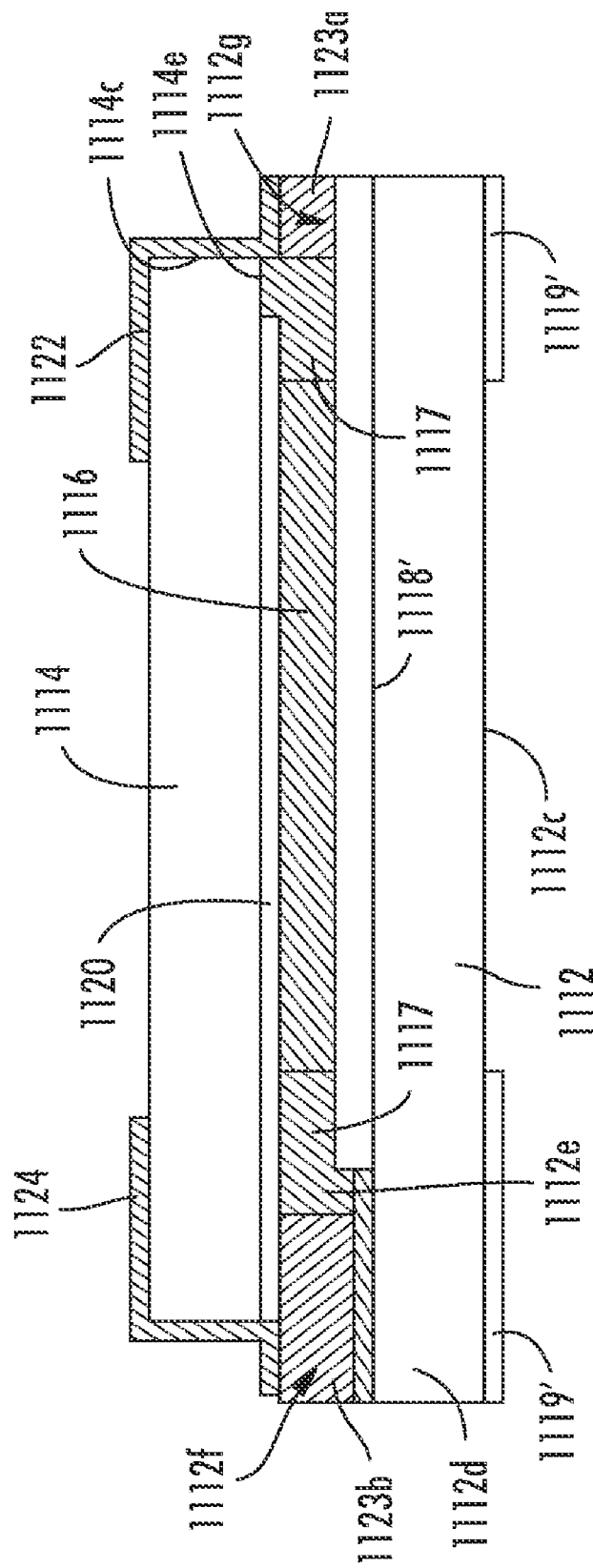
FIG. 35 is a sectional view of another electro-optic reflective element assembly in accordance with the present invention.
Figure 36:
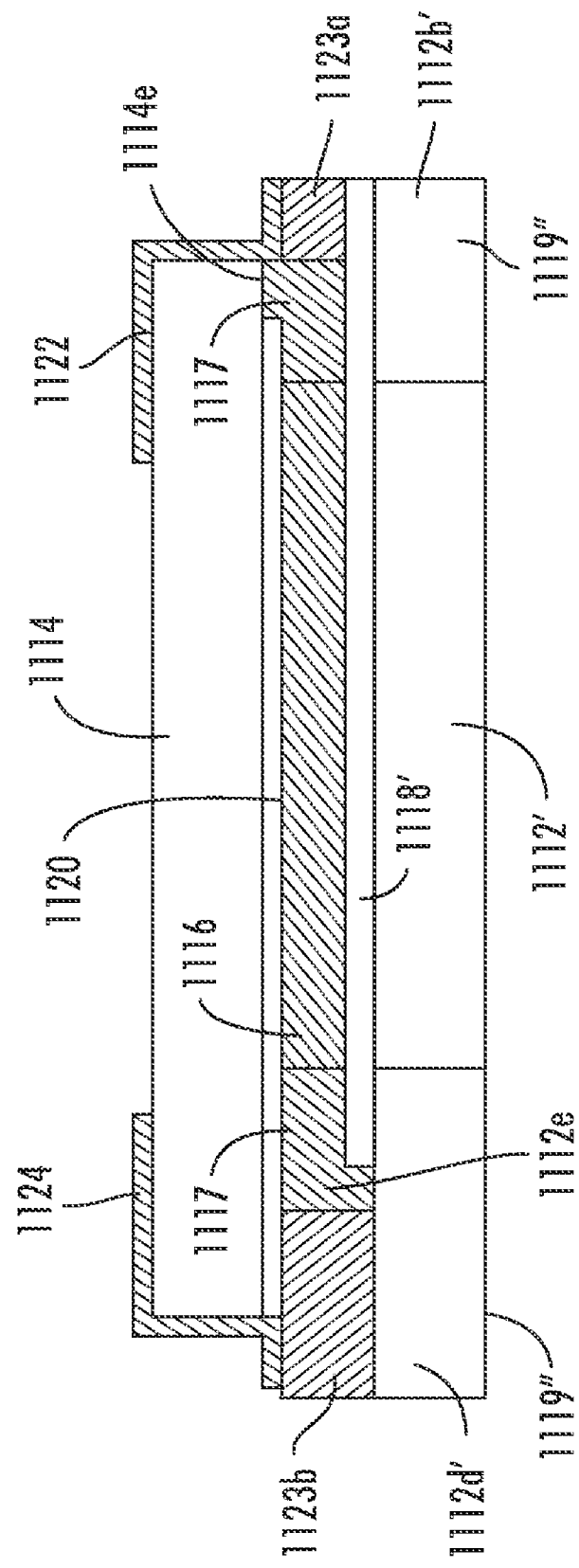
FIG. 36 is a sectional view of another electro-optic reflective element assembly in accordance with the present invention.

Optionally, and as shown in FIG. 35, an opaquifying non-conductive border coating or layer 1119' may be disposed along the front surface 1112c of front substrate 1112 to provide a decorative border coating along the perimeter or border regions of the front surface 1112c of front substrate 1112. The transparent semi-conductive coating or layer 1118' thus may be disposed on the rear surface 1112a of front substrate 1112 in a generally uniform thickness and may coat the border region 1112b, but may not extend to the border region 1112d, thereby defining a non-conductive area or electrically isolated area or non-conductive glass surface 1112e at the border region 1112d. The non-conductive glass surface 1112e and non-conductive seal 1117 function to electrically isolate or insulate the conductive coating 1118 of front substrate 1112 from connector 1124 and conductive adhesive 1123b generally at the overhang region 1112f. Likewise, and as described above, the conductive coating 1120 may not extend to the edge 1114c of rear substrate 1114 to define a non-conductive glass surface 1114e at and adjacent to connector 1122, so that connector 1122 is electrically isolated and insulated from conductive coating 1120 by non-conductive surface 1114e and non-conductive seal 1117. Optionally, and as shown in FIG. 36, an opaquifying border 1119" may be embedded in the border regions 1112b', 1112d' of the front substrate 1112', such as via a radiation induced coloration in the glass of the substrate or via other means or processes.

Figure 37:
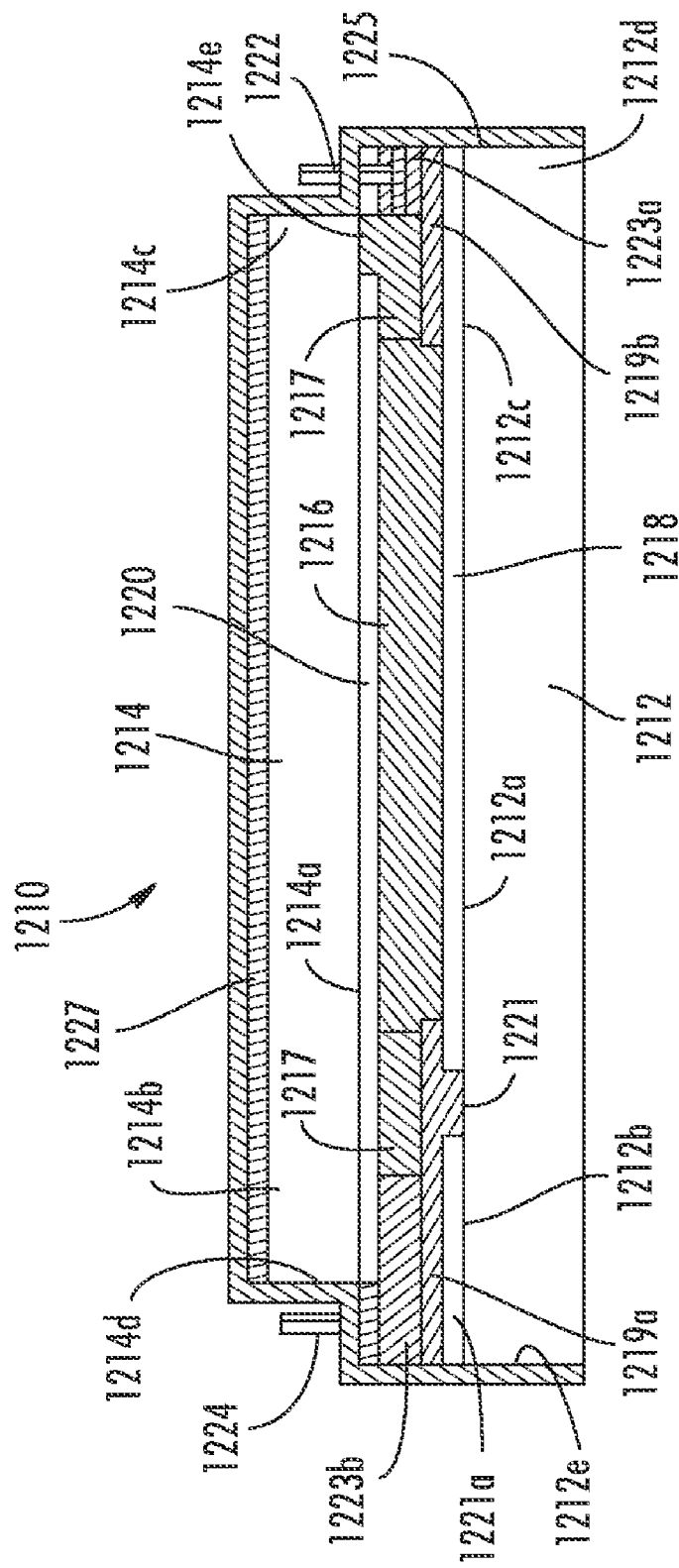
FIG. 37 is a sectional view of another electro-optic reflective element assembly in accordance with the present invention.

Referring now to FIG. 37, an electro-optic or electrochromic cell or reflective element assembly 1210 includes a front substrate 1212 and a rear substrate 1214 with an electro-optic or electrochromic medium 1216 sandwiched between a semi-conductive layer or coating (such as ITO or the like) 1218 on the rear surface 1212a of the front substrate 1212 and a conductive layer or coating (such as silver, silver alloy, or the like) 1220 on the front surface 1214a of the rear substrate 1214. The conductive coating 1220 of rear substrate 1214 does not extend fully to the edge 1214c of substrate 1214, so that a non-conductive glass surface or area or region 1214e is defined on surface 1214a along the perimeter portion at edge 1214c. A non-conductive perimeter seal 1217 is disposed around the electrochromic medium 1216 and may at least partially or substantially fill or cover or encompass the non-conductive glass surface 1214e. The non-conductive glass surface 1214e and non-conductive seal 1217 thus function to electrically isolate or insulate the conductive coating 1220 from the connector 1222 and conductive adhesive 1223a.

The front substrate 1212 includes an opaquifying or darkening or blackening or concealing or hiding non-conductive border coating 1219a disposed over the semi-conductive layer 1218 and around or along a perimeter region or border 1212b of the rear surface 1212a of the front substrate 1212, and an opaquifying conductive border coating 1219b disposed over the semi-conductive layer 1218 and around or along a perimeter region or border 1212c of the rear surface 1212a of the front substrate 1212. The transparent semi-conductive coating or layer 1218 may include a deletion line 1221 to define an electrically isolated area or region 1221a, with the non-conductive border coating 1219a disposed along the semi-conductive layer 1218 and over the deletion line 1221. The non-conductive border coating 1219a may at least partially or substantially fill in or encompass deletion line 1221. The non-conductive border coating 1219a and deletion line 1221 thus function to electrically isolate or insulate the conductive coating 1218 from electrical connector 1224.

In the illustrated embodiment, the reflective element assembly 1210 includes an encapsulant 1225 which substantially surrounds the rear and side edges of the reflective element assembly and may cover or overlay a heater pad or the like 1227 at the rear surface 1214b of the rear substrate 1214. The encapsulant 1225 extends along the edges 1214c, 1214d of rear substrate 1214, and further at least partially along the perimeter edges 1212d, 1212e of front substrate 1212. A metal connector 1222 may be provided through the encapsulant 1225 to power or energize the semi-conductive layer 1218 on rear surface 1212a of front substrate 1212 via a conductive bridge or epoxy or adhesive 1223a disposed at least partially around the connector 1222 and between the connector 1222 and the opaquifying conductive border coating 1219b. As can be seen in FIG. 37, the connector 1222 may be disposed generally within the conductive bridge 1223a and the non-conductive glass surface 1214e and non-conductive seal 1217 may separate or isolate the connector 1222 and conductive bridge 1223a from the conductive layer or coating 1220 of rear substrate 1214, in order to avoid contact or electrical communication between the connector 1222 and the conductive layer 1220 on front surface 1214a of rear substrate 1214.

Likewise, the metal connector 1224 may be provided through the encapsulant 1225 to power or energize the conductive layer 1220 on front surface 1214a of rear substrate 1214 via a conductive bridge or epoxy or adhesive 1223b disposed at least partially around the connector 1224 and between the connector 1224 and the opaquifying conductive border coating 1219a, and further between the opaquifying conductive border coating 1219a and the conductive layer 1220. The non-conductive border coating 1219a and deletion line 1221 thus serve to electrically isolate the connector 1224 and conductive bridge 1223b from conductive layer or coating 1218 of front substrate 1212.

Figure 38:
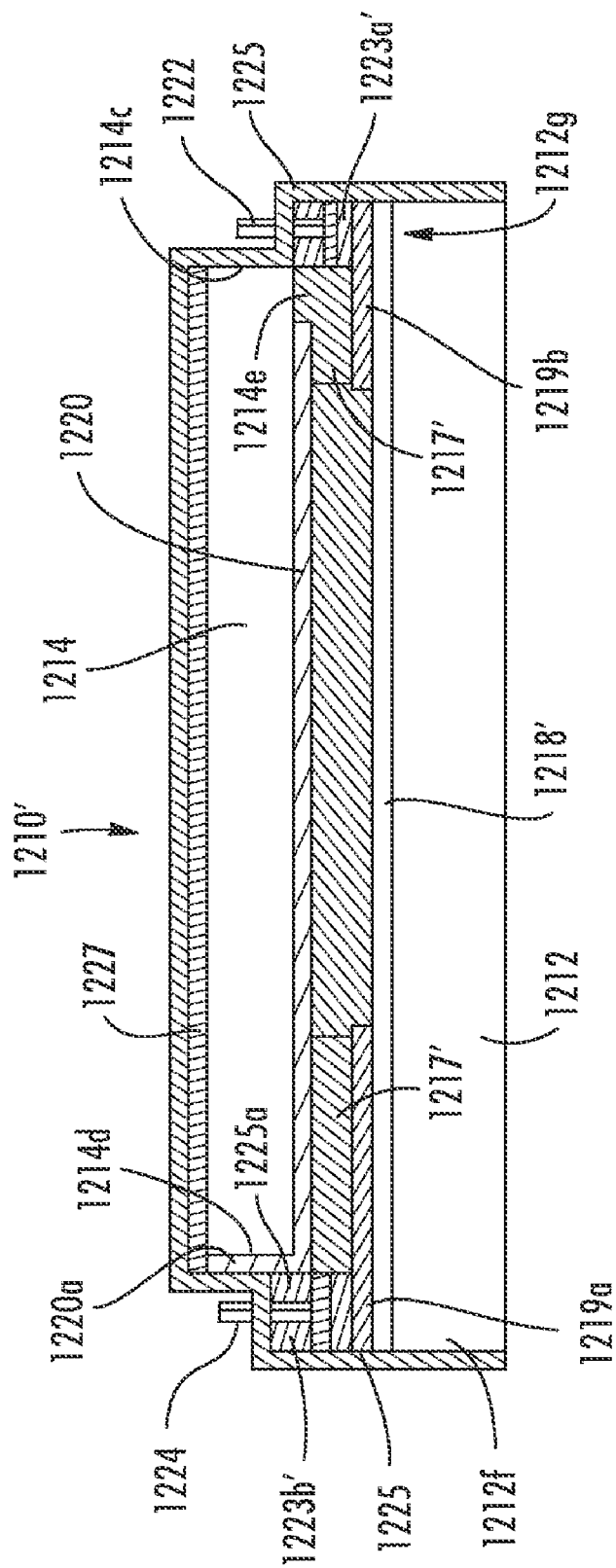
FIG. 38 is a sectional view of another electro-optic reflective element assembly in accordance with the present invention.

Optionally, and with reference to FIG. 38, the conductive bridge or adhesive 1223b' may be disposed at the overhang regions 1212f, 1212g of the front substrate 1212, with the perimeter seal 1217' disposed generally flush with the edges 1214c, 1214d of the rear substrate 1214. As can be seen in FIG. 38, the connectors 1222, 1224 may be positioned generally within the respective conductive bridges 1223a, 1223b', whereby the electrical contact to the conductive coating 1219b (and the semi-conductive layer 1218') and to the conductive layer 1220 is through the respective conductive bridges 1223a', 1223b'. The conductive metallic reflector layer 1220 on front surface 1214a of rear substrate 1214 may not be applied at the outer perimeter region of the front surface 1214a to provide a non-conductive glass surface or region or area 1214e at or near or adjacent to the connector 1222 and conductive bridge 1223a' to electrically isolate or insulate connector 1222 and conductive bridge 1223a' from conductive layer 1220 of rear substrate 1214.

The conductive bridge 1223b' may contact the conductive layer 1220 along an edge portion 1220a of the conductive layer. Optionally, in such an embodiment, the edge portion 1220a of the metallic reflector or conductive layer 1220 may wrap at least partially around the edge dimension 1214d of the rear substrate 1214 to extend partially along the edge 1214d, and the encapsulant 1225 may provide a cavity 1225a partially along the edge 1214d for receiving the conductive bridge or epoxy or adhesive or paste or frit or the like 1223b' to provide contact to the conductive layer 1220 along the wrapped edge portion 1220a of the conductive layer 1220 to enhance the electrical contact and conductivity from the connector 1224 to the conductive layer 1220. The reflective element assembly 1210' thus may provide an enlarged electro-optic or electrochromic region of the reflective element assembly by reducing the conductive bridge region for the conductive adhesive or bridge 1223b'.

Therefore, the present invention provides an electro-optic or electrochromic reflective element assembly that provides electrical contact to electrical raceways or conductive layers or coatings along regions or border or perimeter regions of the assembly that have a restricted overhang. The electrical connections may be made at overhang regions of the front substrate where the perimeter regions of the front substrate extend beyond the corresponding perimeter regions of the rear substrate, such that the electrical connectors are not viewable through the front surface of the front substrate. The present invention thus may provide a reduced or minimal bezel or no bezel assembly and may provide enhanced performance of the electrochromic minor assembly. The conductive epoxy or adhesive or bridge may provide an electrical raceway along a perimeter or border portion of the semi-conductive and/or conductive layers of the substrates to provide rapid electrical flow along the layers or coatings to further provide rapid and substantially uniform darkening or coloring of the electrochromic medium. The connectors and bridges of the present invention facilitate such enhanced performance at a restricted overhang region and thus provide for a minimal bezel or no bezel around the perimeter of the reflective element assembly. The electrical connectors are electrically isolated or insulated from the other conductive layer or coating via a non-conductive surface and non-conductive seal being positioned between the connector and the respective other conductive layer.

In the embodiments described above, it is envisioned that the non-conductive glass surfaces (where applicable) may be formed by masking the surface of the substrate during coating or deposition of the conductive layer or coating, or may be formed by etching (such as laser etching, chemical etching, mechanical etching or the like) or otherwise removing the conductive layer or coating at the desired area or region, such as via a high voltage discharge to remove or burn the coating off of the desired area or region. The masked portion or etched portion or non-conductive portion may be generally at the outer perimeter or edge of the coating, and may have a width of approximately 0.05 mm, or approximately 0.1 mm, or up to approximately 1 mm. The masked portion or non-conductive surface may be partially or substantially filled or encompassed by the non-conductive seal or by other non-conductive layers or the like disposed at the surface of the substrate. Likewise, the deletion lines (where applicable) may be formed on and through the respective conductive or semi-conductive layer to define electrically isolated areas or regions of the layers. The deletion lines may be formed via any known manner, such as via chemical etching, mechanically etching or, and preferably, laser etching of the layers. The size or width of the deletion line is selected to be sufficient to create an electrical break so there is no electrical conductivity between the layer and the electrically isolated region of the layer. Typically, the deletion lines may be formed to be approximately 0.01 mm to approximately 0.5 mm or thereabouts.

Also, the perimeter seal that generally surrounds the electrochromic medium and spaces the front and rear substrates may have a width of preferably approximately 0.5 mm to approximately 3 mm, more preferably approximately 1 mm to approximately 2 mm, and most preferably approximately 1.25 mm to approximately 1.75 mm. The overhang that is defined at the edges of the substrates (where, for example, the rear substrate may be smaller than the front substrate) may be preferably approximately 0.1 mm to approximately 2 mm, more preferably approximately 0.25 mm to approximately 1.5 mm, and most preferably approximately 0.75 mm to approximately 1.25 mm.

In addition to other materials to be used as conductive busbars (such as silver frit, paste, conductive inks, and/or the like), optionally, ultrasonic soldering techniques may be used to apply a busbar which consists of solder (typically, standard soldering technique may not provide good adhesion/flow between the solder and a glass substrate). The solder can be used to provide a busbar for an semi-conductive coating (such as ITO or the like) or for a metallic coating. For example, an ultrasonic soldering system made by Asahi Glass company of Japan (e.g., Model: Sunbonder USM-3) may be used for applying this special solder. The solders that may be used include, for example, ultrasonic solders 143 and 297, available from Asahi Glass company. However, other materials may be implemented, such as conductive inks, pastes, flits, and the like, without affecting the scope of the present invention.

Figure 39:
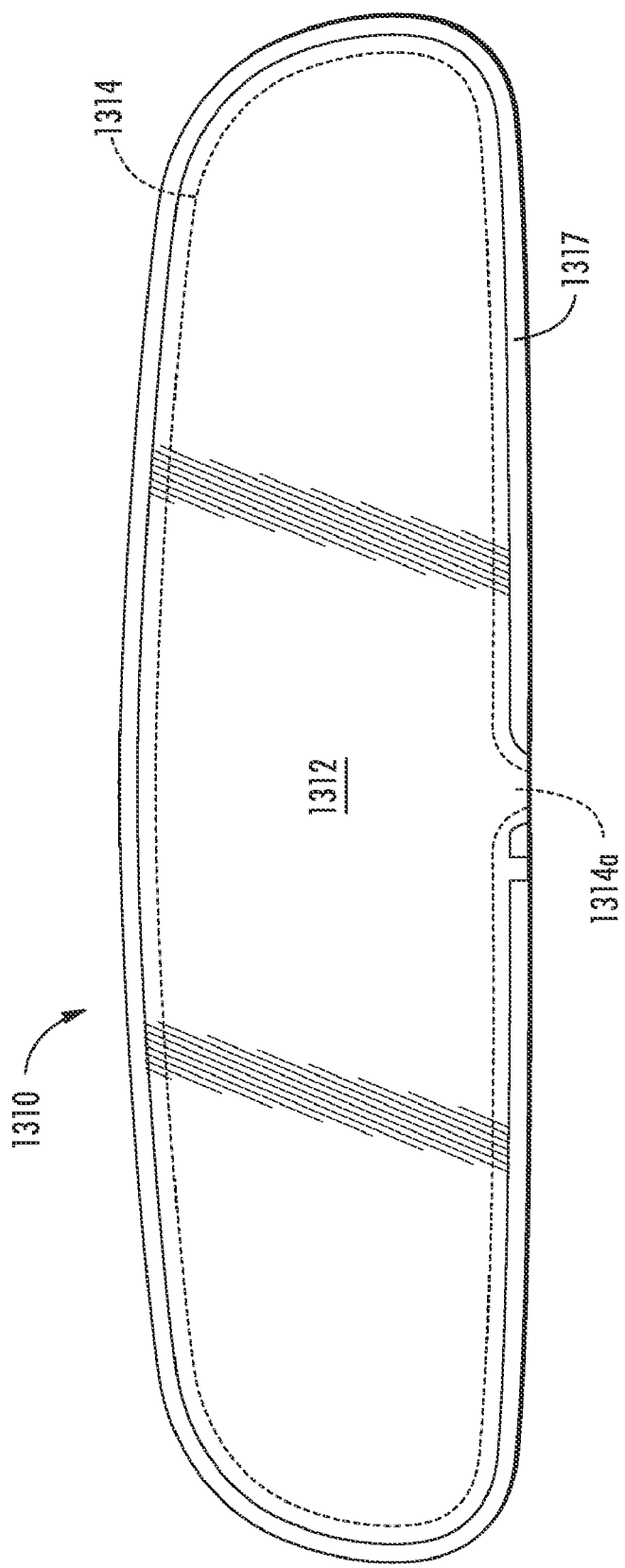
FIG. 39 is a plan view of another electro-optic reflective element assembly in accordance with the present invention.

Optionally, and with reference to FIG. 39, the rear or smaller substrate 1314 of an electro-optic or electrochromic cell or reflective element assembly 1310 may be formed to have a tab out portion or protrusion 1314*a* along one edge. The electro-optic or electrochromic medium may then be injected through an opening or gap in the perimeter seal 1317 (that spaces the front substrate 1312 from the rear substrate 1314) that generally corresponds with the outward protrusion 1314*a* of the rear substrate 1314. A plug is applied or inserted into the gap to seal the electrochromic medium within the perimeter seal and the substrates after the electrochromic medium is injected. Typically, such plugs may be difficult to insert in non-flush edges of mirror cells because they may be visible if they are inserted too far into the gaps in the seals. The tab out portion 1314*a* of the rear substrate 1314 provides an edge portion that is generally flush with the front substrate to provide a larger area for the plug to be positioned at without having the plug insert into the area where it may be visible to a user of the mirror assembly. Optionally, an opaquifying or hiding or darkening layer of the reflective element assembly (if applicable) may be expanded in that area to cover or conceal or hide the plug and tab out portion.

Optionally, the electro-optic or electrochromic cell or reflective element assembly of the present invention and the electrical connectors thereon or therearound may be coated with a protective coating to limit or reduce corrosion that may occur on the electrical connectors over time. The coating may comprise a parylene coating or parylene C coating or the like to enhance corrosion resistance (or may comprise other known parylene coatings, such as a parylene N coating, a parylene D coating or a parylene HT coating or the like). Such a parylene coating may be formed in a plasma chamber or vacuum applied and is highly penetrating or permeating so that the parylene coating may penetrate and surround the metal electrical clips or pins or connectors and seal them to limit corrosion of the electrical components. The parylene coating may comprise a thin coating (such as, for example, approximately 2.5 µm to about 12.5 µm) which coats and permeates anything placed in the chamber and not otherwise covered or masked. The parylene coating may comprise a vacuum applied polymer that is either in a gaseous or solid state, and may possess substantial dielectric and barrier properties per unit thickness. Such parylene coatings are known and are typically used in position sensor applications, intake manifold pressure sensor applications, gas sensor applications and valve cover gasket applications for vehicles.

For example, an electrical clip or connector may be in contact with the semi-conductive or conductive layer and may be susceptible or vulnerable to corrosion at the point where the two come in contact (particularly in a high moisture or salt environment and particularly for exterior rearview mirror assemblies). A parylene coating may be applied to substantially seal the connector at the semi-conductive or conductive layer to resist such corrosion. The electrochromic cell or reflective element assembly (with electrical contacts or connectors attached thereto) may be placed in a chamber and the parylene coating may be applied, such as via a vacuum vapor deposition process or the like. Optionally, two or more cells may be stacked in a stepped or offset manner, such that the edges of each cell are exposed to the parylene coating, while the above and below cell act as a mask over the rest of the cell. The parylene coating thus may only be applied to the offset area. The cells of the stack of cells thus may act as a self masking element for the other cells of the stack. Such a self masking approach with multiple cells may be particularly useful for parylene coatings because of the amount of time that it typically may take to coat an item with such parylene coatings.

The parylene raw material (di-para-xylylene dimer) is a crystalline powder and may be vaporized at approximately 150 degrees C. and then molecularly cleaved or pyrolyzed at approximately 680 degrees C. This forms the para-xylylene, which may be introduced generally at room temperature into a vacuum deposition chamber as a monomeric gas that polymerizes substantially evenly on the substrates. The coating then grows as a conformal film on all of the exposed surfaces, edges, etc. of the substrates or cells.

Testing has shown that a known conventional corrosion protection coating or seal may allow corrosion of the electrical contacts and failure of the mirror after about 12 weeks in a salt spray test chamber (such as a test chamber conducting tests in accordance with ASTM B-117, which is hereby incorporated herein by reference), while a substantially identical or similar mirror coated with a parylene C coating may be substantially unchanged, with the electrical contacts remaining at least substantially uncorroded, after about 22 weeks in the same salt spray test chamber and undergoing the same salt spray test. The parylene coating thus provides substantial enhancement of corrosion resistance and the mirror reflective element life cycle over known mirror corrosion protection means.

Optionally, the mirror assemblies or reflective element assemblies or cells of the present invention may include one or more displays for displaying information to the driver or occupant of the vehicle. Optionally, the conductive or semi-conductive layers of the reflective element assembly may have a metallic layer which may be absent or removed at portions, such as to create a local window for placement therebehind of a light emitting display, such as a compass display or PSIR display or other informational display or the like, such as a display of the type disclosed in commonly assigned U.S. Pat. Nos. 6,222,460 and 6,326,900, which are hereby incorporated herein by reference in their entireties, but while maintaining at least the underlying semi-conducting layer at the local window region so that electrical connection through the electrochromic medium at that local region is sustained.

Optionally, the reflective element assembly of the present invention may include other display systems or elements (not shown) which are operable to provide, emit or display information or light through the reflective element assembly. The light is emitted through the reflective element assembly at a display area, such that the display information or light is viewable by a driver of the vehicle. The second or rear substrate and the respective semi-conductive layers of the reflective element assembly or cell then comprise a transflective one way mirror, such as disclosed in commonly assigned U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference. Preferably, the reflective element assembly (behind which the display is disposed so that the information displayed is visible by viewing through the reflective element assembly) of the mirror assembly comprises a transflective mirror reflector or reflective element assembly such that the mirror reflective element assembly is significantly transmitting to visible light incident from its rear (i.e., the portion furthest from the driver in the vehicle), while simultaneously, the mirror reflective element assembly is substantially reflective to visible light incident from its front (i.e. the position closest to the driver when the mirror assembly is mounted in the vehicle, such as is disclosed in U.S. patent application Ser. No. 09/793,002, filed Feb. 26, 2001 by Schofield et al. for VIDEO MIRROR SYSTEMS INCORPORATING AN ACCESSORY MODULE, now U.S. Pat. No. 6,690,268; and/or in U.S. Pat. Nos. 5,668,663 and 5,724,187, the entire disclosures of which are hereby incorporated by reference herein.

The display system preferably comprises a display-on-demand type of display and includes a display element or light emitting device (also not shown) positioned at the back or fourth surface of the rear substrate. The display element is operable to emit light, such as in the form of indicia, alpha-numeric characters, images, or the like, in response to a control or input. The display element may be a vacuum fluorescent (VF) display, a light emitting diode (LED), an organic light emitting diode (OLED), a gas discharge display, a plasma display, a cathode ray tube, a backlit active matrix LCD screen, an electroluminescent display, a field emission display or the like, without affecting the scope of the present invention. The particular display element may be selected to provide a desired color to the display. For example, a VF display may be selected to provide a blue-green color or other colors to the information displayed (depending on the phosphor selected for the display), while a light emitting diode may be selected to provide other colors, such as reds, ambers, or other colors.

Preferably, the display is a display-on-demand type of display, such as of the types disclosed in commonly assigned U.S. Pat. Nos. 5,668,663 and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; and/or Ser. No. 09/793,002, filed Feb. 26, 2001 by Schofield et al. for VIDEO MIRROR SYSTEMS INCORPORATING AN ACCESSORY MODULE, now U.S. Pat. No. 6,690,268, which are all hereby incorporated herein by reference. With such a display, it is not only desirable to adjust the display brightness according to ambient lighting conditions, but it is also desirable to adjust the display brightness such that a sufficient contrast ratio is maintained against the variable background brightness of the reflected scene. Also, it may be desirable to compensate for changes in transmission of the electrochromic device affected to control rearward glare sources, in order that the display brightness appears to be maintained at a generally constant level.

In certain conditions, the ambient light intensity within the cabin of the vehicle may be sufficiently high so that reflected light from the mirror reflective element and, in particular, from the display region, tends to "wash-out" the display. It is envisioned that this glare may be reduced by taking advantage of the electrochromic function of the mirror assembly. More particularly, the electro-optic or electrochromic medium of the electro-optic or electrochromic reflective element assembly may be colored or darkened in the area of the display by constructing a locally addressable region across the display. This may be achieved by creating a deletion line in the second surface semi-conductive layer at the second surface of the first or front substrate and/or in the third surface semi-conductive layer of the rear substrate, hence breaking electrical continuity from the rest of the electrochromic cell. An ambient light sensor (not shown) may be used to detect the critical ambient light levels at which "wash-out" is a problem. The addressable region may then be separately colored or darkened to the appropriate level to reduce the glare from the display area in response to the ambient light sensor. Although such a glare problem could be solved by coloring the entire mirror, by localizing the region of coloration to only the display area, the electrochromic mirror assembly of the present invention allows the rest of the mirror reflective area, which does not incorporate the display, to retain full reflectivity while the display area is colored or darkened (such as may be useful when driving by day).

In order to maintain easy viewing of the display, it is desirable to adjust the display intensity in response to ambient light levels (in order to avoid washout during daytime driving conditions and glare during nighttime driving conditions) and in response to the degree of transmissivity of the electrochromic reflective element. For example, in low lighting conditions, such as during the nighttime, the intensity of the display may be dimmed to avoid glare, while in higher lighting conditions, such as during the daytime, the intensity of the display may be increased to provide sufficient visibility of the display to the driver of the vehicle. The mirror assembly may include light sensors for sensing the ambient light in the cabin of the vehicle or at the mirror assembly and may include a control which is operable to automatically adjust the display intensity and/or the transmissivity of the electrochromic medium in response to the ambient light sensors.

Further, automatic dimming circuitry used in electro-optic or electrochromic mirror assemblies utilizing the reflective element assemblies of the present invention may utilize one or more (typically two) photo sensors to detect glaring and/or ambient lighting. For example, a silicon photo sensor, such as a TSL235R Light-to-Frequency converter (available from Texas Advanced Optoelectronic Solutions Inc. of Plano, Tex.), can be used as such photo sensors. Such light-to-frequency converters comprise the combination of a silicon photodiode and a current-to-frequency converter on a single monolithic CMOS integrated circuit.

The reflective element assembly or assemblies of the present invention may also include or house a plurality of electrical or electronic devices, such as antennas, including global positioning system (GPS) or cellular phone antennas, such as disclosed in U.S. Pat. No. 5,971,552, a communication module, such as disclosed in U.S. Pat. No. 5,798,688, displays, such as shown in U.S. Pat. Nos. 5,530,240 and 6,329,925, blind spot detection systems, such as disclosed in U.S. Pat. No. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649,756; or 5,178,448, microphones, such as disclosed in U.S. Pat. Nos. 6,243,003 and 6,278,377, speakers, a compass, such as disclosed in U.S. Pat. No. 5,924,212, a seat occupancy detector, a trip computer, an ONSTAR® system or the like (with all of the above-referenced patents commonly assigned to Donnelly Corporation, and with the disclosures of the referenced patents being hereby incorporated herein by reference in their entireties).

The reflective element assembly or assemblies of the present invention may include a printed circuit board (PCB), which may be attached to the rear surface (e.g. the fourth surface) of the mirror element by, for example, a suitable adhesive or the like. An example of such an arrangement is disclosed in commonly assigned U.S. Pat. No. 5,820,245, which is hereby incorporated herein by reference in its entirety. The PCB optionally may include glare sensing and ambient photo sensors and electrochromic circuitry that automatically dims the reflectivity of the electrochromic mirror element when glare conditions are detected, such as at nighttime or the like. Alternately, the PCB may be snap connected, by a clip or otherwise attached, to a plastic plate that itself is adhered to the electrochromic element.

The printed circuit board may include electronic or electrical circuitry for actuating the variable reflectance of the reflective element and for operating other electrical or electronic functions supported in the rearview mirror assembly. The circuit board may support, for example, light emitting diodes (LEDs) for illuminating indicia on display elements provided on the chin of the bezel of the mirror assembly or display devices provided on the reflective element, or map or dash board lights or the like. The circuit board may be independently supported from the reflective element or in the casing or may be mounted to the reflective element's rear or fourth surface on a separate plate or may be directly adhered to the rear surface by a suitable adhesive. Reference is made to U.S. Pat. Nos. 5,671,996 and 5,820,245, the disclosures of which are hereby incorporated herein by reference in their entireties.

Therefore, the present invention provides an electro-optic or electrochromic reflective element assembly which requires a minimal bezel or no bezel around the perimeter edges of the reflective element assembly. The reflective element assembly may provide for electrical connection to the conductive layer at the front substrate that is substantially non viewable through the front substrate. The present invention may also provide a reflective element assembly which may provide a flush alignment of the edges of the substrates along at least one side or edge, while providing a relief area for electrical connection to one of the substrates along the flush or aligned edges. The reflective element assembly of the present invention provides enhanced manufacturing of the reflective element assembly, since the flush alignment of the substrates obviates the need for stepped spacers or pins positioned along the upper or lower edges of the substrates during assembly of the reflective element assembly.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. An interior rearview mirror reflective element suitable for use in an interior rearview mirror assembly of a vehicle, said interior rearview mirror reflective element comprising:

a front transparent substrate and a rear transparent substrate with an electrochromic medium sandwiched therebetween;

wherein said front substrate has a first surface and a second surface opposite said first surface, wherein said first surface generally faces a driver of a vehicle when said reflective element is incorporated in an interior rearview mirror assembly and when said interior rearview mirror assembly is normally mounted in the vehicle and the driver is normally operating the vehicle, and wherein said second surface faces said electrochromic medium;

a transparent electrically conductive layer disposed at said second surface of said front substrate;

wherein said rear substrate has a third surface and a fourth surface opposite said third surface, said third surface facing said electrochromic medium;

a mirror reflector disposed at said third surface of said rear substrate, wherein said mirror reflector comprises a metallic reflective layer;

wherein said electrochromic medium is disposed between said front substrate and said rear substrate in a cavity established inboard of a perimeter seal that connects said front substrate to said rear substrate and that spaces said front substrate apart from said rear substrate;

wherein said front substrate has a circumferential outer edge and said rear substrate has a circumferential outer edge;

wherein, when said front substrate is connected with said rear substrate via said perimeter seal, at least a portion of said circumferential outer edge of said rear substrate is inward of said circumferential outer edge of said front substrate and no portion of said rear substrate protrudes beyond said front substrate;

an electrically conductive perimeter hiding band disposed at said second surface of said front substrate and around a perimeter border region of said second surface of said front substrate, wherein said perimeter hiding band comprises a metallic electrically conductive layer;

wherein said perimeter hiding band is disposed over a portion of said transparent electrically conductive layer so that said portion of said transparent electrically conductive layer is sandwiched between at least a portion of said perimeter hiding band and said second surface of said front substrate, and wherein said perimeter hiding band is in electrically conductive contact with said transparent electrically conductive layer;

a first electrical connection establishing electrically conductive connection to said transparent electrically conductive layer where said perimeter hiding band is disposed, wherein said first electrical connection is made at said perimeter hiding band;

a second electrical connection establishing electrically conductive connection to said mirror reflector;

wherein no portion of said metallic reflective layer of said mirror reflector extends outward beyond said perimeter seal;

wherein said perimeter hiding band has a width dimension that is larger than a width dimension of said perimeter seal;

wherein said perimeter hiding band substantially hides said perimeter seal and said first and second electrical connections from view by a driver normally operating the vehicle and viewing said reflective element when said interior rearview mirror assembly is normally mounted in the vehicle; and wherein said interior rearview mirror reflective element is incorporated in an interior video mirror assembly adapted for mounting to an interior portion of the vehicle, said interior video mirror assembly comprising a video display disposed to the rear of said reflective element, and wherein said video display is operable, on demand, to be viewable by a driver viewing said reflective element of said interior video mirror assembly when said interior video mirror assembly is normally mounted at the interior portion of the vehicle.

2. The interior rearview mirror reflective element of claim 1, wherein said first electrical connection establishes electrically conductive connection to said transparent electrically conductive layer at said portion of said circumferential outer edge of said rear substrate.

3. The interior rearview mirror reflective element of claim 1, wherein, when said front substrate is connected with said rear substrate via said perimeter seal, another portion of said circumferential outer edge of said rear substrate is inward of said circumferential outer edge of said front substrate.

4. The interior rearview mirror reflective element of claim 1, wherein an electrically conductive tab portion, which is in electrically conductive contact with said minor reflector, extends from said perimeter seal outward towards said circumferential outer edge of said rear substrate, and wherein said second electrical connection is made at said electrically conductive tab portion.

5. The interior rearview mirror reflective element of claim 4, wherein said tab portion is at another portion of said circumferential outer edge of said rear substrate that is inward of said circumferential outer edge of said front substrate when said front substrate is connected with said rear substrate via said perimeter seal.

6. The interior rearview mirror reflective element of claim 5, wherein said portion of said circumferential outer edge of said rear substrate and said another portion of said circumferential outer edge of said rear substrate are separated by a cross dimension of said rear substrate, and wherein said cross dimension of the said rear substrate comprises a width dimension of said rear substrate or a length dimension of said rear substrate.

7. The interior rearview minor reflective element of claim 5, wherein said second electrical connection comprises a conductive epoxy making electrical connection with said minor reflector and a metal connector making electrical contact with said conductive epoxy.

8. The interior rearview minor reflective element of claim 1, wherein said first electrical connection comprises a conductive epoxy making electrical connection with said transparent electrically conductive layer and a metal connector making electrical contact with said conductive epoxy.

9. The interior rearview minor reflective element of claim 1, wherein said perimeter hiding band is disposed at said second surface of said front substrate at said perimeter seal so that a portion of said perimeter hiding band extends inboard of said perimeter seal.

10. The interior rearview mirror reflective element of claim 1, wherein said front substrate comprises an elongated substrate having a length dimension and a width dimension and wherein said length dimension of said front substrate is at least about three times greater than said width dimension of said front substrate, and wherein said rear substrate comprises an elongated substrate having a length dimension and a width dimension and wherein said length dimension of said rear substrate is at least about three times greater than said width dimension of said rear substrate.

11. The interior rearview mirror reflective element of claim 10, wherein said length dimension of said rear substrate is less than said length dimension of said front substrate such that said at least a portion of said circumferential outer edge of said rear substrate is at least one lateral side edge of said rear substrate when said interior rearview mirror assembly is normally mounted in the vehicle.

12. The interior rearview mirror reflective element of claim 10, wherein said width dimension of said rear substrate is less than said width dimension of said front substrate such that said at least a portion of said circumferential outer edge of said rear substrate is at least one of an upper edge of said rear substrate and a lower edge of said rear substrate when said interior rearview mirror assembly is normally mounted in the vehicle.

13. The interior rearview mirror reflective element of claim 10, wherein said length dimension of said rear substrate is less than said length dimension of said front substrate and said width dimension of said rear substrate is less than said width dimension of said front substrate such that said at least a portion of said circumferential outer edge of said rear substrate comprises substantially the entirety of said circumferential outer edge of said rear substrate.

14. The interior rearview mirror reflective element of claim 1, wherein said perimeter hiding band comprises a coating of chromium metal.

15. The interior rearview mirror reflective element of claim 1, wherein said perimeter hiding band provides a class A appearance to a driver normally viewing said reflective element when said interior rearview mirror assembly is normally mounted in the vehicle.

16. The interior rearview mirror reflective element of claim 1, wherein said first and second electrical connections comprise first and second metal connectors.

17. The interior rearview mirror reflective element of claim 1, wherein said metallic reflective layer comprises a metallic silver reflective layer.

18. The interior rearview mirror reflective element of claim 1, wherein said metallic reflective layer comprises a metallic silver alloy reflective layer.

19. The interior rearview mirror reflective element of claim 1, wherein said transparent electrically conductive layer comprises at least one of indium tin oxide, indium cerium oxide, indium tungsten oxide, indium oxide, zinc oxide, zinc oxide doped with aluminum, zinc oxide doped with silver, zinc oxide doped with gold, and an oxide doped with a metal.

20. An interior rearview mirror reflective element suitable for use in an interior rearview mirror assembly of a vehicle, said interior rearview mirror reflective element comprising:
a front transparent substrate and a rear transparent substrate with an electrochromic medium sandwiched therebetween;
wherein said front substrate has a first surface and a second surface opposite said first surface, wherein said first surface generally faces a driver of a vehicle when said reflective element is incorporated in an interior rearview mirror assembly and when said interior rearview mirror assembly is normally mounted in the vehicle and the driver is normally operating the vehicle, and wherein said second surface faces said electrochromic medium;
a transparent electrically conductive layer disposed at said second surface of said front substrate;

wherein said rear substrate has a third surface and a fourth surface opposite said third surface, said third surface facing said electrochromic medium;

a mirror reflector disposed at said third surface of said rear substrate, wherein said mirror reflector comprises a metallic reflective layer and wherein said metallic reflective layer comprises at least one of (a) a metallic silver reflective layer and (b) a metallic silver alloy reflective layer;

wherein said electrochromic medium is disposed between said front substrate and said rear substrate in a cavity established inboard of a perimeter seal that connects said front substrate to said rear substrate and that spaces said front substrate apart from said rear substrate;

wherein said front substrate has a circumferential outer edge and said rear substrate has a circumferential outer edge;

wherein, when said front substrate is connected with said rear substrate via said perimeter seal, at least a portion of said circumferential outer edge of said rear substrate is inward of said circumferential outer edge of said front substrate and no portion of said rear substrate protrudes beyond said front substrate;

an electrically conductive perimeter hiding band disposed at said second surface of said front substrate and around a perimeter border region of said second surface of said front substrate, wherein said perimeter hiding band comprises a metallic electrically conductive layer;

wherein said perimeter hiding band is in electrically conductive contact with said transparent electrically conductive layer;

a first electrical connection establishing electrically conductive connection to said transparent electrically conductive layer where said perimeter hiding band is disposed, wherein said first electrical connection is made at said perimeter hiding band;

a second electrical connection establishing electrically conductive connection to said mirror reflector;

wherein said first electrical connection comprises a conductive epoxy making electrical connection with said transparent electrically conductive layer and a metal connector making electrical contact with said conductive epoxy;

wherein said perimeter hiding band has a width dimension that is larger than a width dimension of said perimeter seal and wherein said perimeter hiding band is disposed at said second surface of said front substrate at said perimeter seal so that a portion of said perimeter hiding band extends inboard of said perimeter seal; and wherein said perimeter hiding band substantially hides said perimeter seal and said first and second electrical connections from view by a driver normally operating the vehicle and viewing said reflective element when said interior rearview mirror assembly is normally mounted in the vehicle.

21. The interior rearview mirror reflective element of claim 20, wherein said perimeter hiding band is disposed over a portion of said transparent electrically conductive layer so that said portion of said transparent electrically conductive layer is sandwiched between at least a portion of said perimeter hiding band and said second surface of said front substrate.

22. The interior rearview mirror reflective element of claim 21, wherein said first electrical connection establishes electrically conductive connection to said transparent electrically conductive layer at said portion of said circumferential outer edge of said rear substrate.

23. The interior rearview mirror reflective element of claim 21, wherein an electrically conductive tab portion, which is in electrically conductive contact with said mirror reflector, extends from said perimeter seal outward towards said circumferential outer edge of said rear substrate, and wherein said second electrical connection is made at said electrically conductive tab portion.

24. The interior rearview mirror reflective element of claim 23, wherein said tab portion is at another portion of said circumferential outer edge of said rear substrate that is inward of said circumferential outer edge of said front substrate when said front substrate is connected with said rear substrate via said perimeter seal.

25. The interior rearview mirror reflective element of claim 24, wherein said portion of said circumferential outer edge of said rear substrate and said another portion of said circumferential outer edge of said rear substrate are separated by a cross dimension of said rear substrate, and wherein said cross dimension of the said rear substrate comprises a width dimension of said rear substrate or a length dimension of said rear substrate.

26. An interior rearview mirror reflective element suitable for use in an interior rearview mirror assembly of a vehicle, said interior rearview mirror reflective element comprising:

a front transparent substrate and a rear transparent substrate with an electrochromic medium sandwiched therebetween;

wherein said front substrate has a first surface and a second surface opposite said first surface, wherein said first surface generally faces a driver of a vehicle when said reflective element is incorporated in an interior rearview mirror assembly and when said interior rearview mirror assembly is normally mounted in the vehicle and the driver is normally operating the vehicle, and wherein said second surface faces said electrochromic medium;

a transparent electrically conductive layer disposed at said second surface of said front substrate;

wherein said rear substrate has a third surface and a fourth surface opposite said third surface, said third surface facing said electrochromic medium;

a mirror reflector comprising a metallic reflective layer, wherein said mirror reflector is disposed at said third surface of said rear substrate;

wherein said electrochromic medium is disposed between said front substrate and said rear substrate in a cavity established inboard of a perimeter seal that connects said front substrate to said rear substrate and that spaces said front substrate apart from said rear substrate;

wherein said front substrate has a circumferential outer edge and said rear substrate has a circumferential outer edge;

wherein, when said front substrate is connected with said rear substrate via said perimeter seal, at least a portion of said circumferential outer edge of said rear substrate is inward of said circumferential outer edge of said front substrate and no portion of said rear substrate protrudes beyond said front substrate;

an electrically conductive perimeter hiding band disposed at said second surface of said front substrate and around a perimeter border region of said second surface of said front substrate, wherein said perimeter hiding band comprises a metallic electrically conductive layer;

a first electrical connection establishing electrically conductive connection to said transparent electrically conductive layer where said perimeter hiding band is disposed;

wherein an electrically conductive tab portion, which is in electrically conductive contact with said mirror reflector, extends from said perimeter seal outward towards said circumferential outer edge of said rear substrate, and wherein said second electrical connection is made at said electrically conductive tab portion;

a second electrical connection establishing electrically conductive connection to said tab portion;

wherein no portion of said metallic reflective layer of said mirror reflector extends outward beyond said perimeter seal;

wherein said perimeter hiding band has a width dimension that is larger than a width dimension of said perimeter seal; and wherein said perimeter hiding band substantially hides said perimeter seal and said first and second electrical connections from view by a driver normally operating the vehicle and viewing said reflective element when said interior rearview mirror assembly is normally mounted in the vehicle.

27. The interior rearview mirror reflective element of claim 26, wherein said perimeter hiding band is disposed over a portion of said transparent electrically conductive layer so that said portion of said transparent electrically conductive layer is sandwiched between at least a portion of said perimeter hiding band and said second surface of said front substrate, and wherein said perimeter hiding band is in electrically conductive contact with said transparent electrically conductive layer.

28. The interior rearview mirror reflective element of claim 26, wherein said first electrical connection is made at said perimeter hiding band.

29. The interior rearview mirror reflective element of claim 26, wherein said metallic reflective layer comprises a metallic silver reflective layer.

30. The interior rearview mirror reflective element of claim 26, wherein said metallic reflective layer comprises a metallic silver alloy reflective layer.

31. The interior rearview mirror reflective element of claim 26, wherein said tab portion is at another portion of said circumferential outer edge of said rear substrate that is inward of said circumferential outer edge of said front substrate when said front substrate is connected with said rear substrate via said perimeter seal.

32. The interior rearview mirror reflective element of claim 31, wherein said portion of said circumferential outer edge of said rear substrate and said another portion of said circumferential outer edge of said rear substrate are separated by a cross dimension of said rear substrate, and wherein said cross dimension of the said rear substrate comprises a width dimension of said rear substrate or a length dimension of said rear substrate.

33. The interior rearview mirror reflective element of claim 26, wherein said first electrical connection comprises a conductive epoxy making electrical connection with said transparent electrically conductive layer and a metal connector making electrical contact with said conductive epoxy.

34. The interior rearview mirror reflective element of claim 26, wherein said perimeter hiding band comprises a coating of chromium metal.

35. The interior rearview mirror reflective element of claim 26, wherein said interior rearview mirror reflective element is incorporated in an interior video mirror assembly adapted for mounting to an interior portion of the vehicle, said interior video mirror assembly comprising a video display disposed to the rear of said reflective element, and wherein said video display is operable, on demand, to be viewable by a driver viewing said reflective element of said interior video mirror assembly when said interior video mirror assembly is normally mounted at the interior portion of the vehicle.

36. The interior rearview mirror reflective element of claim 26, and wherein said perimeter hiding band is disposed at said second surface of said front substrate at said perimeter seal so that a portion of said perimeter hiding band extends inboard of said perimeter seal.

37. An interior rearview mirror reflective element suitable for use in an interior rearview mirror assembly of a vehicle, said interior rearview mirror reflective element comprising:

a front transparent substrate and a rear transparent substrate with an electrochromic medium sandwiched therebetween;

wherein said front substrate has a first surface and a second surface opposite said first surface, wherein said first surface generally faces a driver of a vehicle when said reflective element is incorporated in an interior rearview mirror assembly and when said interior rearview mirror assembly is normally mounted in the vehicle and the driver is normally operating the vehicle, and wherein said second surface faces said electrochromic medium;

a transparent electrically conductive layer disposed at said second surface of said front substrate;

wherein said rear substrate has a third surface and a fourth surface opposite said third surface, said third surface facing said electrochromic medium;

a mirror reflector disposed at said third surface of said rear substrate, wherein said mirror reflector comprises a metallic reflective layer;

wherein said electrochromic medium is disposed between said front substrate and said rear substrate in a cavity established inboard of a perimeter seal that connects said front substrate to said rear substrate and that spaces said front substrate apart from said rear substrate;

wherein said front substrate has a circumferential outer edge and said rear substrate has a circumferential outer edge;

wherein, when said front substrate is connected with said rear substrate via said perimeter seal, at least a portion of said circumferential outer edge of said rear substrate is inward of said circumferential outer edge of said front substrate;

wherein no portion of said metallic reflective layer of said mirror reflector extends outward beyond said perimeter seal;

an electrically conductive perimeter hiding band disposed at said second surface of said front substrate and around a perimeter border region of said second surface of said front substrate, wherein said perimeter hiding band comprises a metallic electrically conductive layer;

wherein said perimeter hiding band is disposed over a portion of said transparent electrically conductive layer so that said portion of said transparent electrically conductive layer is sandwiched between at least a portion of said perimeter hiding band and said second surface of said front substrate, and wherein said perimeter hiding band is in electrically conductive contact with said transparent electrically conductive layer;

a first electrical connection establishing electrically conductive connection at said second surface of said front substrate;

wherein said perimeter hiding band has a width dimension that is larger than a width dimension of said perimeter seal;

wherein said perimeter hiding band substantially hides said perimeter seal and said first electrical connection from view by a driver normally operating the vehicle and viewing said reflective element when said interior rearview mirror assembly is normally mounted in the vehicle; and wherein said interior rearview mirror reflective element is incorporated in an interior video mirror assembly adapted for mounting to an interior portion of the vehicle, said interior video mirror assembly comprising a video display disposed to the rear of said reflective element, and wherein said video display is operable, on demand, to be viewable by a driver viewing said reflective element of said interior video mirror assembly when said interior video mirror assembly is normally mounted at the interior portion of the vehicle.

38. The interior rearview mirror reflective element of claim 37, wherein an electrically conductive tab portion, which is in electrically conductive contact with said mirror reflector, extends from said perimeter seal outward towards said circumferential outer edge of said rear substrate, and wherein a second electrical connection establishes electrically conductive connection at said electrically conductive tab portion.

39. The interior rearview mirror reflective element of claim 38, wherein said perimeter hiding band substantially hides said second electrical connection from view by a driver normally operating the vehicle and viewing said reflective element when said interior rearview mirror assembly is normally mounted in the vehicle.

40. The interior rearview mirror reflective element of claim 39, wherein said tab portion is at another portion of said circumferential outer edge of said rear substrate that is inward of said circumferential outer edge of said front substrate when said front substrate is connected with said rear substrate via said perimeter seal, and wherein said portion of said circumferential outer edge of said rear substrate and said another portion of said circumferential outer edge of said rear substrate are separated by a cross dimension of said rear substrate, and wherein said cross dimension of the said rear substrate comprises a width dimension of said rear substrate or a length dimension of said rear substrate.

41. The interior rearview mirror reflective element of claim 40, wherein said second electrical connection comprises a conductive epoxy making electrical connection with said mirror reflector and a metal connector making electrical contact with said conductive epoxy.

42. The interior rearview mirror reflective element of claim 37, wherein no portion of said rear substrate protrudes beyond said front substrate.

43. The interior rearview mirror reflective element of claim 37, wherein said first connection establishes electrically conductive connection to said transparent electrically conductive layer.

44. The interior rearview mirror reflective element of claim 43, wherein said first electrical connection is made at said perimeter hiding band.

45. The interior rearview mirror reflective element of claim 37, wherein said metallic reflective layer comprises a metallic silver reflective layer.

46. The interior rearview mirror reflective element of claim 37, wherein said metallic reflective layer comprises a metallic silver alloy reflective layer.

47. The interior rearview mirror reflective element of claim 37, wherein said perimeter hiding band is disposed at said second surface of said front substrate at said perimeter seal so that a portion of said perimeter hiding band extends inboard of said perimeter seal.

48. An interior rearview mirror reflective element suitable for use in an interior rearview mirror assembly of a vehicle, said interior rearview mirror reflective element comprising:

a front transparent substrate and a rear transparent substrate with an electrochromic medium sandwiched therebetween;

wherein said front substrate has a first surface and a second surface opposite said first surface, wherein said first surface generally faces a driver of a vehicle when said reflective element is incorporated in an interior rearview mirror assembly and when said interior rearview mirror assembly is normally mounted in the vehicle and the driver is normally operating the vehicle, and wherein said second surface faces said electrochromic medium;

a transparent electrically conductive layer disposed at said second surface of said front substrate;

wherein said rear substrate has a third surface and a fourth surface opposite said third surface, said third surface facing said electrochromic medium;

a mirror reflector disposed at said third surface of said rear substrate, wherein said mirror reflector comprises a metallic reflective layer;

wherein said electrochromic medium is disposed between said front substrate and said rear substrate in a cavity established inboard of a perimeter seal that connects said front substrate to said rear substrate and that spaces said front substrate apart from said rear substrate;

wherein said front substrate has a circumferential outer edge and said rear substrate has a circumferential outer edge;

wherein, when said front substrate is connected with said rear substrate via said perimeter seal, at least a portion of said circumferential outer edge of said rear substrate is inward of said circumferential outer edge of said front substrate;

wherein no portion of said metallic reflective layer of said mirror reflector extends outward beyond said perimeter seal;

an electrically conductive perimeter hiding band disposed at said second surface of said front substrate and around a perimeter border region of said second surface of said front substrate, wherein said perimeter hiding band comprises a metallic electrically conductive layer;

a first electrical connection establishing electrically conductive connection at said second surface of said front substrate;

wherein said perimeter hiding band has a width dimension that is larger than a width dimension of said perimeter seal;

wherein said perimeter hiding band substantially hides said perimeter seal and said first electrical connection from view by a driver normally operating the vehicle and viewing said reflective element when said interior rearview mirror assembly is normally mounted in the vehicle; and wherein said interior rearview mirror reflective element is incorporated in an interior video mirror assembly adapted for mounting to an interior portion of the vehicle, said interior video minor assembly comprising a video display disposed to the rear of said reflective element, and wherein said video display is operable, on demand, to be viewable by a driver viewing said reflective element of said interior video mirror assembly when said interior video mirror assembly is normally mounted at the interior portion of the vehicle.

49. The interior rearview mirror reflective element of claim 48, wherein an electrically conductive tab portion, which is in electrically conductive contact with said mirror reflector, extends from said perimeter seal outward towards said circumferential outer edge of said rear substrate, and wherein a second electrical connection establishes electrically conductive connection at said third surface of said rear substrate.

50. The interior rearview mirror reflective element of claim 49, wherein said second electrical connection is made at said electrically conductive tab portion.

51. The interior rearview mirror reflective element of claim 49, wherein said tab portion is at another portion of said circumferential outer edge of said rear substrate that is inward of said circumferential outer edge of said front substrate when said front substrate is connected with said rear substrate via said perimeter seal.

52. The interior rearview mirror reflective element of claim 51, wherein said portion of said circumferential outer edge of said rear substrate and said another portion of said circumferential outer edge of said rear substrate are separated by a cross dimension of said rear substrate, and wherein said cross dimension of the said rear substrate comprises a width dimension of said rear substrate or a length dimension of said rear substrate.

53. The interior rearview mirror reflective element of claim 51, wherein said second electrical connection comprises a conductive epoxy making electrical connection with said mirror reflector and a metal connector making electrical contact with said conductive epoxy.

54. The interior rearview mirror reflective element of claim 48, wherein said perimeter hiding band is disposed over a portion of said transparent electrically conductive layer so that said portion of said transparent electrically conductive layer is sandwiched between at least a portion of said perimeter hiding band and said second surface of said front substrate, and wherein said perimeter hiding band is in electrically conductive contact with said transparent electrically conductive layer.

55. The interior rearview mirror reflective element of claim 48, wherein said metallic reflective layer comprises a metallic silver reflective layer.

56. The interior rearview mirror reflective element of claim 48, wherein said metallic reflective layer comprises a metallic silver alloy reflective layer.

57. The interior rearview mirror reflective element of claim 48, wherein said perimeter hiding band is disposed at said second surface of said front substrate at said perimeter seal so that a portion of said perimeter hiding band extends inboard of said perimeter seal.

\* \* \* \* \*

UNITED STATES PATENT AND TRADEMARK OFFICE
CERTIFICATE OF CORRECTION

PATENT NO. : 8,335,032 B2
APPLICATION NO. : 12/979492
DATED : December 18, 2012
INVENTOR(S) : Ian A. McCabe et al.

It is certified that error appears in the above-identified patent and that said Letters Patent is hereby corrected as shown below:

Column 1
Line 63, "substrate;" should be --substrate,--

Column 2
Line 29, "conductors;" should be --conductors,--

Column 4
Line 50, Insert --at-- before "at"

Column 9
Line 55, "al," should be --al.--

Column 11
Line 42, Delete "," after "edges"
Line 49, "mariner" should be --manner--

Column 16
Line 35, Insert --at-- before "at"

Column 18
Line 46, "fit" should be --frit--

Column 25
Line 8, "612e" should be --612c--
Line 10, "614e" should be --614c--
Line 37, "61T" should be --612'--
Line 50, Delete "," after "electrically"

Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 8,335,032 B2

Column 30
Line 57, "fit" should be --frit--

Column 34
Line 28, "minor" should be --mirror--

Column 35
Line 29, "flits" should be --frits--

Column 39
Line 1, "No." should be --Nos.--

Column 41
Line 29, Claim 4, "minor" should be --mirror--
Line 48, Claim 7, "minor" should be --mirror--
Line 51, Claim 7, "minor" should be --mirror--
Line 53, Claim 8, "minor" should be --mirror--
Line 58, Claim 9, "minor" should be --mirror--
Line 65, Claim 10, "haying" should be --having--

Column 42
Line 10, Claim 11, Insert --at-- before "at"
Line 17, Claim 12, Insert --at-- before "at"

Column 48
Line 59, Claim 48, "minor" should be --mirror--